US011317111B2

(12) United States Patent
Rusanovskyy et al.

(10) Patent No.: US 11,317,111 B2
(45) Date of Patent: Apr. 26, 2022

(54) AFFINE CODING WITH VECTOR CLIPPING

(71) Applicant: QUALCOMM Incorporated, San Diego, CA (US)

(72) Inventors: Dmytro Rusanovskyy, San Diego, CA (US); Marta Karczewicz, San Diego, CA (US); Yan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/033,659

(22) Filed: Sep. 25, 2020

(65) Prior Publication Data

US 2021/0099729 A1 Apr. 1, 2021

Related U.S. Application Data

(60) Provisional application No. 62/910,384, filed on Oct. 3, 2019, provisional application No. 62/907,664, filed on Sep. 29, 2019.

(51) Int. Cl.
*H04N 19/513* (2014.01)
*H04N 19/176* (2014.01)
(Continued)

(52) U.S. Cl.
CPC ......... *H04N 19/513* (2014.11); *H04N 19/103* (2014.11); *H04N 19/132* (2014.11);
(Continued)

(58) Field of Classification Search
CPC ............... H04N 19/103; H04N 19/132; H04N 19/139; H04N 19/176; H04N 19/186;
(Continued)

(56) References Cited

U.S. PATENT DOCUMENTS

2019/0045214 A1* 2/2019 Ikai ..................... H04N 19/196
2020/0154126 A1* 5/2020 Li ........................ H04N 19/186
(Continued)

FOREIGN PATENT DOCUMENTS

WO WO-2020006304 A1 * 1/2020 ............. H04N 19/52

OTHER PUBLICATIONS

Bross B., et al., "Versatile Video Coding (Draft 3)", 12. JVET Meeting;, Oct. 3, 2018-Oct. 12, 2018, Macao; (The Joint Video Exploration Teamof ISO/IEC JTC1/SC29/WG11 and ITU-T SG.16), No. JVET-L1001, Dec. 20, 2018 (Dec. 20, 2018), XP030200071, 236 pages, Retrieved from the Internet:URL: http://phenix.int-evry.fr/jvet/doc_end_user/documents/12_Macao/wg11/JVET-L1001-v11.zip JVET-L1001-v7.docx, [retrieved on Dec. 20, 2018], Abstract, Sections 7.3.4.6. 7.3.4.8, Section 8.3.6.

(Continued)

Primary Examiner — Francis Geroleo
(74) Attorney, Agent, or Firm — Polsinelli

(57) ABSTRACT

Systems and techniques for video coding and compression are described herein. Some examples include affine coding modes for video coding and compression. One example is an apparatus for coding video data that includes a memory and a processor or processors coupled to the memory. The processor(s) are configured to obtain a current coding block from the video data, determine control data for the current coding block, and determine one or more affine motion vector clipping parameters from the control data. The processor(s) are further configured to select a sample of the current coding block, determine an affine motion vector for the sample of the current coding block, and clip the affine motion vector using the one or more affine motion vector clipping parameters to generate a clipped affine motion vector.

54 Claims, 26 Drawing Sheets

(51) Int. Cl.
   *H04N 19/186* (2014.01)
   *H04N 19/103* (2014.01)
   *H04N 19/132* (2014.01)
   *H04N 19/139* (2014.01)

(52) U.S. Cl.
   CPC ......... *H04N 19/139* (2014.11); *H04N 19/176* (2014.11); *H04N 19/186* (2014.11)

(58) Field of Classification Search
   CPC ...... H04N 19/51; H04N 19/513; H04N 19/54; H04N 19/70
   See application file for complete search history.

(56) References Cited

U.S. PATENT DOCUMENTS

2020/0228817 A1* 7/2020 Li .................. H04N 19/159
2021/0211710 A1* 7/2021 Zhang ............. H04N 19/172

OTHER PUBLICATIONS

International Search Report and Written Opinion—PCT/US2020/053147—ISA/EPO—dated Dec. 12, 2020.

Li J, et al., "CE2: Memory Bandwidth Reduction for Affine Mode (test 2.4.2)," The Joint Video Exploration Team of ISO/IEC JTC1/SC29/WG11 and ITU-T SG.16), No. JVET-M0309; JVET-M0309, Jan. 18, 2019 (Jan. 18, 2019), pp. 1-5, XP030201157, Retrieved from the Internet: URL: http://phenix.int-evry.fr/jvet/doc_end_user/documents/13_Marrakech/wg11/JVET-M0309-v4.zip JVET-M0309_Affine.docx figure 1 sections 1 and 3 p. 4-p. 5.

Zhang Y, et al., "[EVC] Suggested Improvements for EVC CD Text and Test Model," 128. MPEG Meeting; Oct. 7, 2019-Oct. 11, 2019; Geneva; (Motion Picture Expert Group or ISO/IEC JTC1/SC29/WG11), No. m50662, Oct. 3, 2019 (Oct. 3, 2019), XP030221104, Retrieved from the Internet: URL: http://phenix.int-evry.fr/mpeg/doc_end_user/documents/128_Geneva/wg11/m50662-v2-m50662_v2.zip m50662_draftSpecText.docx [retrieved on Oct. 3, 2019] section 8.5.4.5.

* cited by examiner

1900

```
OBTAIN A CURRENT CODING BLOCK FROM THE VIDEO DATA
1902
            ↓
DETERMINE CONTROL DATA FOR THE CURRENT CODING BLOCK
1904
            ↓
DETERMINE ONE OR MORE AFFINE MOTION VECTOR CLIPPING
PARAMETERS FROM THE CONTROL DATA
1906
            ↓
SELECT A SAMPLE OF THE CURRENT CODING BLOCK
1908
            ↓
DETERMINE AN AFFINE MOTION VECTOR FOR THE SAMPLE OF THE
CURRENT CODING BLOCK
1910
            ↓
CLIP THE AFFINE MOTION VECTOR USING THE ONE OR MORE AFFINE
MOTION VECTOR CLIPPING PARAMETERS TO GENERATE A CLIPPED
AFFINE MOTION VECTOR
1912
```

FIG. 19

AFFINE CODING WITH VECTOR CLIPPING

CROSS-REFERENCE TO RELATED APPLICATIONS

This application claims the benefit of U.S. Provisional Application No. 62/907,664, filed Sep. 29, 2019 and U.S. Provisional Application No. 62/910,384 filed Oct. 3, 2019, which are hereby incorporated by reference in their entirety and for all purposes.

TECHNICAL FIELD

This application is related to video coding and compression. More specifically, this application relates to affine coding modes for video coding and compression.

BACKGROUND

Many devices and systems allow video data to be processed and output for consumption. Digital video data generally includes large amounts of data to meet the demands of video consumers and providers. For example, consumers of video data desire video of high quality, fidelity, resolution, frame rates, and the like. As a result, the large amount of video data that is required to meet these demands places a burden on communication networks and devices that process and store the video data.

Various video coding techniques may be used to compress video data. Video coding techniques can be performed according to one or more video coding standards. For example, video coding standards include high-efficiency video coding (HEVC), advanced video coding (AVC), moving picture experts group (MPEG) 2 part 2 coding, VP9, Alliance of Open Media (AOMedia) Video 1 (AV1), Essential Video Coding (EVC), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with improved coding accuracy or efficiency are needed.

SUMMARY

Systems and methods are described herein for improved video processing. In some examples, video coding techniques are described that use an affine coding mode to encode and decode video data efficiently.

In one illustrative example, a method of coding video data is described. The method comprises: obtaining a current coding block from the video data; determining control data for the current coding block; determining one or more affine motion vector clipping parameters from the control data; selecting a sample of the current coding block; determining an affine motion vector for the sample of the current coding block; and clipping the affine motion vector using the one or more affine motion vector clipping parameters to generate a clipped affine motion vector.

In another illustrative example, a non-transitory computer-readable storage medium is described. The non-transitory computer-readable medium comprises instructions which, when executed by one or more processors, cause the one or more processors to: obtain a current coding block from video data; determine control data for the current coding block; determine one or more affine motion vector clipping parameters from the control data; select a sample of the current coding block; determine an affine motion vector for the sample of the current coding block; and clip the affine motion vector using the one or more affine motion vector clipping parameters to generate a clipped affine motion vector.

In another illustrative example, another apparatus for coding video data is described. The apparatus comprises: means for obtaining a current coding block from the video data; means for determining control data for the current coding block; means for determining one or more affine motion vector clipping parameters from the control data; means for selecting a sample of the current coding block; means for determining an affine motion vector for the sample of the current coding block; and means for clipping the affine motion vector using the one or more affine motion vector clipping parameters to generate a clipped affine motion vector.

In a further illustrative example, an apparatus for coding video data is described. The apparatus comprises: memory; and one or more processors coupled to the memory, the one or more processors being configured to: obtain a current coding block from the video data; determine control data for the current coding block; determine one or more affine motion vector clipping parameters from the control data; select a sample of the current coding block; determine an affine motion vector for the sample of the current coding block; and clip the affine motion vector using the one or more affine motion vector clipping parameters to generate a clipped affine motion vector.

In some aspects, the control data comprises: a location with associated horizontal coordinate and associated vertical coordinate in full-sample units; a width variable specifying a width of the current coding block; a height variable specifying a height of the current coding block; a horizontal change of motion vector; a vertical change of motion vector; and a base scaled motion vector. In some examples, the control data can further include a height of a picture associated with the current coding block in samples and a width of the picture in samples.

In some aspects, the one or more affine motion vector clipping parameters comprise: a horizontal maximum variable; a horizontal minimum variable; a vertical maximum variable; and a vertical minimum variable. In some aspects, the horizontal minimum variable is defined by a maximum value selected from a horizontal minimum picture value and a horizontal minimum motion vector value.

In some aspects, the horizontal minimum picture value is determined from the associated horizontal coordinate. In some aspects, the horizontal minimum motion vector value is determined from a center motion vector value, an array of values based on a resolution value associated with the video data or a block area size (e.g., a current coding block width×height), and the width variable specifying the width of the current coding block. In some aspects, the center motion vector value is determined from the base scaled motion vector, the horizontal change of motion vector, the width variable, and the height variable. In some aspects, the base scaled motion vector corresponds to a top left corner of the current coding block and is determined from control point motion vector values. In some aspects, the vertical maximum variable is defined by a minimum value selected from a vertical maximum picture value and a vertical maximum motion vector value.

In some aspects, the vertical maximum picture value is determined from the height of the picture, the associated vertical coordinate, and the height variable. In some aspects, the vertical maximum motion vector value is determined from a center motion vector value, an array of values based on a resolution value associated with the video data or a block area size (e.g., a current coding block width×height), and the height variable specifying the width of the current coding block.

In some aspects, examples sequentially obtain a plurality of current coding blocks from the video data; determine a set of affine motion vector clipping parameters on a per coding block basis for blocks of the plurality of current coding blocks; and fetch portions of a corresponding reference pictures using the set of affine motion vector clipping parameters on the per block basis for the plurality of current coding blocks.

In some aspects, examples identify a reference picture associated with the current coding block; and store a portion of the reference picture defined by the one or more affine motion vector clipping parameters. In some aspects, examples process the current coding block using reference picture data from a reference picture indicated by the clipped affine motion vector.

In some aspects, the affine motion vector for the sample of the current coding block is determined according to a first base scaled motion vector value, a first horizontal change of motion vector value, a first vertical change of motion vector value, a second base scaled motion vector value, a second horizontal change of motion vector value, a second vertical change of motion vector value, a horizontal coordinate of the sample, and a vertical coordinate of the sample. In some such aspects, the control data comprises values from a derivation table.

In some aspects, the apparatuses described above can include a mobile device with a camera for capturing one or more pictures. In some aspects, the apparatuses described above can include a display for displaying one or more pictures. The summary is not intended to identify key or essential features of the claimed subject matter, nor is it intended to be used in isolation to determine the scope of the claimed subject matter. The subject matter should be understood by reference to appropriate portions of the entire specification of the patent, any or all drawings, and each claim.

The foregoing, together with other features and embodiments, will become more apparent upon referring to the following specification, claims, and accompanying drawings.

BRIEF DESCRIPTION OF THE DRAWINGS

Examples of various implementations are described in detail below with reference to the following figures:

FIG. 19 is a flowchart illustrating a process of coding with an affine mode in accordance with examples described herein;

DETAILED DESCRIPTION

Figure 1:
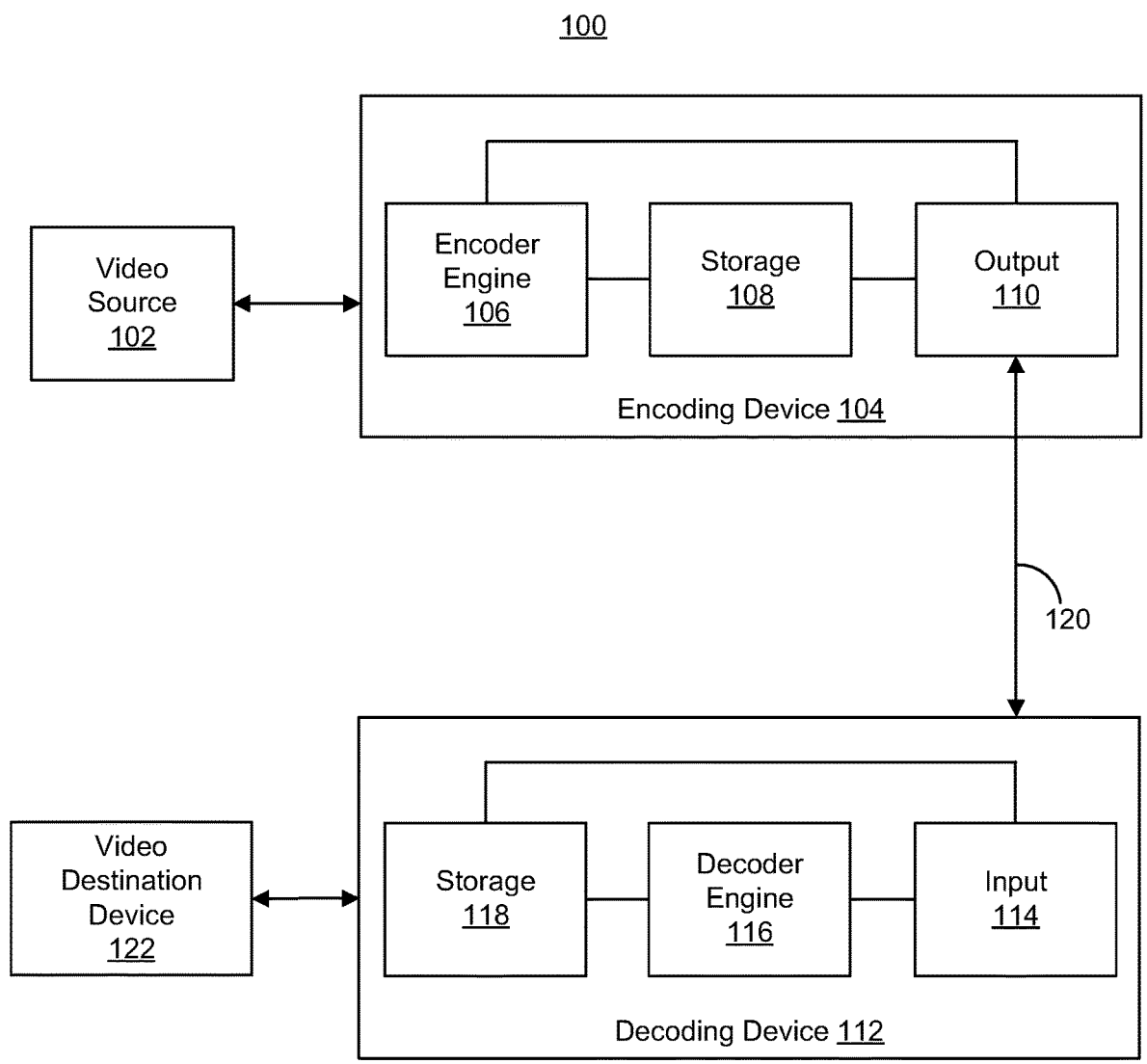
FIG. 1 is a block diagram illustrating an encoding device and a decoding device, in accordance with some examples.

Certain aspects and embodiments of the disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides examples embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As stated above, examples are described herein for improved video processing. In some examples, video coding techniques are described that use an affine coding mode to encode and decode video data efficiently. Affine models are models that can be used to approximate flow patterns associated with certain types of image motion in video, particularly flow patterns associated with camera motion (e.g., motion of the point of view or capturing position for a video stream). Video processing systems can include an affine coding mode that is configured to code video using affine motion models. Additional details of affine modes for video coding are described below. Examples described herein include operations and structures that improve the operations of video coding devices by improving memory bandwidth use in an affine coding mode. In some examples, the memory bandwidth improvements are generated by clipping motion vectors used by an affine coding mode, which can reduce the data used in a local buffer by limiting the possible reference area (e.g., and the associated data) used for affine coding.

Some systems use per-sample motion vector generation which can greatly increase the number of memory access operations used to fetch filter samples for affine coding. A large number of fetching operations can be handled by a system if the local buffer is able to accommodate the reference data, but if the reference data for each fetch is large (e.g., exceeds a local buffer size, such as a size for a decoded picture buffer), the memory bandwidth usage can degrade system performance. By limiting memory bandwidth usage associated with reference picture access, large numbers of fetching operations can be used without degraded memory bandwidth performance, thereby improving device operations. Examples described herein can provide such benefits within the context of a larger video coding system and as part of video coding devices.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

As described in more detail below, systems, apparatuses, methods (also referred to as processes), and computer-readable media (collectively referred to as "systems and techniques") are described herein for providing improvements to history-based motion vector prediction. The systems and techniques described herein can be applied to one or more of a variety of block based video coding techniques in which video is reconstructed on block-by-block basis. For example, the systems and techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), VP9, AV1, Essential Video Coding (EVC), and/or other video coding standard in development or to be developed.

Various aspects of the systems and techniques described herein will be discussed herein with respect to the figures. FIG. 1 is a block diagram illustrating an example of a system 100 including an encoding device 104 and a decoding device 112 that can operate in an affine coding mode in accordance with examples described herein. The encoding device 104 may be part of a source device, and the decoding device 112 may be part of a receiving device (also referred to as a client device). The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, an Internet Protocol (IP) camera, a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), or any other suitable electronic device.

The components of the system 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 100 is shown to include certain components, one of ordinary skill will appreciate that the system 100 can include more or fewer components than those shown in FIG. 1. For example, the system 100 can also include, in some instances, one or more memory devices other than the storage 108 and the storage 118 (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 1.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (WET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9, Alliance of Open Media (AOMedia) Video 1 (AV1), and Essential Video Coding (EVC) are other video coding standards for which the techniques described herein can be applied.

Many embodiments described herein can be performed using video codecs such as VTM, VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 106.

Once the pictures of the video data are partitioned into CUs, the encoder engine 106 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of the disclosure may also be applied to video coders configured to use quadtree partitioning, or other types of partitioning as well.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

| Specification of intra prediction mode and associated names | |
|---|---|
| Intra-prediction mode | Associated name |
| 0 | INTRA_PLANAR |
| 1 | INTRA_DC |
| 2 ... 34 | INTRA_ANGULAR2 ... INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform (DCT), discrete sine transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). As previously noted, the residual data may correspond to pixel difference values between pixels of the unencoded picture and prediction values corresponding to the PUs. The encoder engine 106 may form one or more TUs including the residual data for a CU (which includes the PUs), and may transform the TUs to produce transform coefficients for the CU. The TUs may comprise coefficients in the transform domain following application of a block transform.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. The access may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may rescale and perform an inverse transform on the encoded video bitstream data. Residual data is passed to a prediction stage of the decoder engine 116. The decoder engine 116 predicts a block of pixels (e.g., a PU). In some examples, the prediction is added to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of the disclosure are performed by a video encoding device or a video decoding device, the techniques may also be performed by a combined video encoder-decoder, typically referred to as a "CODEC." Moreover, the techniques of the disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

As described above, for each block, a set of motion information (also referred to herein as motion parameters) can be available. A set of motion information can contain motion information for forward and backward prediction directions. Here, forward and backward prediction directions are two prediction directions of a bi-directional prediction mode and the terms "forward" and "backward" do not necessarily have a geometry meaning. Instead, forward and backward can correspond to a reference picture list 0 (RefPicList0) and a reference picture list 1 (RefPicList1) of a current picture, slice, or block. In some examples, when only one reference picture list is available for a picture, slice, or block, only RefPicList0 is available and the motion information of each block of a slice is always forward. In some examples, RefPicList0 includes reference pictures that precede a current picture in time, and RefPicList1 includes reference pictures that follow the current picture in time. In some cases, a motion vector together with an associated reference index can be used in decoding processes. Such a motion vector with the associated reference index is denoted as a uni-predictive set of motion information.

For each prediction direction, the motion information can contain a reference index and a motion vector. In some cases, for simplicity, a motion vector can have associated information, from which it can be assumed a way that the motion vector has an associated reference index. A reference index can be used to identify a reference picture in the current reference picture list (RefPicList0 or RefPicList1). A motion vector can have a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, within one coded video sequence two pictures with the same POC value does not occur often. When multiple coded video sequences are present in a bitstream, pictures with a same POC value may be closer to each other in terms of decoding order. POC values of pictures can be used for reference picture list construction, derivation of reference picture set as in HEVC, and/or motion vector scaling, among other things.

In H.264/AVC, each inter-macroblock (MB) may be partitioned into four different ways, including: one 16×16 macroblock partition; two 16×8 macroblock partitions; two 8×16 macroblock partitions; and four 8×8 macroblock partitions, among others. Different macroblock partitions in one macroblock may have different reference index values for each prediction direction (e.g., different reference index values for RefPicList0 and RefPicList1).

In some cases, when a macroblock is not partitioned into four 8×8 macroblock partitions, the macroblock can have only one motion vector for each macroblock partition in each prediction direction. In some cases, when a macroblock is partitioned into four 8×8 macroblock partitions, each 8×8 macroblock partition can be further partitioned into sub-blocks, each of which can have a different motion vector in each prediction direction. An 8×8 macroblock partition can be divided into sub-blocks in different ways, including: one 8×8 sub-block; two 8×4 sub-blocks; two 4×8 sub-blocks; and four 4×4 sub-blocks, among others. Each sub-block can have a different motion vector in each prediction direction. Therefore, a motion vector can be present in a level equal to or higher than a sub-block.

In HEVC, the largest coding unit in a slice is called a coding tree block (CTB) or coding tree unit (CTU). A CTB contains a quad-tree, the nodes of which are coding units. The size of a CTB can range from 16×16 pixels to 64×64 pixels in the HEVC main profile. In some cases, 8×8 pixel CTB sizes can be supported. A CTB may be recursively split into coding units (CU) in a quad-tree manner. A CU could be the same size as a CTB and as small as 8×8 pixels. In some cases, each coding unit is coded with one mode, such as either intra-prediction mode or inter-prediction mode. When a CU is inter-coded using an inter-prediction mode, the CU may be further partitioned into two or four prediction units (PUs), or may be treated as one PU when further partitioning does not apply. When two PUs are present in one CU, the two PUs can be half size rectangles or two rectangles that are ¼ or ¾ the size of the CU.

When the CU is inter-coded, one set of motion information can be present for each PU, which can be derived with a unique inter-prediction mode. For example, each PU can be coded with one inter-prediction mode to derive the set of motion information. In some cases, when a CU is intra-coded using intra-prediction mode, the PU shapes can be 2N×2N and N×N. Within each PU, a single intra-prediction mode is coded (while chroma prediction mode is signalled at the CU level). In some cases, the N×N intra PU shapes are allowed when the current CU size is equal to the smallest CU size defined in SPS.

For motion prediction in HEVC, there are two inter-prediction modes for a prediction unit (PU), including merge mode and advanced motion vector prediction (AMVP) mode. Skip is considered as a special case of merge. In either AMVP mode or merge mode, a motion vector (MV) candidate list is maintained for multiple motion vector predictors. The motion vector(s), as well as reference indices in the merge mode, of the current PU are generated by taking one candidate from the MV candidate list.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined.

A merge candidate may correspond to a full set of motion information, while an AMVP candidate may contain one motion vector for a specific prediction direction and a reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder. In some instances, for single direction inter-prediction of a PU, the encoder can generate a single AMVP candidate list. In some instances, for bi-directional prediction of a PU, the encoder can generate two AMVP candidate lists, one using motion data of spatial and temporal neighboring PUs from the forward prediction direction and one using motion data of spatial and temporal neighboring PUs from the backward prediction direction.

Figure 2B:
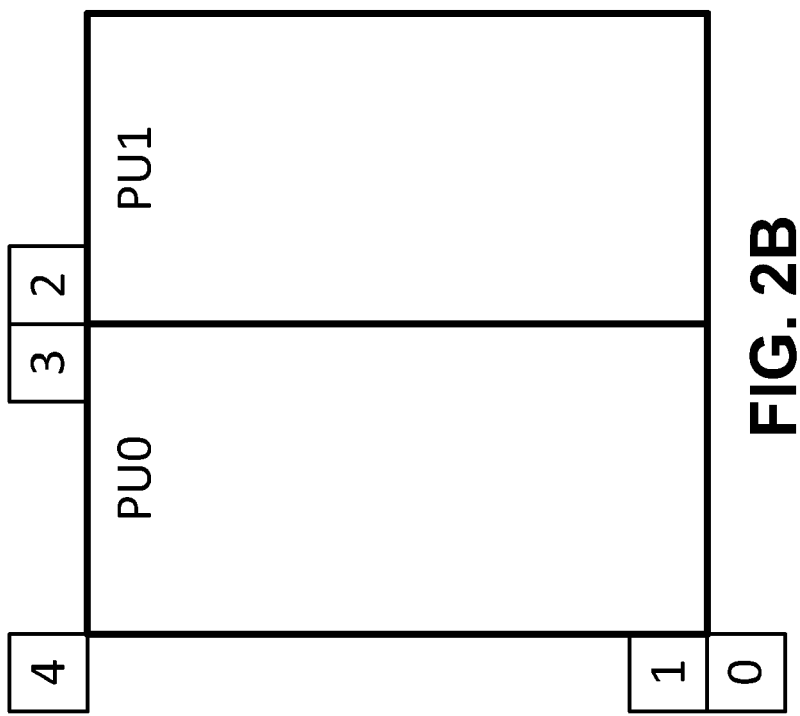
FIG. 2B is a conceptual diagram illustrating spatial neighboring motion vector candidates for an advanced motion vector prediction (AMVP) mode, in accordance with some examples.
Figure 2A:
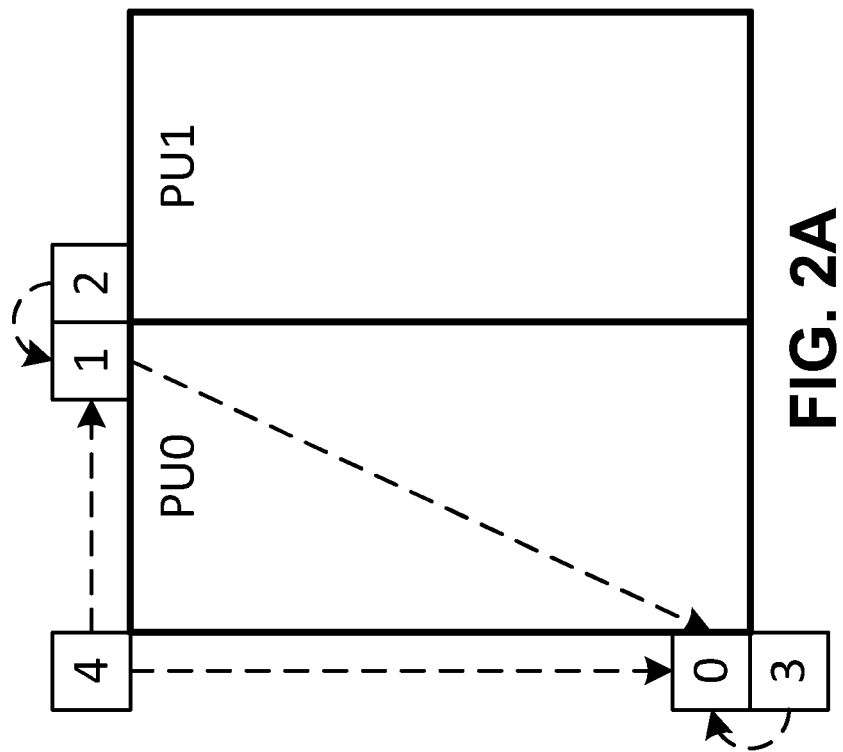
FIG. 2A is a conceptual diagram illustrating spatial neighboring motion vector candidates for a merge mode, in accordance with some examples.

The candidates for both modes can be derived from spatial and/or temporal neighboring blocks. For example, FIG. 2A and FIG. 2B include conceptual diagrams illustrating spatial neighboring candidates in HEVC. FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder can form a merging candidate list by considering merging candidates from various motion data positions. For example, as shown in FIG. 2A, up to four spatial MV candidates can be derived with respect to spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4).

In AVMP mode shown in FIG. 2B, the neighboring blocks are divided into two groups: left group including the blocks 0 and 1, and above group including the blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 3A:
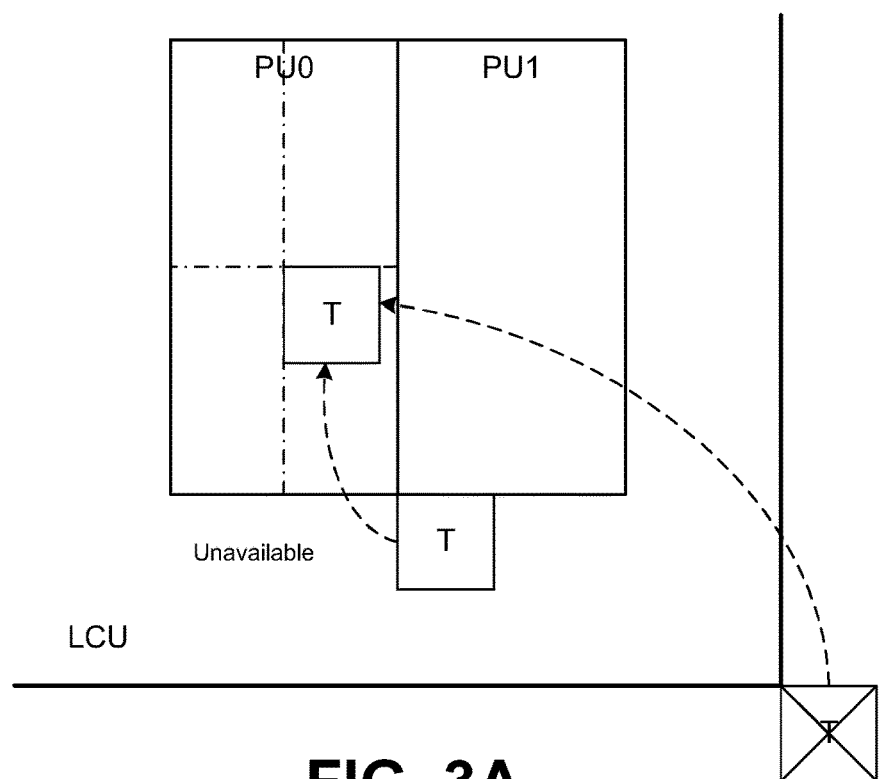
FIG. 3A is a conceptual diagram illustrating a temporal motion vector predictor (TMVP) candidate, in accordance with some examples.
Figure 3B:
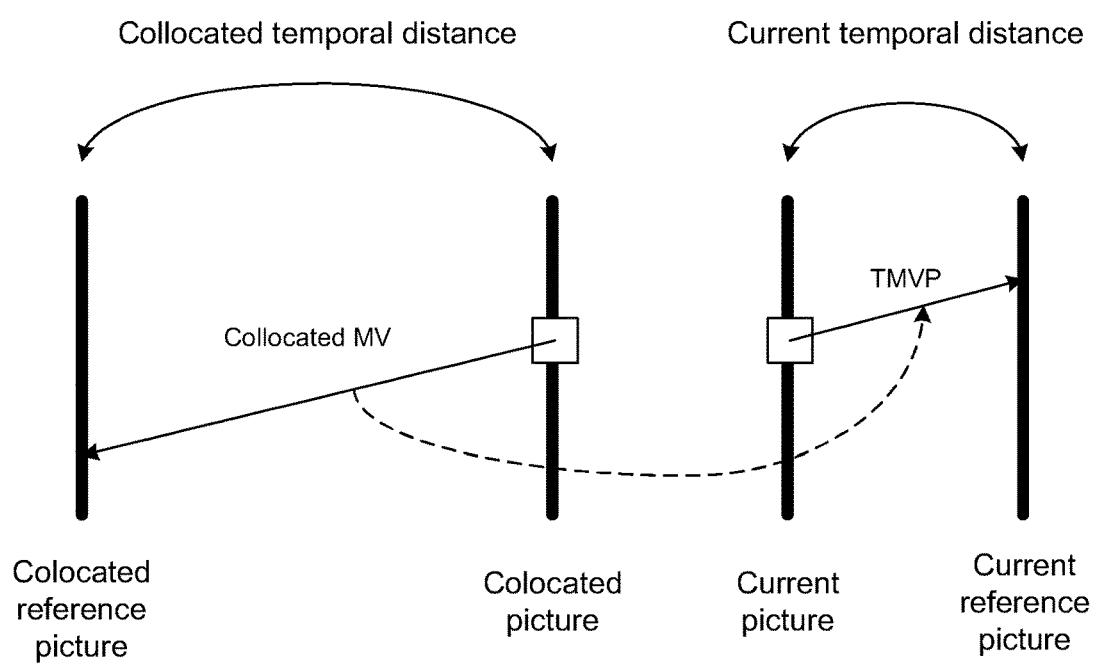
FIG. 3B is a conceptual diagram illustrating motion vector scaling, in accordance with some examples.

FIG. 3A and FIG. 3B include conceptual diagrams illustrating temporal motion vector prediction in HEVC. A temporal motion vector predictor (TMVP) candidate, if enabled and available, is added into a MV candidate list after spatial motion vector candidates. The process of motion vector derivation for a TMVP candidate is the same for both merge and AMVP modes. In some instances, however, the target reference index for the TMVP candidate in the merge mode is always set to zero.

The primary block location for TMVP candidate derivation is the bottom right block outside of the collocated PU, as shown in FIG. 3A as a block "T", to compensate for the bias to the above and left blocks used to generate spatial neighboring candidates. However, if that block is located outside of the current CTB (or LCU) row or motion information is not available, the block is substituted with a center block of the PU. A motion vector for a TMVP candidate is derived from the co-located PU of the co-located picture, indicated in the slice level. Similar to temporal direct mode in AVC, a motion vector of the TMVP candidate may be subject to motion vector scaling, which is performed to compensate for distance differences.

Other aspects of motion prediction are also covered in the HEVC, VVC, and other video coding specifications. For example, one aspect includes motion vector scaling. In motion vector scaling, a value of motion vectors is assumed to be proportional to a distance between pictures in presentation time. In some examples, a first motion vector can be associated with two pictures, including a first reference picture and a first containing picture which includes the first motion vector. The first motion vector can be utilized to predict a second motion vector. For predicting the second motion vector, a first distance between the first containing picture and the first reference picture of the first motion can be calculated based on Picture Order Count (POC) values associated with the first reference picture and the first containing picture.

A second reference picture and a second containing picture may be associated with the second motion vector to be predicted, where the second reference picture can be different from the first reference picture and the second containing picture can be different from the first containing picture. A second distance can be calculated between the second reference picture and the second containing picture based POC values associated with the second reference picture and the second containing picture, where the second distance can be different from the first distance. For predicting the second motion vector, the first motion vector can be scaled based on the first distance and the second distance. For a spatially neighboring candidate, the first containing picture and the second containing picture of the first motion vector and the second motion vector, respectively, can be the same, while the first reference picture and the second reference picture may be different. In some examples, the motion vector scaling can be applied for TMVP and AMVP modes, for the spatial and temporal neighboring candidates.

Another aspect of motion prediction includes artificial motion vector candidate generation. For example, if a motion vector candidate list is not complete, artificial motion vector candidates are generated and inserted at the end of the motion vector candidate list until all candidates are obtained. In merge mode, there are two types of artificial MV candidates: a first type which includes combined candidates derived only for B-slices; and second type which includes zero candidates used only for AMVP if the first type does not provide sufficient artificial candidates. For each pair of candidates that are already in the motion vector candidate list and that have relevant motion information, bi-directional combined motion vector candidates can be derived by a combination of the motion vector of the first candidate referring to a picture in the list 0 and the motion vector of a second candidate referring to a picture in the list 1.

Another aspect of merge and AMVP modes includes a pruning process for candidate insertion. For example, candidates from different blocks may happen to be the same, which decreases the efficiency of a merge and/or AMVP candidate list. A pruning process can be applied to solve the problem. The pruning process includes comparing a candidate against the candidates already present in the current candidate list to avoid inserting identical or duplicate candidates. To reduce the complexity of the comparison, the pruning process can be performed for less than all potential candidates to be inserted in the candidate list.

In some examples, enhanced motion vector predictions can be implemented. For instance, some inter coding tools are specified in video coding standards such as VVC, according to which the candidate list of motion vector prediction or merge prediction for a current block can be derived or refined. Examples of such approaches are described below.

A history-based motion vector prediction (HMVP) is a motion vector prediction method that allows each block to find its MV predictor from a list of MVs decoded from the past in additional to those in immediately adjacent causal neighboring motion fields. For example, using HMVP, one or more MV predictors for a current block can be obtained or predicted from a list of previously decoded MVs in addition to those in immediately adjacent causally neighboring motion fields. The MV predictors in the list of previously decoded MVs are referred to as HMVP candidates. The HMVP candidates can include motion information associated with inter-coded blocks. An HMVP table with multiple HMVP candidates can be maintained during an encoding and/or decoding process for a slice. In some examples, the HMVP table can be dynamically updated. For example, after decoding an inter-coded block, the HMVP table can be updated by adding the associated motion information of the decoded inter-coded block to the HMVP table as a new HMVP candidate. In some examples, the HMVP table can be emptied when a new slice is encountered.

In some cases, whenever there is an inter-coded block, the associated motion information can be inserted to the table in a first-in-first-out (FIFO) fashion as a new HMVP candidate. A constraint FIFO rule can be applied. When inserting an HMVP to the table, a redundancy check can be firstly applied to find whether there is an identical HMVP in the table. If found, that particular HMVP can be removed from the table and all the HMVP candidates afterwards are moved.

In some examples, HMVP candidates can be used in the merge candidate list construction process. In some cases, all HMVP candidates from the last entry to the first entry in the table are inserted after the TMVP candidate. Pruning can be applied on the HMVP candidates. Once the total number of available merge candidates reaches the signaled maximally allowed merge candidates, the merge candidate list construction process can be terminated.

In some examples, HMVP candidates can be used in the AMVP candidate list construction process. In some cases, the motion vectors of the last K HMVP candidates in the table are inserted after the TMVP candidate. In some implementations, only HMVP candidates with the same reference picture as the AMVP target reference picture are used to construct the AMVP candidate list. Pruning can be applied on the HMVP candidates.

Figure 4:
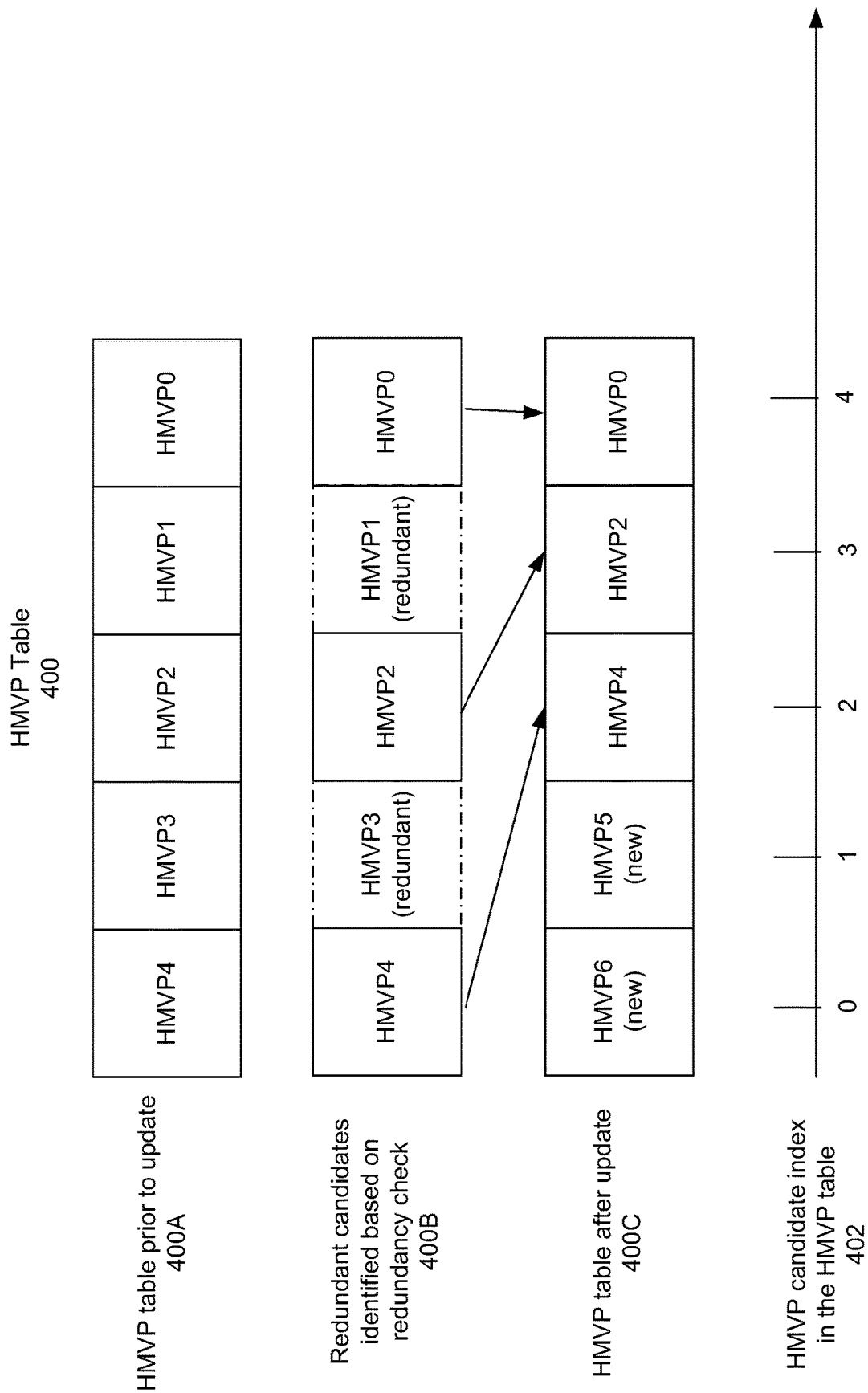
FIG. 4 is a diagram illustrating a history-based motion vector predictor (HMVP) table, in accordance with some examples.

FIG. 4 is a block diagram illustrating an example of an HMVP table 400. The HMVP table 400 can be implemented as a storage device managed using a First-In-First-Out (FIFO) rule. For example, HMVP candidates which include MV predictors can be stored in the HMVP table 400. The HMVP candidates can be stored in an order in which they are encoded or decoded. In an example, the order in which the HMVP candidates are stored in the HMVP table 400 can correspond to a time at which the HMVP candidates are constructed. For example, when implemented in a decoder such as the decoding device 112, an HMVP candidate can be constructed to include motion information of a decoded inter-coded block. In some examples, one or more HMVP candidates from the HMVP table 400 can include the motion vector predictors which can be used for motion vector prediction a current block to be decoded. In some examples, one or more HMVP candidates can include one or more such previously decoded blocks which can be stored in the time order in which they were decoded in one or more entries of the HMVP table 400 in a FIFO manner.

An HMVP candidate index 402 is shown to be associated with the HMVP table 400. The HMVP candidate index 402 can identify the one or more entries of the HMVP table 400. The HMVP candidate index 402 is shown to include the index values 0 to 4 according to an illustrative example, where each of the index values of the HMVP candidate index 402 is associated with a corresponding entry. The HMVP table 400 can include more or less entries than those shown and described with reference to FIG. 4 in other examples. As HMVP candidates are constructed, they are populated in the HMVP table 400 in a FIFO manner. For example, as the HMVP candidates are decoded, they are inserted into the HMVP table 400 in one end and moved sequentially through the entries of the HMVP table 400 until they exit the HMVP table 400 from another end. Accordingly, a memory structure such as a shift register can be used to implement the HMVP table 400 in some examples. In an example, the index value 0 can point to a first entry of the HMVP table 400, where the first entry can correspond to a first end of the HMVP table 400 at which the HMVP candidates are inserted. Correspondingly, the index value 4 can point to a second entry of the HMVP table 400, where the second entry can correspond to second end of the HMVP table 400 from which the HMVP candidates exit or are emptied from the HMVP table 400. Accordingly, an HMVP candidate which is inserted at the first entry at the index value 0 can traverse the HMVP table 400 to make room for newer or more recently decoded HMVP candidates until the HMVP candidate reaches the second entry at the index value 4. Thus, among the HVMP candidates present in the HMVP table 400 at any given time, the HMVP candidate in the second entry at the index value 4 may be the oldest or least recent, while the HMVP candidate in the first entry at the index value 0 may be the youngest or most recent. In general, the HMVP candidate in the second entry may be an older or less recently constructed HMVP candidate than the HMVP candidate in the first entry.

In FIG. 4, different states of the HMVP table 400 are identified with the reference numerals 400A, 400B, and 400C. Referring to the state for reference numerals 400A, HMVP candidates HMVP0 to HMVP4 are shown to be present in entries of the HMVP table 400 at respective index values 4 to 0. For example, HMVP0 may be the oldest or least recent HMVP candidate which was inserted into the HMVP table 400 at the first entry at the index value 0. HMVP0 may be shifted sequentially to make room for the less recently inserted and newer HMVP candidates HMVP1 to HMVP4 until HMVP0 reaches the second entry at the index value 4 shown in the state for reference numerals 400A. Correspondingly, HMVP4 may be the most recent HMVP candidate to be inserted in the first entry at the index value 0. Thus, HMVP0 is an older or less recent HMVP candidate in the HMVP table 400 in relation to HMVP4.

In some examples, one or more of the HMVP candidates HMVP0 to HMVP4 can include motion vector information which can be redundant. For example, a redundant HMVP candidate can include motion vector information which is identical to the motion vector information in one or more other HMVP candidates stored in the HMVP table 400.

Since the motion vector information of the redundant HMVP candidate can be obtained from the one or more other HMVP candidates, storing the redundant HMVP candidate in the HMVP table 400 can be avoided. By avoiding the redundant HMVP candidates from being stored in the HMVP table 400, resources of the HMVP table 400 can be utilized more efficiently. In some examples, prior to storing an HMVP candidate in the HMVP table 400, a redundancy check can be performed to determine whether the HMVP candidate would be redundant (e.g., the motion vector information of the HMVP candidate can be compared to the motion vector information of the other HMVP candidates already stored to determine whether there is a match).

In some examples, the state for reference numerals 400B of the HMVP table 400 is a conceptual illustration of the above-described redundancy check. In some examples, the HMVP candidates can be populated in the HMVP table 400 as they are decoded, and the redundancy check can be performed periodically, rather than being performed as a threshold test before the HMVP candidates are stored. For example, as shown in the state for reference numerals 400B, the HMVP candidates HMVP1 and HMVP3 can be identified as redundant candidates (i.e., their motion information is identical to that of one of the other HMVP candidates in the HMVP table 400). The redundant HMVP candidates HMVP1 and HMVP3 can be removed and the remaining HMVP candidates can be shifted accordingly.

For example, as shown in the state for reference numerals 400C, the HMVP candidates HMVP2 and HMVP4 are shifted towards higher index values which correspond to older entries, while HMVP0 which is already in the second entry at the end of the HMVP table 400 is not shown to be shifted further. In some examples, shifting the HMVP candidates HMVP2 and HMVP4 can free up space in the HMVP table 400 for newer HMVP candidates. Accordingly, new HMVP candidates HMVP5 and HMVP6 are shown to be shifted into the HMVP table 400, with HMVP6 being the newest or including the most recently decoded motion vector information, and stored in the first entry at the index value 0.

In some examples, one or more of the HMVP candidates from the HMVP table 400 can be used for constructing other candidate lists which can be used for motion prediction of the current block. For example, one or more HMVP candidates from the HMVP table 400 can be added to a merge candidate list, e.g., as additional merge candidates. In some examples, one or more HMVP candidates from the same HMVP table 400 or another such HMVP table can be added to an Advanced Motion Vector Prediction (AMVP) candidate list, e.g., as additional AMVP predictors.

For example, in a merge candidate list construction process some or all of the HMVP candidates stored in the entries of the HMVP table 400 can be inserted in the merge candidate list. In some examples, inserting the HMVP candidates in the merge candidate list can include inserting the HMVP candidates after a temporal motion vector predictor (TMVP) candidate in the merge candidate list. As previously discussed with reference to FIG. 3A and FIG. 3B, the TMVP candidate, if enabled and available, can be added into a MV candidate list after spatial motion vector candidates.

In some examples, the above-described pruning process can be applied on the HMVP candidates in constructing the merge candidate list. For example, once a total number of merge candidates in the merge candidate list reaches maximum number of allowable merge candidates, the merge candidate list construction process can be terminated, and no more HMVP candidates may be inserted into the merge candidate list. The maximum number of allowable merge candidates in the merge candidate list can be a predetermined number or a number which may be signaled, e.g., from an encoder to a decoder at which the merge candidate list may be constructed.

Figure 5:
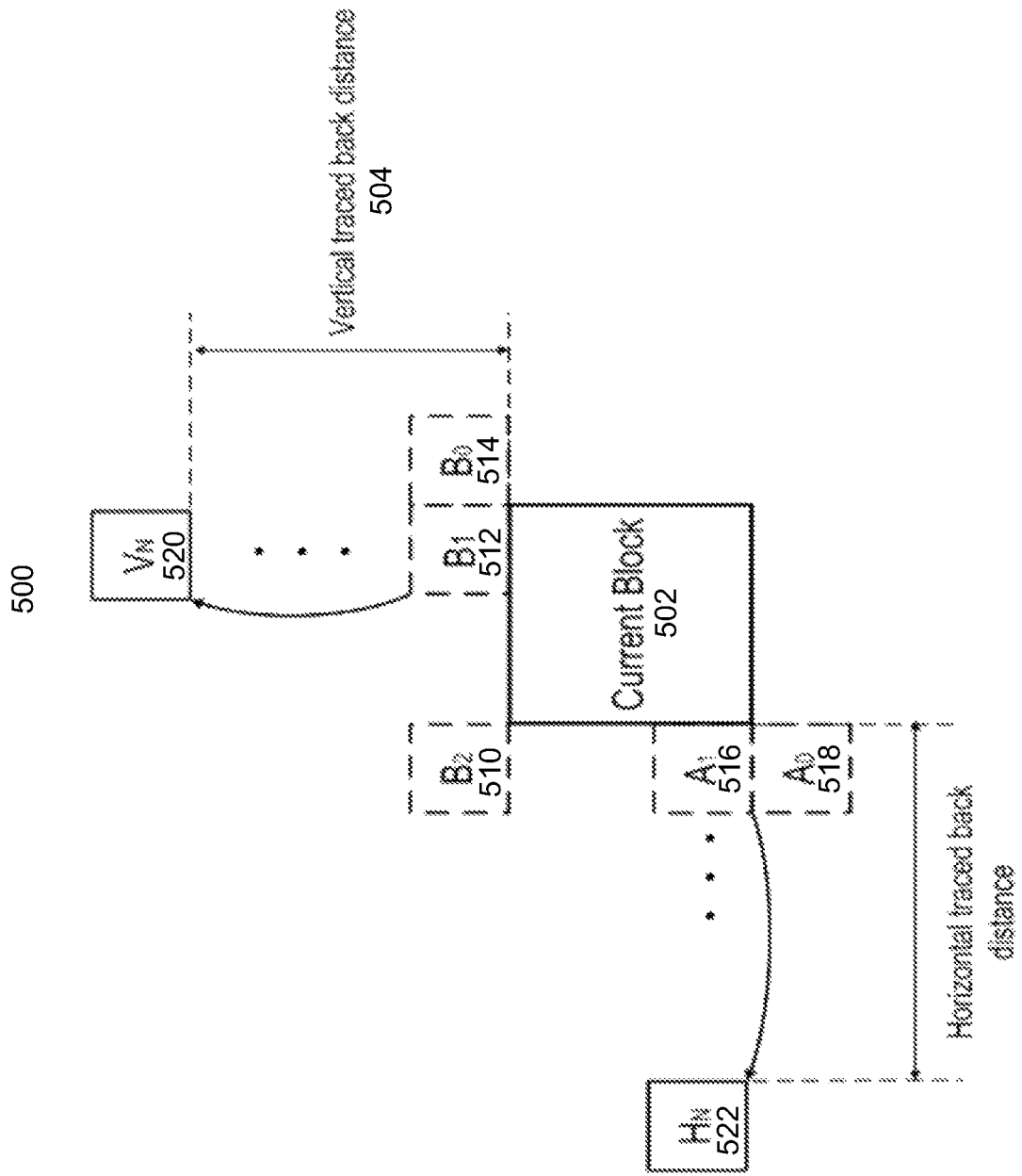
FIG. 5 is a diagram illustrating fetching of non-adjacent spatial merge candidates, in accordance with some examples.

In some examples of constructing the merge candidate list, one or more other candidates can be inserted in the merge candidate list. In some examples, the motion information of previously coded blocks which may not be adjacent to the current block can be utilized for more efficient motion vector prediction. For example, non-adjacent spatial merge candidates can be used in constructing the merge candidate list. In some cases, the construction of non-adjacent spatial merge candidates (e.g., described in JVET-K0228, which is hereby incorporated by reference in its entirety and for all purposes) involves derivation of new spatial candidates from two non-adjacent neighboring positions (e.g. from the closest non-adjacent block to the left/above, as illustrated in FIG. 5 and discussed below). The blocks can be limited within a maximum distance of 1 CTU to the current block. The fetching process of non-adjacent candidates starts with tracing the previous decoded blocks in the vertical direction. The vertical inverse tracing stops when an inter block is encountered or the traced back distance reaches 1 CTU size. The fetching process traces the previous decoded blocks in the horizontal direction. The criterion for stopping the horizontal fetching process depends on whether there is a vertical non-adjacent candidate successfully being fetched or not. If no vertical non-adjacent candidate is fetched, the horizontal fetching process stops when an inter is encountered or the traced back distance exceed one CTU size threshold. If there is a vertical non-adjacent candidate fetched, the horizontal fetching process stops when an inter block which contains different MV from the vertical non-adjacent candidate is encountered or the traced back distance exceed on CTU size threshold. In some examples, the non-adjacent spatial merge candidates can be inserted before the TMVP candidate in the merge candidate list. In some examples, the non-adjacent spatial merge candidates can be inserted before the TMVP candidate in the same merge candidate list which can include one or more of the HMVP candidates inserted after the TMVP candidate. Identifying and fetching one or more non-adjacent spatial merge candidates which can be inserted into the merge candidate list will be described with reference to FIG. 5 below.

FIG. 5 is a block diagram illustrating a picture or slice 500 which includes a current block 502 to be coded. In some examples, a merge candidate list can be constructed for coding the current block 502. For example, motion vectors for the current block can be obtained from one or more merge candidates in the merge candidate list. The merge candidate list can include determining non-adjacent spatial merge candidates. For example, the non-adjacent spatial merge candidates can include new spatial candidates derived from two non-adjacent neighboring positions relative to the current block 502.

Several adjacent or neighboring blocks of the current block 502 are shown, including an above left block $B_2$ 510 (above and to the left of the current block 502), an above block $B_1$ 512 (above the current block 502), an above right block $B_0$ 514 (above and to the right of the current block 502), a left block $A_1$ 516 (to the left of the current block 502), and a left below block $A_0$ 518 (to the left of and below the current block 502). In some examples, the non-adjacent spatial merge candidates can be obtained from one the closest non-adjacent block above and/or to the left of the current block.

In some examples, non-adjacent spatial merge candidates for the current block 502 can include tracing previously decoded blocks a vertical direction (above the current block 502) and/or in a horizontal direction (to the left of the current block 502). A vertical traced back distance 504 indicates a vertical distance relative to the current block 502 (e.g., a top boundary of the current block 502) and a vertical non-adjacent block $V_N$ 520. A horizontal traced back distance 506 indicates a horizontal distance relative to the current block 502 (e.g., a left boundary of the current block 502) and a horizontal non-adjacent block $H_N$ 522. The vertical traced back distance 504 and the horizontal traced back distance 506 are restrained to a maximum distance equal to the size of one coding tree unit (CTU).

Non-adjacent spatial merge candidates such as the vertical non-adjacent block $V_N$ 520 and the horizontal non-adjacent block $H_N$ 522 can be identified by tracing the previous decoded blocks in the vertical direction and the horizontal direction, respectively. For example, fetching the vertical non-adjacent block $V_N$ 520 can include a vertical inverse tracing process to determine whether an inter coded block exists within the vertical traced back distance 504 (constrained to a maximum size of one CTU). If such a block exists, it is identified as the vertical non-adjacent block $V_N$ 520. In some examples, a horizontal inverse tracing process may be performed subsequent to the vertical inverse tracing process. The horizontal inverse tracing process can include determine whether an inter coded block exists within the horizontal traced back distance 506 (constrained to a maximum size of one CTU), and if such a block is found, it is identified as the horizontal non-adjacent block $H_N$ 522.

In some examples, one or more of the vertical non-adjacent block $V_N$ 520 and the horizontal non-adjacent block $H_N$ 522 can be fetched for use as non-adjacent spatial merge candidates. A fetching process can include fetching the vertical non-adjacent block $V_N$ 520 if the vertical non-adjacent block $V_N$ 520 is identified in the vertical inverse tracing process. The fetching process can proceed to the horizontal inverse tracing process. If the vertical non-adjacent block $V_N$ 520 is not identified in the vertical inverse tracing process, the horizontal inverse tracing process can be terminated when an inter coded block is encountered or the horizontal traced back 506 distance exceeds the maximum distance. If the vertical non-adjacent block $V_N$ 520 is identified and fetched, the horizontal inverse tracing process is terminated when an inter coded block is encountered which contains a different MV than the MV contained in the vertical non-adjacent block $V_N$ 520 or if the horizontal traced back 506 distance exceeds the maximum distance. As previously noted, one or more of the fetched non-adjacent spatial merge candidates such as the vertical non-adjacent block $V_N$ 520 and the horizontal non-adjacent block $H_N$ 522 are added before the TMVP candidate in the merge candidate list.

Referring back to FIG. 4, in some cases, the HMVP candidates can also be used in constructing an AMVP candidate list. In an AMVP candidate list construction process, some or all of the HMVP candidates stored in the entries of the same HMVP table 400 (or a different HMVP table than the one used for the merge candidate list construction) can be inserted in the AMVP candidate list. In some examples, inserting the HMVP candidates in the AMVP candidate list can include inserting a set of entries (e.g., a number of k most recent or least recent entries) of the HMVP candidates after the TMVP candidate in the AMVP candidate list. In some examples, the above-described pruning process can be applied on the HMVP candidates in constructing the AMVP candidate list. In some examples, only those HMVP candidates with a reference picture which is the same as an AMVP target reference picture may be used to construct the AMVP candidate list.

Accordingly, the history-based motion vector predictor (HMVP) prediction mode can involve the use of a history-based lookup table such as the HMVP table 400 which includes one or more HMVP candidates. The HMVP candidates can be used in inter-prediction modes, such as the merge mode and the AMVP mode. In some examples, different inter-prediction modes can use different methods to select HMVP candidates from the HMVP table 400.

In some cases, alternative motion vector prediction designs can be used. For example, alternative designs for spatial MVP (S-MVP) prediction and temporal MVP (T-MVP) prediction can be utilized. For instance, in some implementations of merge mode (in some cases merge mode can be referred to as Skip mode or Direct mode), the spatial and temporal MVP candidates shown in FIG. 6A, FIG. 6B, and FIG. 6C can be visited (or searched or selected) in the given order shown in the figures to fill the MVP list.

Figure 6A:
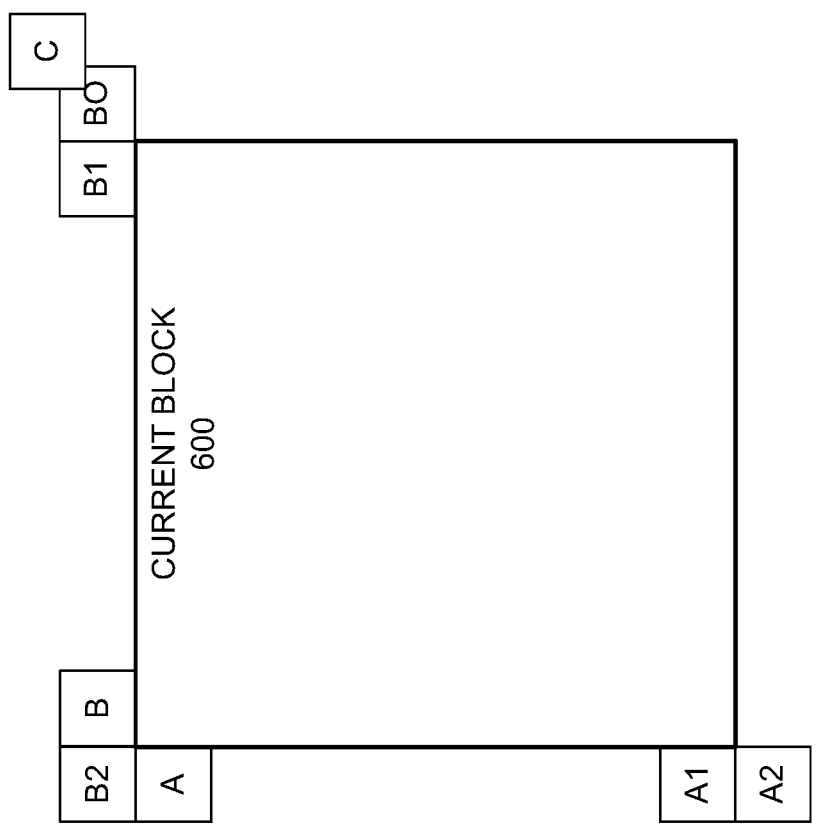
FIG. 6A is a diagram illustrating spatial and temporal locations utilized in MVP prediction, in accordance with some examples.
Figure 6B:
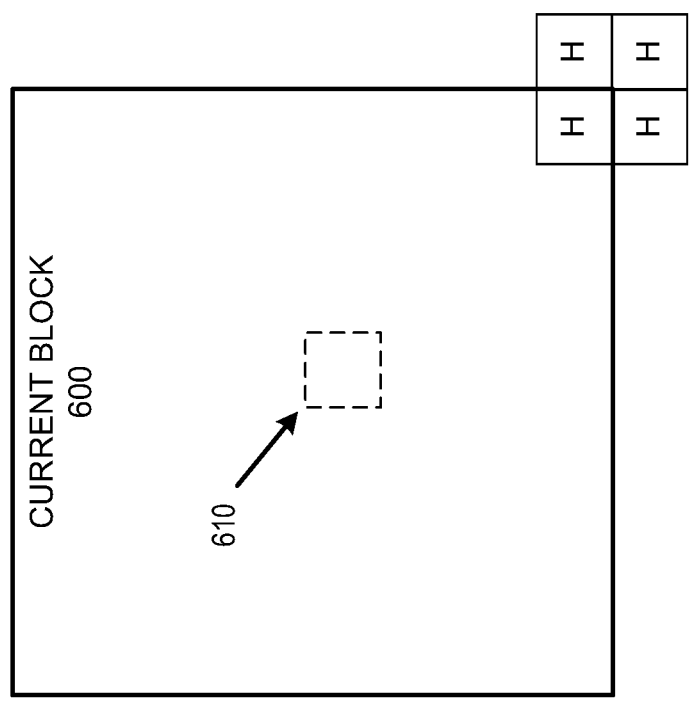
FIG. 6B is a diagram illustrating aspects of spatial and temporal locations utilized in MVP prediction, in accordance with some examples.
Figure 6C:
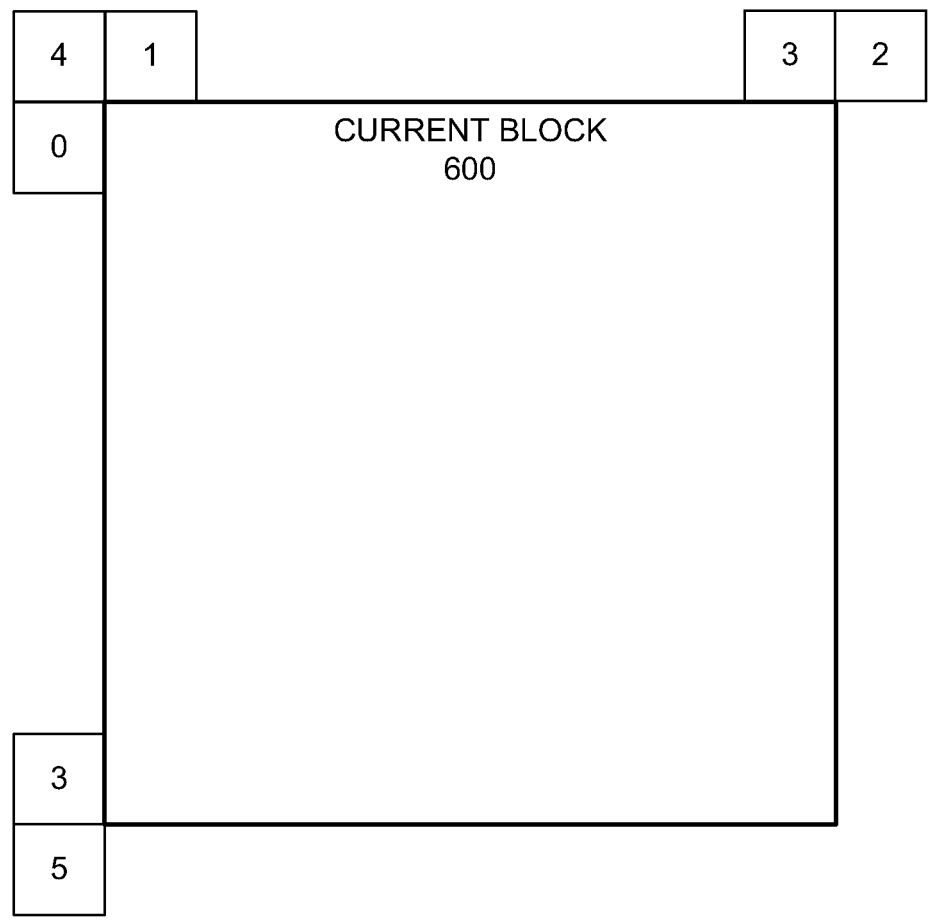
FIG. 6C is a diagram illustrating visiting order for a Spatial-MVP (S-MVP), in accordance with some examples.
Figure 6D:
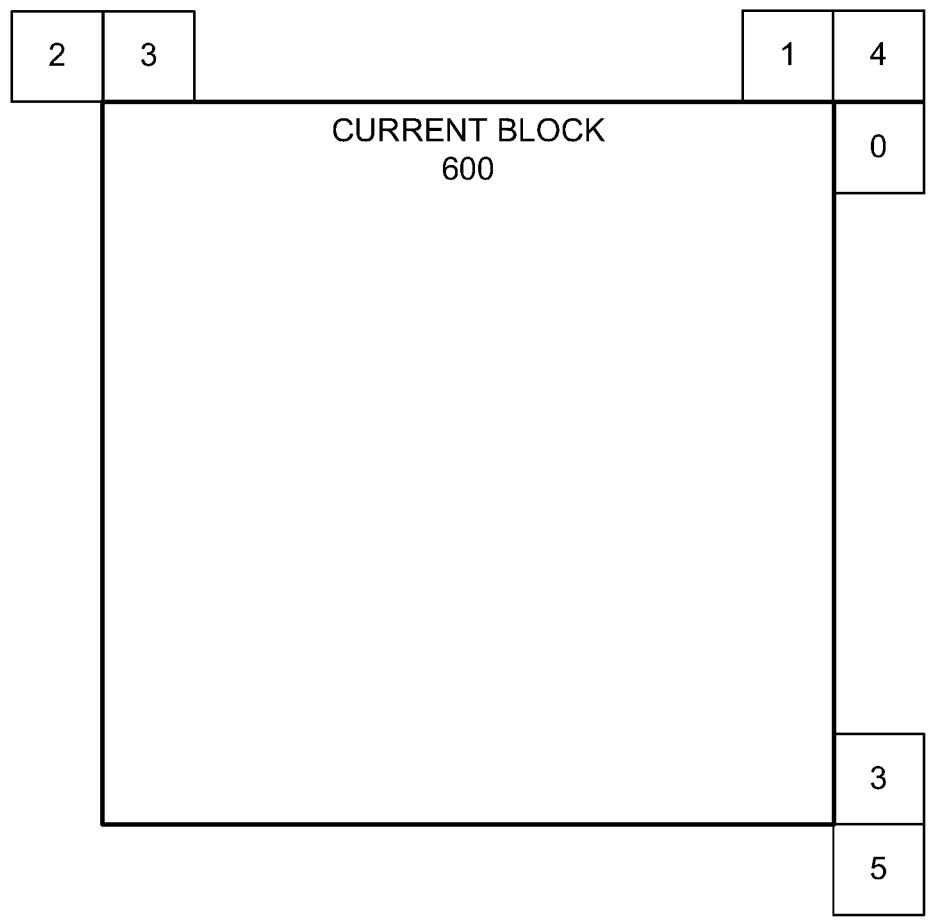
FIG. 6D is a diagram illustrating a spatially inverted pattern alternative, in accordance with some examples.

FIG. 6A illustrates locations of MVP candidates A, B, (C, A1|B1), A0, B2 for current block 600. FIG. 6B illustrates temporally collocated neighbors at center position 610 with fallback candidates H for current block 600. Spatial and temporal locations utilized in MVP prediction are as shown in FIG. 6A. An example of the visiting order (e.g., search order or selection order) for S-MVP is shown in FIG. 6C with search ordered blocks 0, 1, 2, 3, 4, and 5. A spatially inverted pattern (as compared to the order in FIG. 6C) alternative is for search ordered blocks 0-5 is shown in FIG. 6D.

The spatial neighbors utilized as MVP candidates are A, B, (C, A1|B1), A0, B2, which is implemented with a two-stage process, with the visiting order marked in FIG. 6C:

1. Group 1:
   a. A, B, C (collocated with B0 in HEVC notation)
   b. A1 or B1, depending on availability of MVP in C location and type of block partitioning.
2. Group 2:
   a. A0 and B2

Temporally collocated neighbors utilized as MVP candidates are block collocated at the center position 610 of the current block and the block at the most bottom-right location outside of the current block:

1. Group 3:
   a. C, H
   b. If the H location is found to be outside of the collocated picture, fall back H positions can be used instead.

In some implementation, depending on the block partitioning used and coding order, and inverse S-MVP candidates order can be used, as shown in FIG. 6D.

In HEVC and earlier video coding standards, only a translational motion model is applied for motion compensation prediction (MCP). For example, a translational motion vector can be determined for each block (e.g., each CU or each PU) of a picture. However, in the real world, there are more kinds of motions other than translational motion, including zooming (e.g., zooming in and/or out), rotation, perspective motions, among other irregular motions. In the Joint exploration model (JEM) by ITU-T VCEG and MPEG, an affine transform motion compensation prediction can be applied to improve coding efficiency using an affine coding mode.

Figure 7:
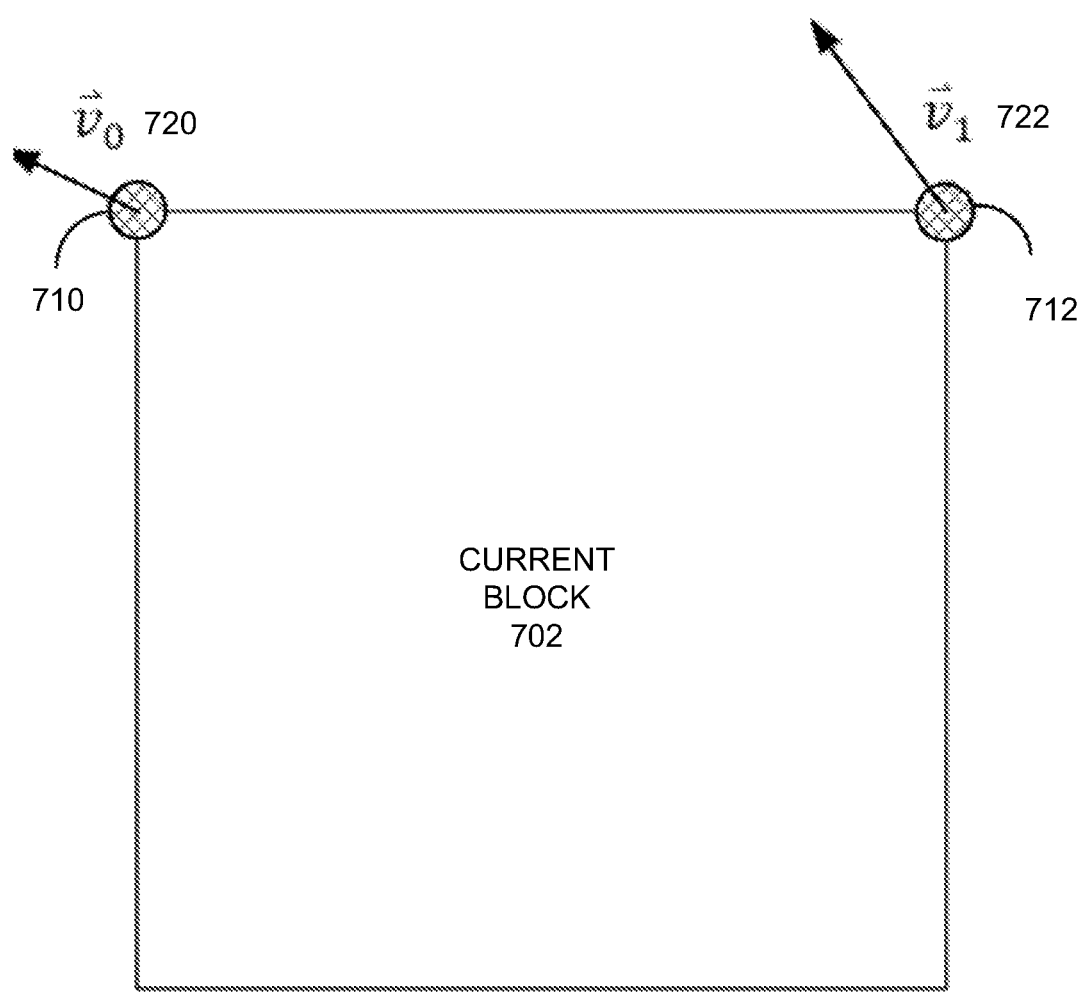
FIG. 7 is a diagram illustrating a simplified affine motion model for a current block, in accordance with some examples.

FIG. 7 is a diagram which illustrates an affine motion field of a current block 702 described by two motion vectors shown as vector 720 ($\vec{v}_0$) and vector 722 ($\vec{v}_1$) of two corresponding control points 510 and 512. Using the motion vector 720 $\vec{v}_0$ of the control point 710 and the motion vector 722 $\vec{v}_1$ of the control point 712, the motion vector field (MVF) of the current block 702 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases}$$ Equation (1)

In equation (1), $v_x$ and $v_y$ form the motion vector for each pixel within the current block 702, x and y provide the position of each pixel within the current block 702 (e.g., the top-left pixel in a block can have coordinate or index (x, y)=(0,0)), and ($v_{0x}$, $v_{0y}$) is the motion vector of the top-left corner control point 710, w is the width of the current block 702, and ($v_{1x}$, $v_{1y}$) is the motion vector 722 of the top-right corner control point 712. The $v_{0x}$ and $v_{1x}$ values are horizontal values for the respective motion vectors, and $v_{0y}$ and $v_{1y}$ values are the vertical values for the respective motion vectors. Additional control points (e.g., four control points, six control points, eight control points, or some other number of control points) can be defined by adding additional control point vectors, for example at the lower corners of the current block 702, the center of the current block 702, or other position in the current block 702.

Equation (1) above illustrates a 4-parameters motion model, where the four affine parameters a, b, c, and d are defined as:

$$a = \frac{(v_{1x} - v_{0x})}{w}; b = \frac{(v_{1y} - v_{0y})}{w}, c = v_{0x};$$

and d=$v_{0y}$. Using equation (1), given the motion vector ($v_{0x}$, $v_{0y}$) of the top-left corner control point 710 and the motion vector ($v_{1x}$, $v_{1y}$) of the top-right corner control point 712, the motion vector for every pixel of the current block can be calculated using the coordinate (x, y) of each pixel location. For instance, for the top-left pixel position of the current block 702, the value of (x, y) can be equal to (0, 0), in which case the motion vector for the top-left pixel becomes $V_x$=$v_{0x}$ and $V_y$=$v_{0y}$. In order to further simplify the MCP, block-based affine transform prediction can be applied.

Figure 8:
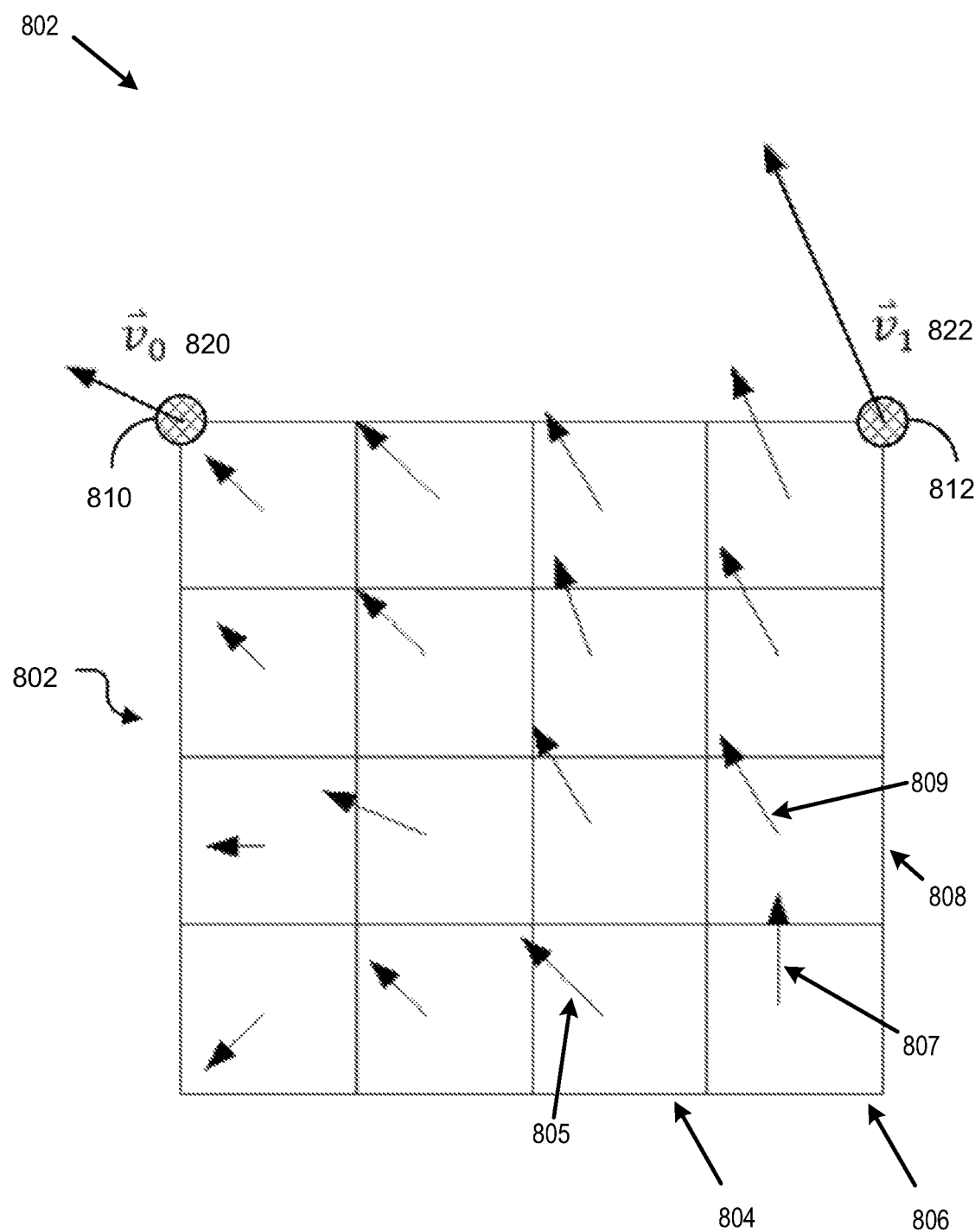
FIG. 8 is a diagram illustrating a motion vector field of sub-blocks of a block, in accordance with some examples.

FIG. 8 is a diagram which illustrates block-based affine transform prediction of a current block 802 (e.g., which can be similar to current block 600 or current block 702) divided into sub-blocks, including illustrated sub-blocks 804, 806, and 808. The example shown in FIG. 8 includes a 4×4 partition, with sixteen total sub-blocks. Any suitable partition and corresponding number of sub-blocks can be used in other examples. A motion vector can be derived for each sub-block using equation (1). In some examples, derive a motion vector of each the 4×4 sub-blocks, the motion vector of the center sample of each sub-block (as shown in FIG. 8) is calculated according to equation (1), as illustrated by motion vector 805 derived for sub-block 804, motion vector 807 derived for sub-block 806, and motion vector 809 derived for sub-block 808, each from a center sample of the corresponding sub-block. In other examples, other samples can be used. In some examples, each resulting motion vector can be rounded, for example to a 1/16 fraction accuracy or other suitable accuracy (e.g., ¼, ⅛, or the like). Motion compensation can be applied using the derived motion vectors of the sub-blocks to generate the prediction of each sub-block. For example a decoding device can receive the four affine parameters (a, b, c, d) describing the motion vectors $\vec{v}_0$ 820 the control point 810 and the motion vector $\vec{v}_1$ 822 of the control point 812, and can calculate the per-sub-block motion vector according to the pixel coordinate index describing the location of the center sample of each sub-block. After MCP, the high accuracy motion vector of each sub-block can be rounded, as noted above, and can be saved as the same accuracy as the translational motion vector. In addition, in some examples, the motion vectors in an affine mode can be limited to limit the reference data to be used during affine coding operations that use the motion vectors as affine motion vectors in an affine coding mode. In some such examples, clipping can be applied to such vectors, as described in more detail below, particularly with respect to FIGS. 18A, 18B, and 18C.

Figure 9:
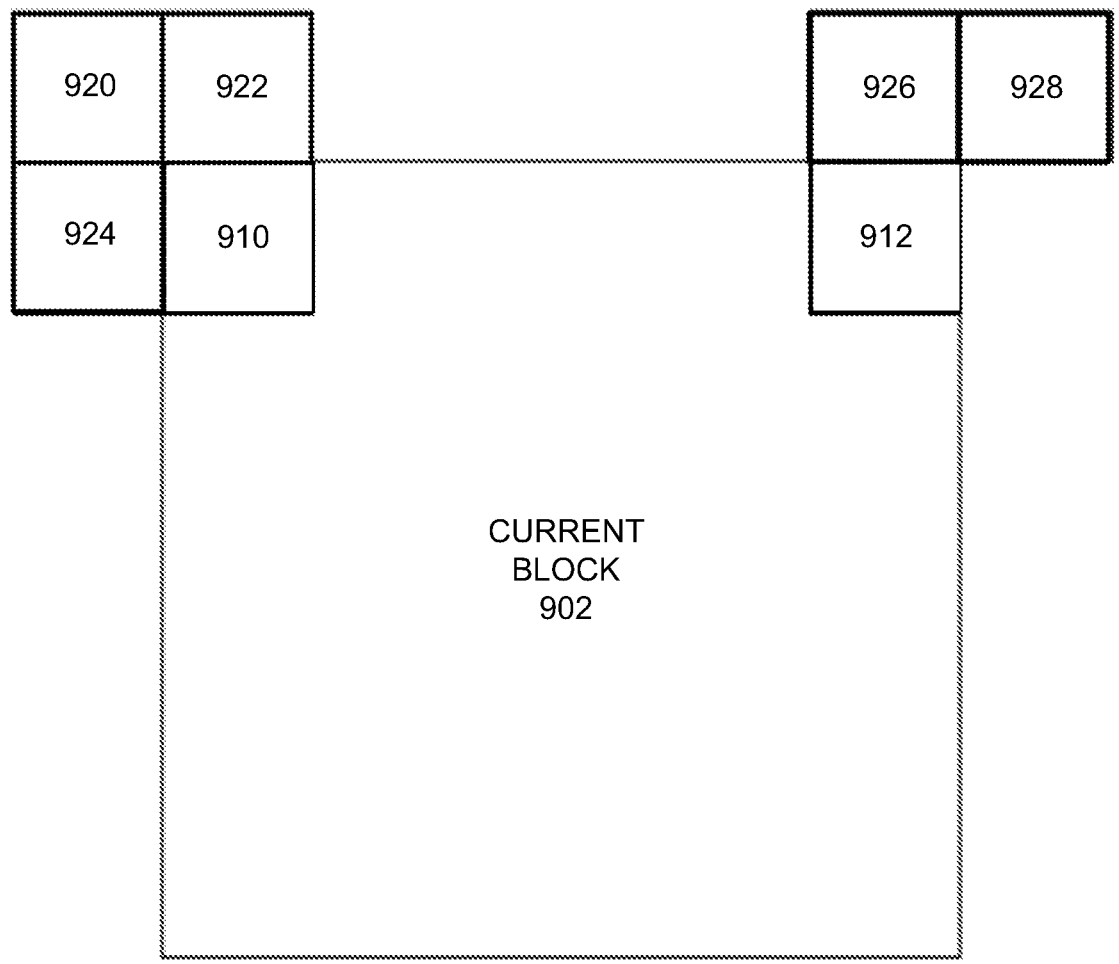
FIG. 9 is a diagram illustrating motion vector prediction in an affine inter (AF_INTER) mode, in accordance with some examples.

FIG. 9 is a diagram illustrating an example of motion vector prediction in affine inter (AF_INTER) mode. In JEM, there are two affine motion modes: affine inter (AF_INTER) mode and affine merge (AF_MERGE) mode. In some examples, when a CU has a width and height larger than 8 pixels, AF_INTER mode can be applied. An affine flag can be placed (or signaled) in the bitstream in relation to a block (e.g., at the CU level), to indicate whether AF_INTER mode was applied to the block. In the example of FIG. 9, in AF_INTER mode, a candidate list of motion vector pairs can be constructed using neighboring blocks. For example, for a sub-block 910, located in the upper left corner of a current block 902, a motion vector $v_0$ can be selected from a neighboring block 920 above and to the left of the sub-block 910, neighboring block B 922 above the sub-block 910, and neighboring block C 924 to the left of the sub-block 910. As a further example, for a sub-block 912, located in the upper right corner of the current block 902, a motion vector $v_1$ can be selected from neighboring block D 926 and neighboring block E 928 in the above and the above-right directions, respectively. A candidate list of motion vector pairs can be constructed using the neighboring blocks. For example, given motion vectors $v_A$, $v_B$, $v_C$, $v_D$, and $v_E$ corresponding to blocks A 920, B 922, C 924, D 926, and E 928, respectively, the candidate list of motion vector pairs can be expressed as $\{(v_0, v_1)|v_0=\{v_A, v_B, v_C\}, v_1=\{v_D, v_E\}\}$.

As noted above and as shown in FIG. 9, in AF_INTER mode, the motion vector $v_0$ can be selected from the motion vectors of the blocks A 920, B 922, or C 924. The motion vector from the neighboring block (e.g., block A, B, or C) can be scaled according to the reference list and the relationship among the POC of the reference for the neighboring block, the POC of the reference for the current CU (e.g., the current block 902), and the POC of the current CU. In these examples, some or all of the POCs can be determined from a reference list. Selection of $v_1$ from the neighboring blocks D 926 or E 928 is similar to the selection of $v_0$.

In some cases, if the number of candidate lists is less than two, the candidate list can be padded with motion vector pairs by duplicating each of the AMVP candidates. When the candidate list is larger than two, in some examples, the candidates in the candidate list can first be sorted according to the consistency of the neighboring motion vectors (e.g., consistency can be based on the similarity between the two motion vectors in a motion vector pair candidate). In such examples, the first two candidates are kept and the rest may be discarded.

In some examples, a rate-distortion (RD) cost check can used to determine which motion vector pair candidate is selected as the control point motion vector prediction (CPMVP) of the current CU (e.g., the current block 902). In some cases, an index indicating the position of the CPMVP in the candidate list can be signaled (or otherwise indicated) in the bitstream. Once the CPMVP of the current affine CU is determined (based on the motion vector pair candidate), affine motion estimation can be applied, and the control point motion vector (CPMV) can be determined. In some cases, the difference of the CPMV and the CPMVP can be signalled in the bitstream. Both CPMV and CPMVP include two sets of translational motion vectors, in which case the signaling cost of affine motion information is higher than that of translational motion.

Figure 10:
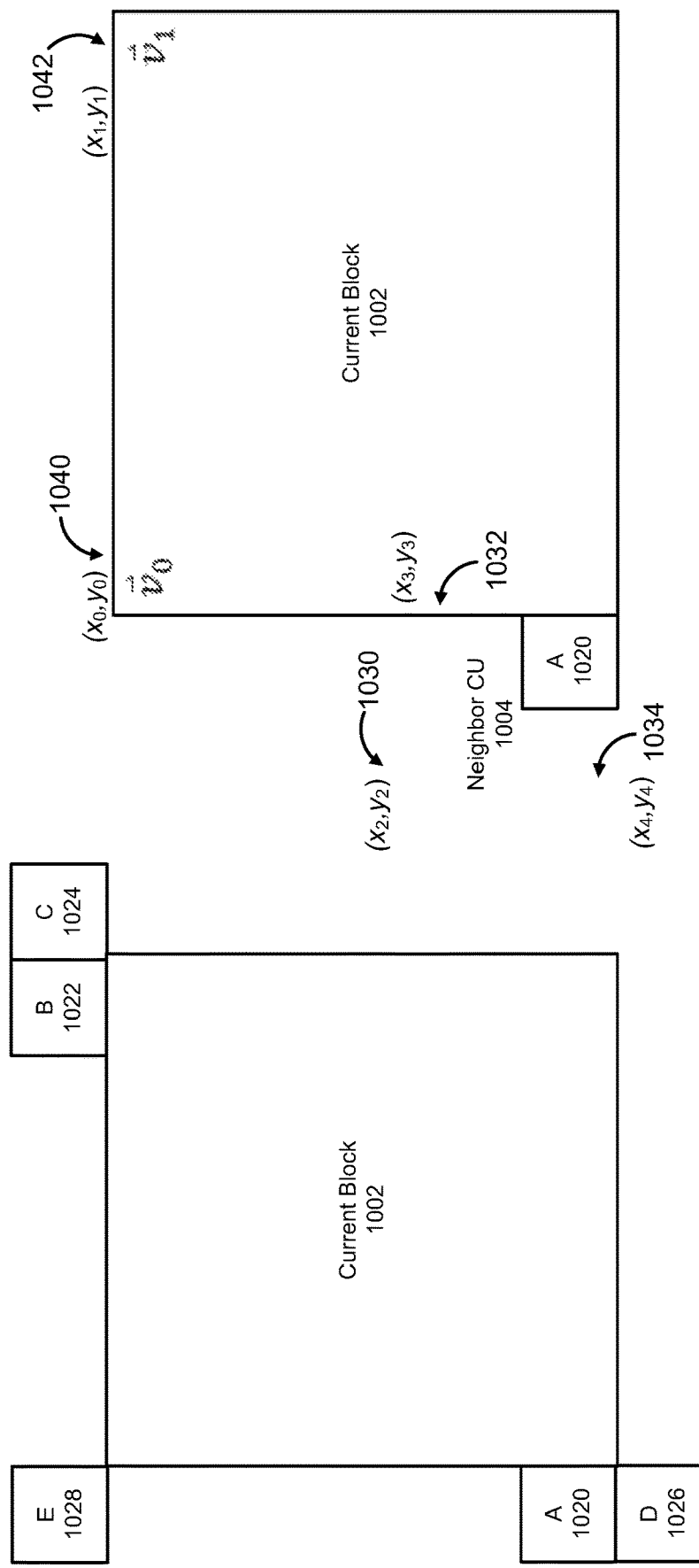
FIG. 10A and FIG. 10B are diagrams illustrating a motion vector prediction in an affine merge (AF_MERGE) mode, in accordance with some examples.

FIG. 10A and FIG. 10B illustrate an example of motion vector prediction in AF_MERGE mode. When a current block 802 (e.g., a CU) is coded using AF_MERGE mode, a motion vector can be obtained from a valid neighboring reconstructed block. For example, the first block from the valid neighbor reconstructed blocks that is coded with affine mode can be selected as the candidate block. As shown in FIG. 10A, the neighboring block can be selected from among a set of neighboring blocks A 1020, B 1022, C 1024, D 1026, and E 1028. The neighboring blocks may be considered in a particular selection order for being selected as the candidate block. One example of a selection order is the left neighbor (e.g., block A 1020), followed by the above neighbor (block B 1022), the above right neighbor (block C 1024), the left bottom neighbor (block D 1026), and the above left neighbor (block E 1028).

As noted above, the neighboring block that is selected can be the first block (e.g., in the selection order) that has been coded with affine mode. For example, block A 820 may have been coded in affine mode. As illustrated in FIG. 10B, block A 1020 can be included in a neighboring CU 1004. For the neighboring CU 1004, motion vectors for the top left corner ($v_2$ 1030), above right corner ($v_3$ 1032), and left bottom corner ($v_4$ 1034) of the neighboring CU 1004 may have been derived. In the above example, a control point motion vector, $v_0$ 1040, for the top left corner of the current block 1002 is calculated according to $v_2$ 1030, $v_3$ 1032, and $v_4$ 1034. The control point motion vector, $v_1$ 1042, for the top right corner of the current block 1002 can be determined.

Once the control point motion vectors (CPMV), $v_0$ 1040 and $v_1$ 1042, of the current block 1002 have been derived, equation (1) can be applied to determine a motion vector field for the current block 1002. In order to identify whether the current block 1002 is coded with AF_MERGE mode, an affine flag can be included in the bitstream when there is at least one neighboring block coded in affine mode.

In many cases, the process of affine motion estimation includes determining affine motion for a block at the encoder side by minimizing the distortion between the original block and the affine motion predicted block. As affine motion has more parameters than translational motion, affine motion estimation can be more complicated than translational motion estimation. In some cases, a fast affine motion estimation method based on Taylor expansion of signal can be performed to determine the affine motion parameters (e.g., affine motion parameters a, b, c, d in a 4-parameters model).

The fast affine motion estimation can include a gradient-based affine motion search. For example, given a pixel value $I_t$ at time t (with t0 being the time of the reference picture), the first order Taylor expansion for the pixel value $I_t$ can be determined as:

$$I_t = I_{t0} + \frac{\partial I_{t0}}{\partial t}(t - t0) = \qquad \text{Equation (2)}$$
$$I_{t0} + \frac{\partial I_{t0}}{\partial x} \cdot \frac{\partial x}{\partial t} \cdot (t - t_0) + \frac{\partial I_{t0}}{\partial y} \cdot \frac{\partial y}{\partial t} \cdot (t - t_0)$$

Where $$\frac{\partial I_{t0}}{\partial x} \text{ and } \frac{\partial I_{t0}}{\partial y}$$

are the pixel gradient $G_{0x}$, $G_{0y}$ in the x and y directions, respectively, while $$\frac{\partial x}{\partial t} \cdot (t - t_0) \text{ and } \frac{\partial y}{\partial t} \cdot (t - t_0)$$

indicate the motion vector components $V_x$ and $V_y$ for the pixel value $I_t$. The motion vector for the pixel $I_t$ in the current block points to a pixel $I_{t0}$ in the reference picture.

The equation (2) can be rewritten as equation (3) as follows:

$$I_t = I_{t0} + G_{x0} \cdot V_x + G_{y0} \cdot V_y \qquad \text{Equation (3)}$$

The affine motion $V_x$ and $V_y$ for the pixel value $I_t$ can be solved by minimizing the distortion between the prediction ($I_{t0} + G_{x0} \cdot V_x + G_{y0} \cdot V_y$) and the original signal. Taking 4-parameters affine model as an example, $$V_x = a \cdot x - b \cdot y + c \qquad \text{Equation (4)}$$

$$V_y = b \cdot x + a \cdot y + d, \qquad \text{Equation (5)}$$

where x and y indicate the position of a pixel or sub-block. Taking equations (4) and (5) into equation (3), and minimizing the distortion between original signal and the prediction using equation (3), the solution of affine parameters a, b, c, d can be determined:

$$\{a,b,c,d\} = \arg\min\{\Sigma_{i \in current\ template}(I_t^i - I_{t0}^i - G_{x0}^i \cdot (a \cdot x + b \cdot y + c) - G_{y0}^i \cdot (b \cdot x - a \cdot y + d))^2\} \qquad \text{Equation (6)}$$

Once the affine motion parameters are determined, which define the affine motion vectors for the control points, the per-pixel or per-sub-block motion vectors can be determined using the affine motion parameters (e.g., using equations (4) and (5), which are also represented in equation (1)). Equation (3) can be performed for every pixel of a current block (e.g., a CU). For example, if a current block is 16 pixels×16 pixels, the least squares solution in equation (6) can be used to derive the affine motion parameters (a, b, c, d) for the current block by minimizing the overall value over the 256 pixels.

Any number of parameters can be used in affine motion models for video data. For instance, a 6-parameters affine motion or other affine motion can be solved in the same way as that described above for the 4-parameters affine motion model. For example, a 6-parameters affine motion model can be described as:

$$\begin{cases} v_x = ax + by + e \\ v_y = cx + dy + f \end{cases} \quad \text{Equation 7}$$

In equation (7), $(v_x, v_y)$ is the motion vector at the coordinate (x, y), and a, b, c, d, e, and f are the six affine parameters. The affine motion model for a block can also be described by the three motion vectors (MVs) $\vec{v}_0=(v_{0x}, v_{0y})$, $\vec{v}_1=(v_{1x}, v_{1y})$, and $\vec{v}_2=(v_{2x}, v_{2y})$ at three corners of the block.

Figure 11:
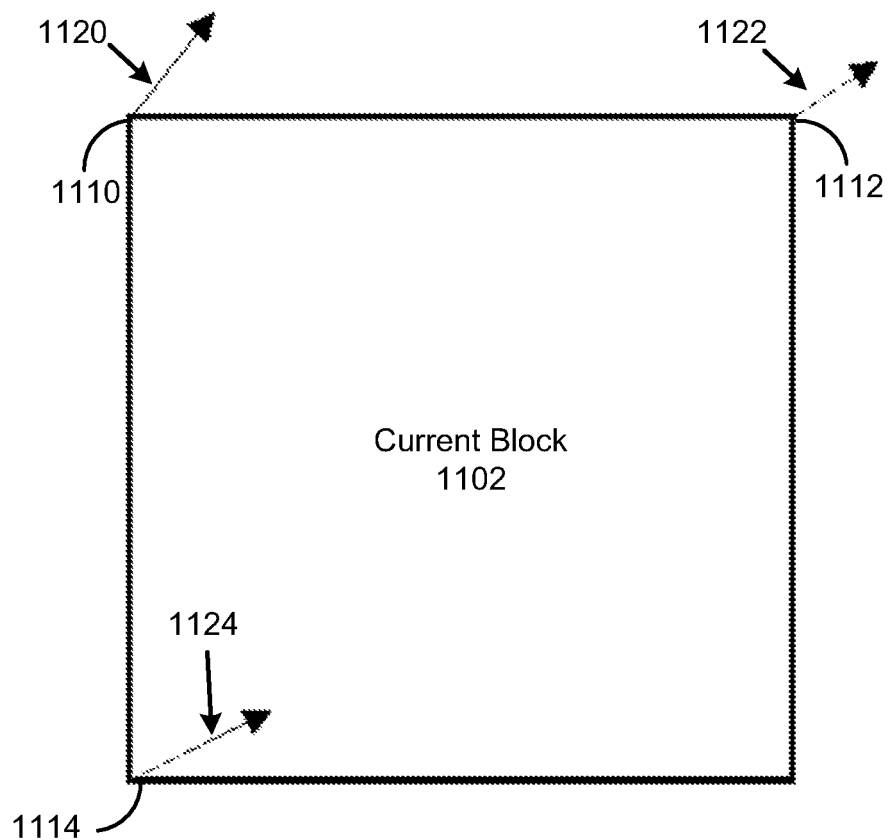
FIG. 11 is a diagram illustrating an affine motion model for a current block, in accordance with some examples.

FIG. 11 is a diagram which illustrates an affine motion filed of a current block 1102 described by three motion vectors 1120, 1122, and 1124 at three corresponding control points 1110, 1112, and 1114. The motion vector 1120 (e.g., $\vec{v}_0$) is at the control point 1110 located at the top-left corner of the current block 1102, the motion vector 1122 (e.g., $\vec{v}_1$) is at the control point 1112 located at the top-right corner of the current block 1102, and the motion vector 1124 (e.g., $\vec{v}_2$) is at the control point 1114 located at the bottom-left corner of the current block 1102. The motion vector field (MVF) of the current block 1102 can be described by the following equation:

$$\begin{cases} v_x = \frac{(v_{1x} - v_{0x})}{w} x + \frac{(v_{2x} - v_{0x})}{h} y + v_{0x} \\ v_y = \frac{(v_{1y} - v_{0y})}{w} x + \frac{(v_{2y} - v_{0y})}{h} y + v_{0y} \end{cases}, \quad \text{Equation (8)}$$

Equation (8) represents a 6-parameters affine motion model where w and h are the width and height of the current block 1102.

While a 4-parameters motion model was described with reference to equation (1) above, a simplified 4-parameters affine model using the width and the height of the current block can be described by the following equation:

$$\begin{cases} v_x = ax - by + e \\ v_y = bx + ay + f \end{cases} \quad \text{Equation (9)}$$

The simplified 4-parameters affine model for a block based on equation (9) can be described by two motion vectors $\vec{v}_0=(v_{0x}, v_{0y})$ and $\vec{v}_1=(v_{1x}, v_{1y})$ at two of four corners of the block. The motion field can be described as:

$$\begin{cases} v_x = \frac{(v_{1x} - v_{0x})}{w} x - \frac{(v_{1y} - v_{0y})}{h} y + v_{0x} \\ v_y = \frac{(v_{1y} - v_{0y})}{w} x + \frac{(v_{1x} - v_{0x})}{h} y + v_{0y} \end{cases} \quad \text{Equation (10)}$$

As previously mentioned, the motion vector $\vec{v}_i$ is referred to herein as a control point motion vector (CPMV). The CPMVs for the 4-parameters affine motion model are not necessarily the same as the CPMVs for the 6-parameters affine motion model. In some examples, different CPMVs can be selected for the affine motion model.

Figure 12:
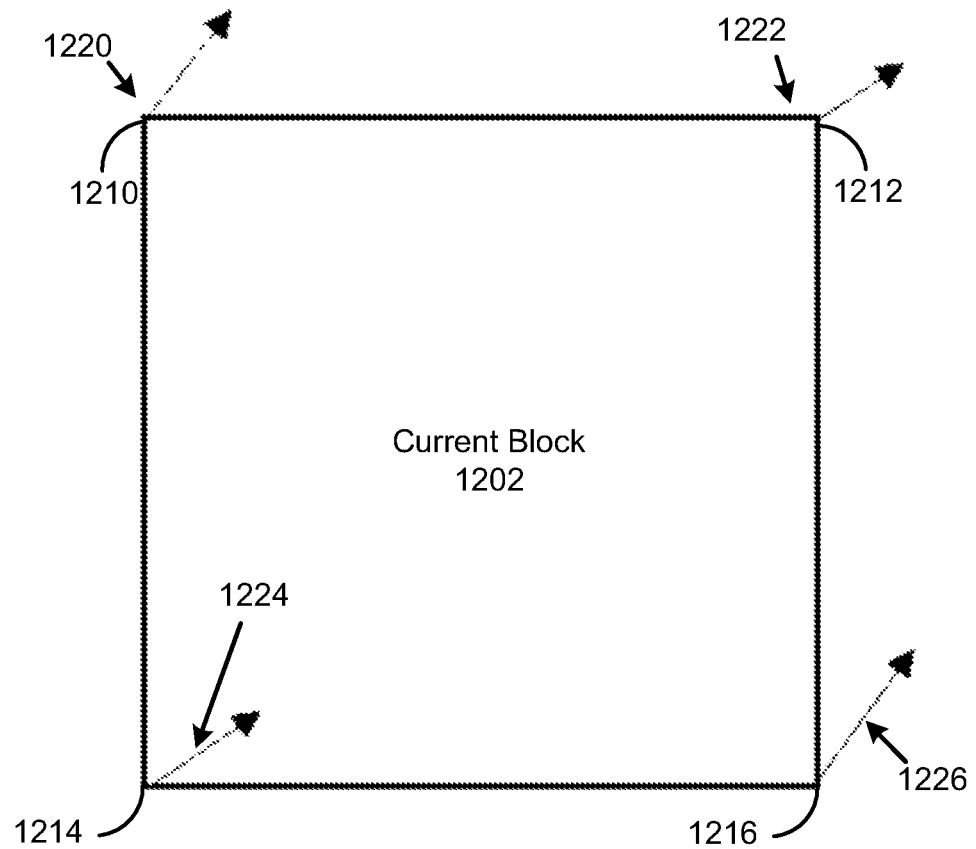
FIG. 12 is a diagram illustrating another affine motion model for a current block, in accordance with some examples.

FIG. 12 is a diagram which illustrates selection of control point vectors for an affine motion model of a current block 1202. Four control points 1210, 1212, 1214, and 1216 are illustrated for the current block 1202. The motion vector 1220 (e.g., $\vec{v}_0$) is at the control point 1210 located at the top-left corner of the current block 1202, the motion vector 1222 (e.g., $\vec{v}_1$) is at the control point 1212 located at the top-right corner of the current block 1202, the motion vector 1224 (e.g., $\vec{v}_2$) is at the control point 1214 located at the bottom-left corner of the current block 1202, and the motion vector 1226 (e.g., $\vec{v}_3$) is at the control point 1216 located at the bottom-right corner of the current block 1202.

In an example, for a 4-parameters affine motion model (according to either equation (1) or equation (10)), control point pairs can be selected from any two of the four motion vectors $\{\vec{v}_0, \vec{v}_1, \vec{v}_2, \vec{v}_3\}$. In another example, for a 6-parameters affine motion model, the control point pairs can be selected from any three of the four motion vectors $\{\vec{v}_0, \vec{v}_1, \vec{v}_2, \vec{v}_3\}$. Based on the selected control point motion vectors, the other motion vectors for the current block 1002 can be calculated, for example, using the derived affine motion model.

In some examples, alternative affine motion model representations can also be used. For instance, an affine motion model based on delta motion vectors can be represented by an anchor motion vector $\vec{v}_0$ at a coordinate $(x_0, y_0)$, a horizontal delta motion vector $\nabla\vec{v}_h$, and a vertical delta motion vector $\nabla\vec{v}_v$. In general, a motion vector $\vec{v}$ at the coordinate (x, y) can be calculated as $\vec{v}=\vec{v}_0+x*\nabla\vec{v}_h+y*\nabla\vec{v}_v$.

In some examples, the affine motion model representation based on CPMVs can be converted to the alternative affine motion model representation with delta motion vectors. For example, $\vec{v}_0$ in the delta motion vector affine motion model representation is the same as the top-left CPMV, $\nabla\vec{v}_h=(\vec{v}_1-\vec{v}_0)/w$, $\nabla\vec{v}_v=(\vec{v}_2-\vec{v}_0)/h$. It is to be noted that for these vector operations, the addition, division, and multiplication are applied element wise.

In some examples, affine motion vector prediction can be performed using affine motion predictors. In some examples, the affine motion predictors for a current block can be derived from the affine motion vectors or normal motion vectors of the neighboring coded blocks. As described above, the affine motion predictors can include inherited affine motion vector predictors (e.g., inherited using affine merge (AF_MERGE) mode) and constructed affine motion vector predictors (e.g., constructed using affine inter (AF_INTER) mode).

An inherited affine motion vector predictor (MVP) uses one or more affine motion vectors of a neighboring coded block to derive the predicted CPMVs of a current block. The inherited affine MVP is based on an assumption that the current block shares the same affine motion model as the neighboring coded block. The neighboring coded block is referred to as a neighboring block or a candidate block. The neighboring block can be selected from different spatial or temporal neighboring locations.

Figure 13:
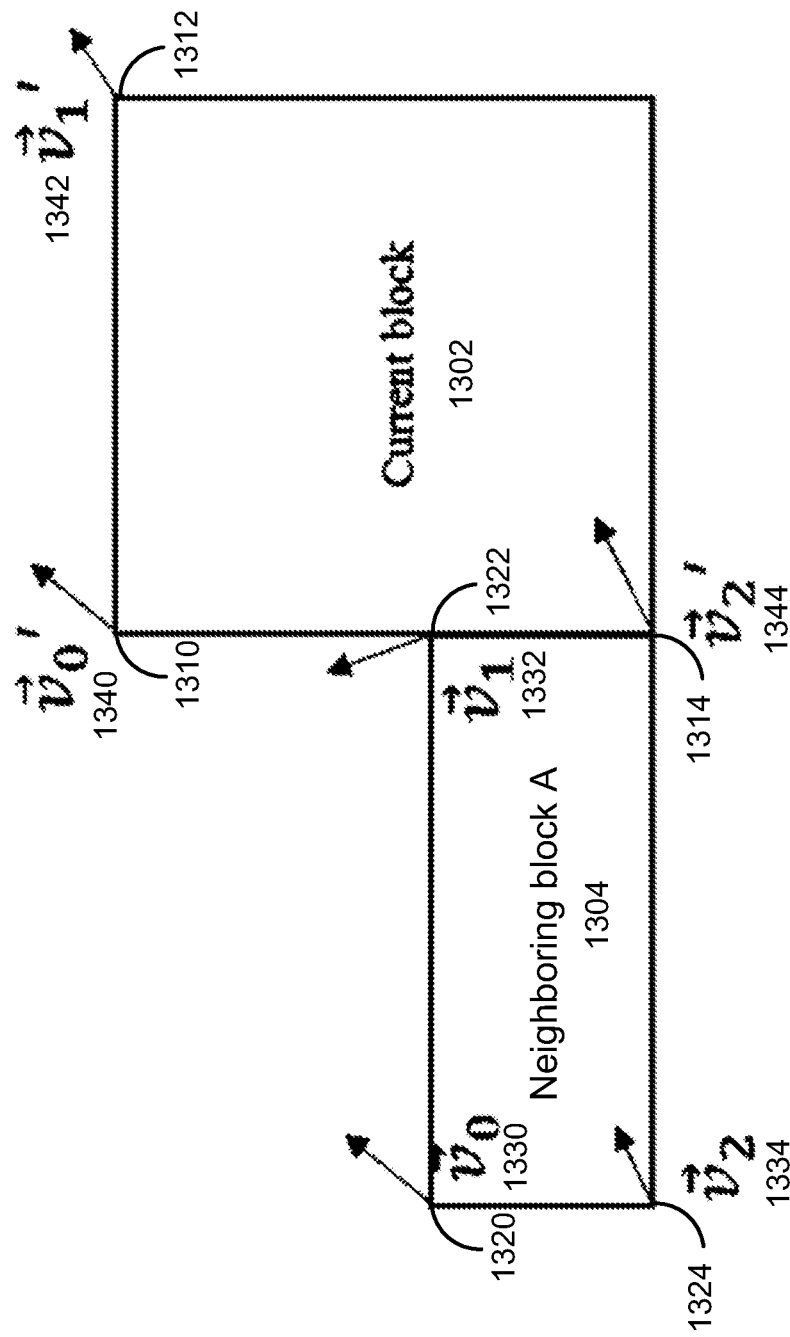
FIG. 13 is a diagram illustrating a current block and a candidate block, in accordance with some examples.

FIG. 13 is a diagram illustrating an inherited affine MVP of a current block 1302 from a neighboring block 1302 (block A). The affine motion vectors of the neighboring block 1302 are represented in terms of the respective motion vectors 1330, 1332, and 1334 $\{\vec{v}_0, \vec{v}_1, \vec{v}_2\}$ at the control points 1320, 1322, and 1324 as follows: $\vec{v}_0=(v_{0x}, v_{0y})$, $\vec{v}_1=(v_{1x}, v_{1y})$, $\vec{v}_2=(v_{2x}, v_{2y})$. In an example, the size of the neighboring block 1304 can be represented by the parameters (w, h) where w is the width and h is the height of the neighboring block 1304. The coordinates of control points of the neighboring block 1304 are represented as (x0, y0), (x1, y1), and (x2, y2). The affine motion vectors 1340, 1342, and 1344 represented as $\vec{v}'_0=(v_{0x}', v_{0y}')$, $\vec{v}'_0=(v_{1x}', v_{1y}')$, $\vec{v}'_2=(v_{2x}', v_{2y}')$ can be predicted for the current block 1302 at the respective control points 1310, 1312, and 1314. The predicted affine motion vectors $\vec{v}'_0=(v_{0x}', v_{0y}')$, $\vec{v}'_1=(v_{1x}', v_{1y}')$, $\vec{v}'_2=(v_{2x}', v_{2y}')$ for the current block 1302 can be derived by replacing (x, y) in equation (8) with the coordinate difference between the control points of the current block 1302 and the top-left control point of the neighboring block 1304 as described in the following equations:

$$\begin{cases} v'_{0x} = \frac{(v_{1x}-v_{0x})}{w}(x0'-x0) + \frac{(v_{2x}-v_{0x})}{h}(y0'-y0) + v_{0x} \\ v'_{0y} = \frac{(v_{1y}-v_{0y})}{w}(x0'-x0) + \frac{(v_{2y}-v_{0y})}{h}(y0'-y0) + v_{0y} \end{cases} \text{Equation (11)}$$

$$\begin{cases} v'_{1x} = \frac{(v_{1x}-v_{0x})}{w}(x1'-x0) + \frac{(v_{2x}-v_{0x})}{h}(y1'-y0) + v_{0x} \\ v'_{1y} = \frac{(v_{1y}-v_{0y})}{w}(x1'-x0) + \frac{(v_{2y}-v_{0y})}{h}(y1'-y0) + v_{0y} \end{cases} \text{Equation (12)}$$

$$\begin{cases} v'_{2x} = \frac{(v_{1x}-v_{0x})}{w}(x2'-x0) + \frac{(v_{2x}-v_{0x})}{h}(y2'-y0) + v_{0x} \\ v'_{2y} = \frac{(v_{1y}-v_{0y})}{w}(x2'-x0) + \frac{(v_{2y}-v_{0y})}{h}(y2'-y0) + v_{0y} \end{cases} \text{Equation (13)}$$

In equations (11)-(13), (x0', y0'), (x1', y1'), and (x2', y2') are the coordinates of control points of the current block 1102. If represented as delta MVs, $\vec{v}'_0=v_{0x}+(x0'-x0)*\nabla\vec{v}_h+(y0'-y0)*\nabla\vec{v}_v$, and $\vec{v}'_1=v_{0x}+(x1'-x0)*\nabla\vec{v}_h+(y1'-y0)*\nabla\vec{v}_v$, $\vec{v}'_2=v_{0x}+(x2'-x0)*\nabla\vec{v}_h+(y2'-y0)*\nabla\vec{v}_v$.

Similarly, if the affine motion model of the neighboring coded block (e.g., the neighboring block 1304) is a 4-parameters affine motion model, the equation (10) can be applied in deriving the affine motion vectors at the control points for the current block 1102. In some examples, using the equation (10) for obtaining the 4-parameters affine motion model can include avoiding the equation (13) above.

Figure 14:
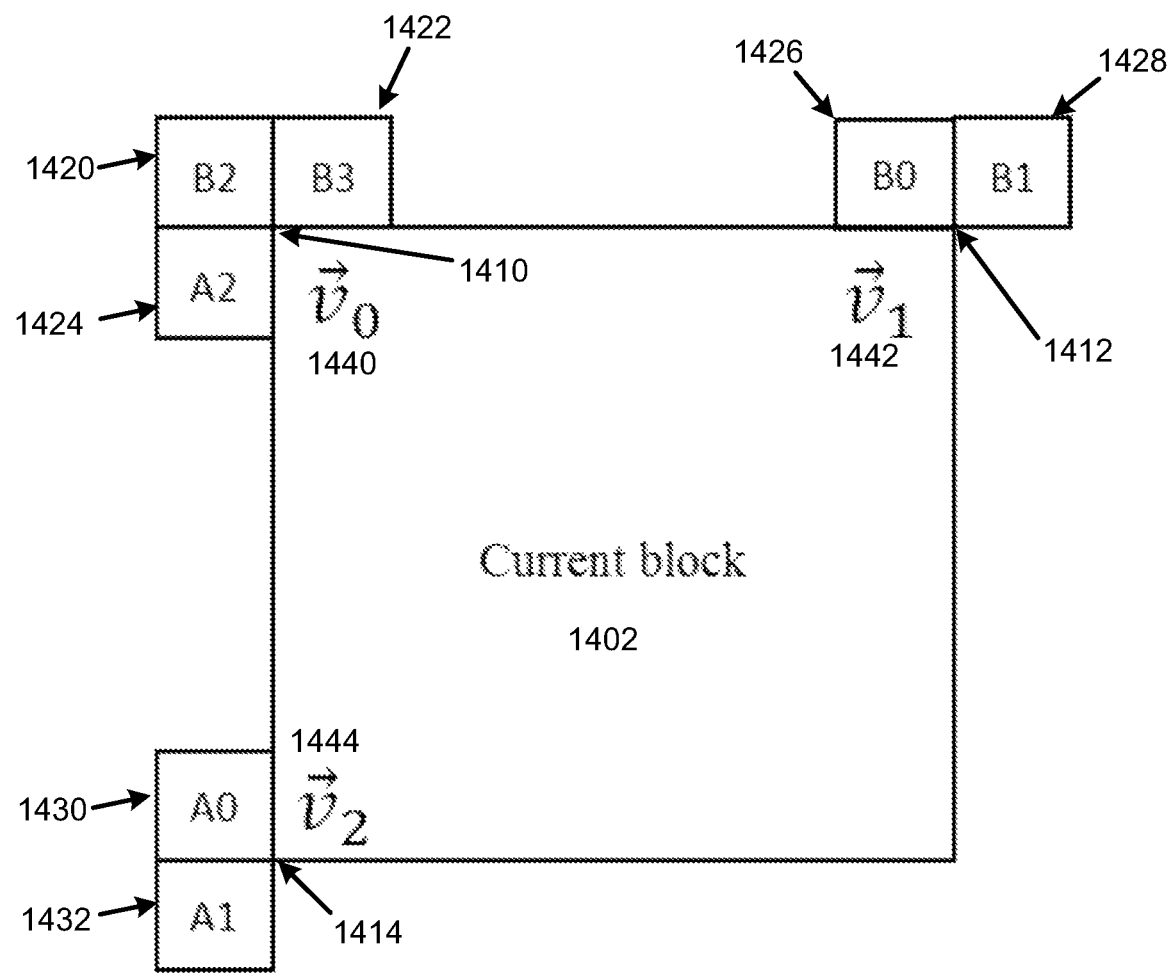
FIG. 14 is a diagram illustrating a current block, control points of the current block, and candidate blocks, in accordance with some examples.

FIG. 14 is a diagram which illustrates possible locations for a neighboring candidate block for use in the inherited affine MVP model for a current block 1402. For example, the affine motion vectors 1440, 1442, and 1444 or $\{\vec{v}_0, \vec{v}_1, \vec{v}_2\}$ at the control points 1410, 1412, and 1414 of the current block can be derived from one of the neighboring blocks 1430 (block A0), 1426 (block B0), 1428 (block B1), 1432 (block A1) and/or 1420 (block B2). In some cases the neighboring blocks 1424 (block A2) and/or 1422 (block B3) can also be used. More specifically, the motion vector 1440 (e.g., $\vec{v}_0$) at the control point 1410 located at the top left corner of the current block 1402 can be inherited from the neighboring block 1420 (block B2) located above and to the left of the control point 1410, the neighboring block 1422 (block B3) located above the control point 1410, or from the neighboring block 1424 (block A2) located to the left of the control point 1410; the motion vector 1442 or $\vec{v}_1$ at the control point 1412 located at the top right corner of the current block 1402 can be inherited from the neighboring block 1426 (block B0) located above the control point 1410 or the neighboring block 1428 (block B1) located above and to the right of the control point 1410; and the motion vector 1444 or $\vec{v}_{21}$ at the control point 1414 located at the bottom left corner of the current block 1402 can be inherited from the neighboring block 1430 (block A0) located to the left of the control point 1410 or the neighboring block 1432 (block A1) located to the left and below the control point 1410.

Currently, in some designs (e.g., in MPEG5 Essential Video Coding (EVC)), when the affine inheritance is from an affine coded neighboring block in the above CTU row, the bottom-left and bottom-right sub-block MVs are adopted as the CPMV, and the 4-parameter affine model is always used to derive the CPMV of the current CU.

Figure 15:
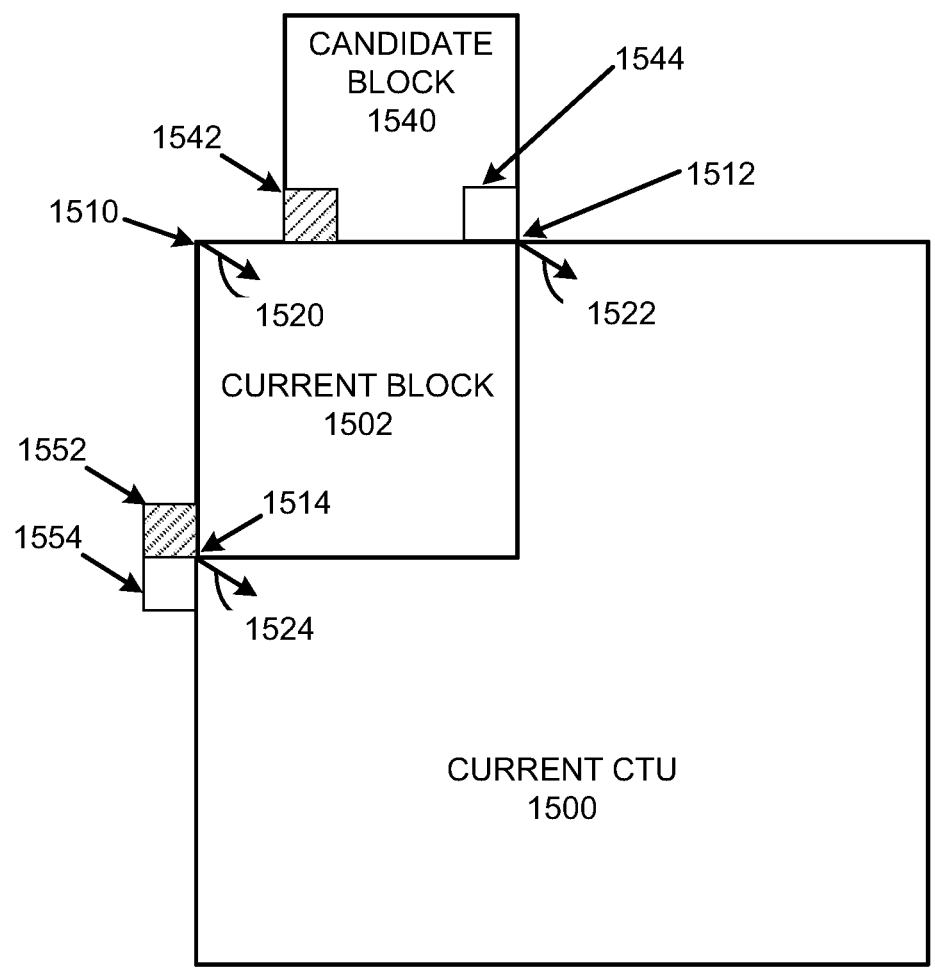
FIG. 15 is a diagram illustrating an affine model in MPEG5 EVC and spatial neighborhood, in accordance with some examples.

FIG. 15 is a diagram illustrating an affine model in MPEG5 EVC and spatial neighborhood. FIG. 15 illustrates current CTU 1500 with a neighboring candidate block 1540 having sub-blocks 1542 and 1544, as well as a left neighbor sub-block 1552 and a below-left neighbor sub-block 1554. While FIG. 15 provides an illustrative example using a CTU, in other examples, the current CTU can be another block, such as a CU, a PU, a TU, etc. The current CTU 1500 includes a current block 1502 with control points 1510, 1512, and 1514 and associated CPMVs 1520, 1522, and 1524. The top-left CPMV 1520 is referred to as $\vec{v}_0$ and the top-right CPMV 1522 shown as $\vec{v}_1$. In the illustrated example, the CPMVs 1520 and 1522 are designated as the CPMVs of the current CU (e.g., the current block 1502) that are to be derived by the motion vector for the bottom-left sub-block 1542 having an associated MV $\vec{v}_{LB}$ (not shown) and the bottom-right sub-block 1544 having motion vector $\vec{v}_{RB}$ (not shown) of the neighboring affine coded CU including candidate block 1540 located above current CTU 1500. The CPMVs 1520 and 1522 are shown as $\vec{v}_0$ and $\vec{v}_1$ in FIG. 15, and can be derived by the following equation:

$$\vec{v}_0 = \frac{\vec{v}_{RB}-\vec{v}_{LB}}{neiW}*(posCurX - posNeiX)+\vec{v}_{LB} \quad \text{Equation (14)}$$

$$\vec{v}_1 = \frac{\vec{v}_{RB}-\vec{v}_{LB}}{neiW}*(posCurX + curW - posNeiX)+\vec{v}_{LB}$$

where neiW is the width of the neighboring block, curW is the width of current block, posNeiX is the x coordinate of the top-left pixel (or sample in some examples) of the neighboring block, and posCurX is the x coordinate of the top-left pixel (or sample in some examples) of the current block.

There are three affine prediction motion modes in some cases: AF_4_INTER mode, AF_6_INTER, and AF_MERGE mode. When a merge/skip flag is true (e.g., equal to a value of 1), and both width and height for the CU are larger than or equal to 8 samples (or other number of samples), an affine flag at the CU level (or other block level) is signalled in the bitstream to indicate whether affine merge mode is used. And when the CU is coded as AF_MERGE, the merge candidate index with maximum value 4 (or other value in some cases) is signalled for specifying which motion information candidate in the affine merge candidate list is used for the CU.

The affine merge candidate list can be constructed as following steps: 1) Insert model based affine candidates, where a model based candidate is derived from the affine motion model of its valid spatial neighboring affine coded block. The scan order for the candidate positions can be identical to the merge list order in FIG. 6A, FIG. 6B, and/or FIG. 6C, and includes positions from 0 to 5. 2) Insert control point based affine candidates. If the limit on the affine merge list size is not met, control point based affine candidates are inserted. A control point based affine candidate means the candidate is constructed by combining the neighboring motion information of each control point to form an affine merge candidate.

A total number of 4 control points or CPs (denoted as CP1-CP4) are used with coordinates (0, 0), (W, 0), (H, 0) and (W, H), respectively, where W and H are the width and height of the current block.

To simplify the complexity of the affine merge list construction process, no scaling is performed when deriving the control point based affine merge candidate. If the control point motion vectors are pointing to different reference indices or the reference index is invalid, the candidate will be considered as unavailable.

When the merge/skip flag is false (e.g., equal to a value of 0), and both the width and height for the CU are larger than or equal to 16 samples (or other number of samples in some cases), an affine flag at the CU level is signalled in the bitstream to indicate whether affine inter mode is used (e.g., AF_4_INTER mode or AF_6_INTER mode). When the CU is coded as affine inter mode, a model flag is signalled for specifying whether 4-parameter or 6-parameter affine model is used for the CU. If the model flag is true (e.g., equal to a value of 1), AF_6_INTER mode (6-parameter affine model) is applied and 3 MVDs will be parsed; otherwise, if the model flag is false (e.g., equal to a value of 0), AF_4_INTER mode (4-parameter affine model) is applied and 2 MVDs will be parsed.

The affine AMVP candidate list can be constructed as following steps: 1) Insert model based affine candidates; 2) Insert control point based affine candidates; 3) Insert translational based affine AMVP candidate; and 4) Padding with zero motion vectors.

If the number of candidates in affine merge candidate list is less than 2 (or other value in some cases), zero motion vectors with zero reference indices are inserted until the list is full. To reduce the complexity of the list construction, no pruning is applied.

Sample derivation affine mode for small block sizes (e.g., 4×8 and 8×4 sizes) can be performed. In MPEG5 EVC, the minimal block size for affine coding is set to be equal 8×8. However, an encoder can select to implement affine prediction in sub-block sizes of 4×8 or 8×4. MPEG5 EVC specifies affine prediction for such sub-block sizes through an enhanced interpolation filter (EIF). EIF enables affine prediction with per-sample prediction, computing a motion vector independently for each sample. To prevent MV pointing outside of the reference picture, a resulting MV for each sample is clipped to the picture size. An extract of the MPEG EVC below shows implementation of affine prediction with EIF, marked in underlined text in between "<highlight>" and "<highlightend>" symbols (e.g., "<highlight>highlighted text<highlightend>"):

If an affine_flag is equal to 1 and one of the variables sbWidth, sbHeight is less than 8, the following applies:
Horizontal change of motion vector dX, vertical change of motion vector dY and base motion vector mvBaseScaled are derived by invoking the process specified in clause 8.5.3.9 with the luma coding block width nCbW, the luma coding block height nCbH, number of control point motion vectors numCpMv and the control point motion vectors cpMvLX[cpIdx] with cpIdx=0 . . . numCpMv−1 as inputs.

The array predSamplesLX$_L$ is derived by invoking interpolation process for enhanced interpolation filter specified in clause 8.5.4.3 with the luma locations (xSb, ySb), the luma coding block width nCbW, the luma coding block height nCbH, horizontal change of motion vector dX, vertical change of motion vector dY, base motion vector mvBaseScaled, the reference array refPicLX$_L$, sample bitDepth bitDepth$_Y$, picture width pic_width_in_luma_samples and height pic_height_in_luma_samples as inputs.

1.1.1.1 Derivation Process for Affine Motion Model Parameters from Control Point Motion Vectors Inputs to the process are:
two variables cbWidth and cbHeight specifying the width and the height of the luma coding block,
the number of control point motion vectors numCpMv,
the control point motion vectors cpMvLX[cpIdx], with cpIdx=0 . . . numCpMv−1 and X being 0 or 1.

Outputs of the process are:
horizontal change of motion vector dX,
vertical change of motion vector dY,
motion vector mvBaseScaled corresponding to the top left corner of the luma coding block.

The variables log2CbW and log2CbH are derived as follows:

$$\text{log2CbW}=\text{Log2}(\text{cbWidth}) \quad (8\text{-}688)$$

$$\text{log2CbH}=\text{Log2}(\text{cbHeight}) \quad (8\text{-}689)$$

Horizontal change of motion vector dX is derived as follows:

$$dX[0]=(\text{cpMvLX}[1][0]-\text{cpMvLX}[0][0])<<(7-\text{log2CbW}) \quad (8\text{-}690)$$

$$dX[1]=(\text{cpMvLX}[1][1]-\text{cpMvLX}[0][1])<<(7-\text{log2CbW}) \quad (8\text{-}691)$$

Vertical change of motion vector dY is derived as follows:
If numCpMv is equal to 3, dY is derived as follow:

$$dY[0]=(\text{cpMvLX}[2][0]-\text{cpMvLX}[0][0])<<(7-\text{log2CbH}) \quad (8\text{-}692)$$

$$dY[1]=(\text{cpMvLX}[2][1]-\text{cpMvLX}[0][1])<<(7-\text{log2CbH}) \quad (8\text{-}693)$$

Otherwise (numCpMv is equal to 2), dY is derived as follows:

$$dY[0]=-dX[1] \quad (8\text{-}694)$$

$$dY[1]=dX[0] \quad (8\text{-}695)$$

Motion vector mvBaseScaled corresponding to the top left corner of the luma coding block is derived as follows:

$$\text{mvBaseScaled}[0]=\text{cpMvLX}[0][0]<<7 \quad (8\text{-}696)$$

$$\text{mvBaseScaled}[1]=\text{cpMvLX}[0][1]<<7 \quad (8\text{-}697)$$

1.1.1.2 Interpolation Process for the Enhanced Interpolation Filter

Inputs to the process are:
a location (xCb, yCb) in full-sample units,
two variables cbWidth and cbHeight specifying the width and the height of the current coding block,
horizontal change of motion vector dX, vertical change of motion vector dY,
motion vector mvBaseScaled,
the selected reference picture sample arrays refPicLX,
sample bit depth bitDepth
width of the picture in samples pic_width,
height of the picture in samples pic_height.
Outputs of the process are:
an (cbWidth)×(cbHeight) array predSamplesLX of prediction sample values.

The variables shift1, shift2, shift3, offset1, offset2 and offset3 are derived as follows:
shift0 is set equal to bitDepth−6, offset0 is equal to $2^{shift1-1}$,
shift1 is set equal to 11, offset1 is equal to 1024.
<highlight>For x=−1 ... cbWidth and y=−1 ... cbHeight, the following applies:
The motion vector mvX is derived as follows:

$$mvX[0]=(mvBaseScaled[0]+dX[0]*x+dY[0]*y) \quad (8\text{-}728)$$

$$mvX[1]=(mvBaseScaled[1]+dX[1]*x+dY[1]*y) (8\text{-}729)<\text{highlightend}>$$

The variables xInt, yInt, xFrac and yFrac are derived as follows:

$$xInt=xCb+(mvX[0]>>9)+x \quad (8\text{-}730)$$

$$yInt=yCb+(mvX[1]>>9)+y \quad (8\text{-}731)$$

$$xFrac=mvX[0] \& 511 \quad (8\text{-}732)$$

$$yFrac=mvX[1] \& 511 \quad (8\text{-}733)$$

The locations (xInt, yInt) inside the given array refPicLX are derived as follows:

$$<\text{highlight}>xInt=Clip3(0,pic\_width-1,xInt) \quad (8\text{-}734)$$

$$yInt=Clip3(0,pic\_height-1,yInt) \quad (8\text{-}735)<\text{highlightend}>$$

The variables $a_{x,y}$, $a_{x+1,y}$, $a_{x,y+1}$, $a_{x+1,y+1}$ are derived as follows:

$$a_{x,y}=((refPicLX[xInt][yInt]*(512-xFrac)+offset0)>>shift0)*(512-yFrac) \quad (8\text{-}736)$$

$$a_{x+1,y}=((refPicLX[xInt+1][yInt]*xFrac+offset0)>>shift0)*(512-yFrac) \quad (8\text{-}737)$$

$$a_{x,y+1}=((refPicLX[xInt][yInt+1]*(512-xFrac)+offset0)>>shift0)*yFrac \quad (8\text{-}738)$$

$$a_{x+1,y+1}=(((refPicLX[xInt][yInt]*xFrac+offset0)>>shift0)*yFrac \quad (8\text{-}739)$$

The sample value $b_{x,y}$ corresponding to location (x, y) is derived as follows:

$$b_{x,y}=(a_{x,y}+a_{x+1,y}+a_{x,y+1}+a_{x+1,y+1}+offset1)>>shift1 \quad (8\text{-}740)$$

The enhancement interpolation filter coefficients eF[ ] are specified as {−1, 10, −1}.
The variables shift2, shift3, offset2 and offset3 are derived as follows:
shift2 is set equal to 4, offset2 is equal to 8,
shift3 is set equal to 15−bitDepth, offset3 is equal to $2^{shift3-1}$,
For x=0 ... cbWidth−1 and y=−1 ... cbHeight, the following applies:

$$h_{x,y}=(eF[0]*b_{x-1,y}+eF[1]*b_{x,y}+eF[2]*b_{x+1,y}+offset2)>>shift2 \quad (8\text{-}741)$$

For x=0 ... cbWidth−1 and y=0 ... cbHeight−1, the following applies:

$$predSamplesLX_L[x][y]=Clip3(0, (1<<bitDepth)-1, (eF[0]*h_{x,y-1}+eF[1]*h_{x,y}+eF[2]*b_{x,y+1}+offset3)>>shift3)$$

Per-sample MV generation introduced in enhanced interpolation filter (EIF) can potentially increase the number of memory accesses needed to fetch filter samples, thus increasing memory bandwidth. The increase in the number of memory accesses can be much higher than the typically-used 1 memory fetching for block sizes 4×8 or 8×4 (or other block sizes) in uni-prediction or 2 memory fetching for bi-predicted blocks.

As described above, a large number of fetching operations may not be a problem, such as if the needed reference area is available in a local buffer. The current EIF design introduces MV clipping to picture boundaries, which requires that an entire picture be available in the local buffer. As noted above, techniques and systems are described herein that improve affine mode coding. Each of the techniques described herein can be performed individually or in any combination. In some examples, the systems and techniques described herein restrain (using a restriction or constrain) the reference picture area that can be accessed from affine sample generation (e.g., by EIF) to a certain limit, which in some cases can be set as a function of block size. In some examples, the systems and techniques apply the restriction or constraint to certain block sizes, e.g. of less than 8×8, or less than 4×8, or less than 8×4, or other block sizes. In some cases, the restriction or constraint can be specified as a function of block dimensions.

The restriction or constraint may be imposed through different approaches. One illustrative and non-limiting example of such a constraint can be implemented as follows, described as a modification to an MPEG EVC description for affine motion constraints. For example, an encoding device and/or decoding device can constrain and/or clip one or more affine motion vectors or their output (e.g., reference sample coordinates pointed to by the affine motion vectors), such that the constraining/clipping ensures that no affine vector of higher granularity (e.g. sub-block or sample) will exceed an allowed area. Two examples of forms by which such a constraint can be introduced include a bitstream requirements (conformance) and a normative decoding process. One illustrative example of a normative decoding process that may be implemented through clipping of one or more affine motion vectors (MVs) is as follows (modifying the highlighted portions above by adding the text marked in underlined text in between "<insert>" and "<insertend>" symbols (e.g., "<insert>added text<insertend>"):
The motion vector mvX is derived as follows:

$$mvX[0]=(mvBaseScaled[0]+dX[0]*x+dY[0]*y) \quad (8\text{-}728)$$

$$mvX[1]=(mvBaseScaled[1]+dX[1]*x+dY[1]*y) \quad (8\text{-}729)$$

<insert>mvX[0]=Clip3(MinX, MaxX−1, mvX[0])
mvX[1]=Clip3(MinY, MaxX−1, mvX[1])<insertend>
where clipping parameters are derived as a function of block size, current block/sample coordinates and MV.

In the above case, spatial coordinates clipping is not required and may be removed from one or more implementations, which is shown below as strike-through text in between <delete> and <deleteend> symbols (<delete><deleteend>)with reference to the corresponding sections 8-734 and 8-735 shown above:
<delete>
<deleteend> iii. normative decoding process, which may be implemented through clipping of actual coordinates for data fetching, as follows:

$$x\text{Int}=\text{Clip3}(\text{Min}X,\text{Max}X-1,x\text{Int}) \quad (8\text{-}734)$$

$$y\text{Int}=\text{Clip3}(\text{Min}Y,\text{Max}Y-1,y\text{Int}) \quad (8\text{-}735)$$

where clipping parameters are derived as a function of block size, current block/sample coordinates and MVs.

In some examples, clipping parameters can be derived by taking into account one or more MVs derived for different spatial positions of an affine block, e.g. either from an X/Y coordinates pointed by MV v0 (top-left CP), or by other MV provided by affine model (e.g. v1 or v2). An example of such an implementation is as follows using a Threshold:

$$\{\min X, \min Y, \max X, \max Y\} = \text{function}(\text{Threshold}, \{v0\|v1\|v2\}, \{x0, y0\})$$

$$\{\min X, \min Y, \max X, \max Y\} = \text{function}(\text{Threshold}, \{v0\|v1\|v2\}, \{x0, y0\})$$

$$x\text{Int} = \text{Clip3}(\text{Min}X, \text{Max}X-1, x\text{Int})$$

$$y\text{Int} = \text{Clip3}(\text{Min}Y, \text{Max}Y-1, y\text{Int})$$

Figure 16:
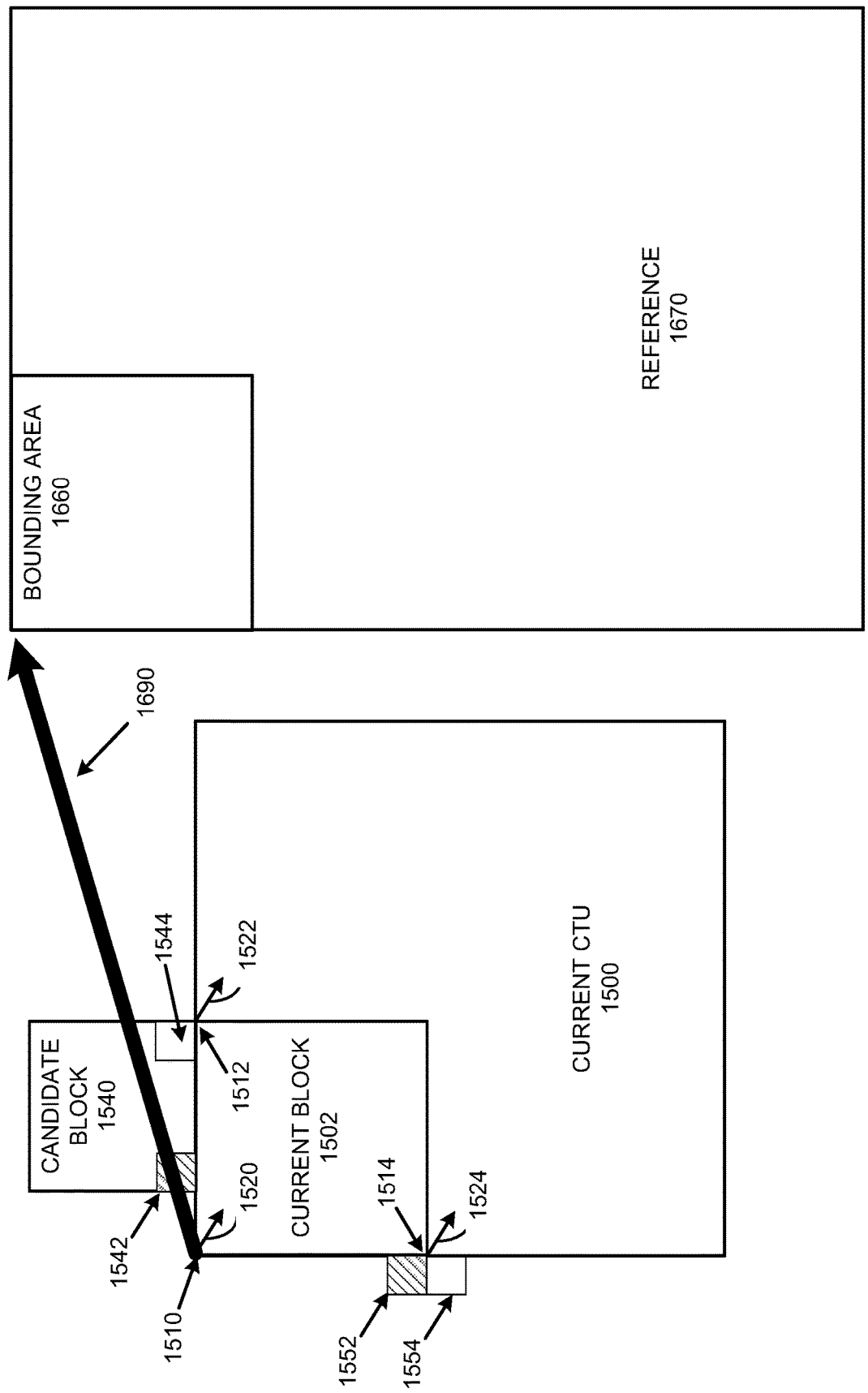
FIG. 16 is a diagram illustrating aspects of an affine model and spatial neighborhood, in accordance with some examples.

FIG. 16 is a diagram illustrating aspects of an affine model and a spatial neighborhood, in accordance with some examples. FIG. 16 illustrates current CTU 1500 as well as the adjacent blocks and sub-blocks and the associated control points and motion vectors above from FIG. 15. While FIG. 16 provides an illustrative example using a CTU, in other examples, the current CTU can be another block, such as a CU, a PU, a TU, etc.

As detailed above, affine coding of the current block 1502 can use reference data. Such reference data can be from a reference 1670 illustrated in FIG. 16. In some cases, the reference 1670 can be part of a picture identified as a reference picture for the current block 1502. Under some circumstances, affine motion vectors can be inconsistent (e.g., can have wide variations with a current block) with indications to widely differing portions of the reference picture. For example, as described above, because affine motion can be associated with motion due to a changing point of view (e.g., movement of a camera position), affine motion vectors can be expected to be fairly consistent across a block. In some circumstances, however, an affine motion vector for one sample of a block is widely different (e.g., pointing in a different direction with a large magnitude) than an affine motion vector for another sample of the block. When such circumstances occur, the memory bandwidth used to access the reference data (e.g., the reference 1670) indicated by the affine motion vectors can degrade performance.

Examples described herein can include devices (e.g., encoding device 104 or decoding device 112) that perform clipping of affine motion vectors to limit (e.g., to the bounding area 1660) the data in the reference 1670 that can possibly be indicated by the affine motion vectors. In some examples, such clipping can be done with a threshold (e.g., the "Threshold" from above). In some examples, the threshold can be a user and/or a system specified ratio of block sizes utilized as a criteria to define, the bounding area 1660 (e.g., which can be considered a memory access region which is the area of reference 1670 that is stored in a memory or DCB for use in coding the current block 1502), as shown in FIG. 16. A reference 1670 (e.g., a reference picture or a portion of a reference picture, such as a reference block) includes a bounding area 1660 (e.g., a portion of reference 1670) that can be pointed to by one or more affine motion vectors based on limits applied to the affine motion vectors (e.g., clipping parameters). Arrow 1690 indicates the relationship between samples or points in the current block 1502 and the bounding area 1660, such that the affine motion vectors are limited (e.g., by clipping parameters) to bounding area 1660. Depending on the different affine motion parameters, the relationship between samples of the current block 1502 and the data in the bounding area 1660 indicated by the affine vectors can vary to match the particular affine motion being coded in an affine coding mode. Additional details related to the relationship between samples of a current block (e.g., current block 1502) and data referenced from a reference picture (e.g., data from bounding area 1660 in reference 1670) are described in detail below with respect to FIG. 18A, FIG. 18B, and FIG. 18C. In many circumstances, the affine motion vectors will have consistent values (e.g., due to the nature of affine motion such as a point of view movement as described above) across a current block (e.g., the current block 1502), in which case performance degradation from limiting the affine motion vectors will typically be limited.

The limitation of the possible reference data to the bounding area 1660 can prevent performance degradation associated with memory bandwidth, and can limit the possible data to be referenced to a manageable size that can be buffered in a memory and used for affine coding of the current block 1502. The clipping parameters described herein (e.g., a (cbWidth)×(cbHeight) array; variables such as a horizontal maximum variable, a horizontal minimum variable, a vertical maximum variable, and a vertical minimum variable; or any other such parameters used to limit the reference picture data indicated by affine motion vectors for a current block such as current block 1502) can be used in various examples to define the bounding area 1660 in the context of the current block 1502 and the reference 1670, and can further be used to store the reference data associated with the bounding area 1660 for use in the coding current block 1502.

Figure 17:
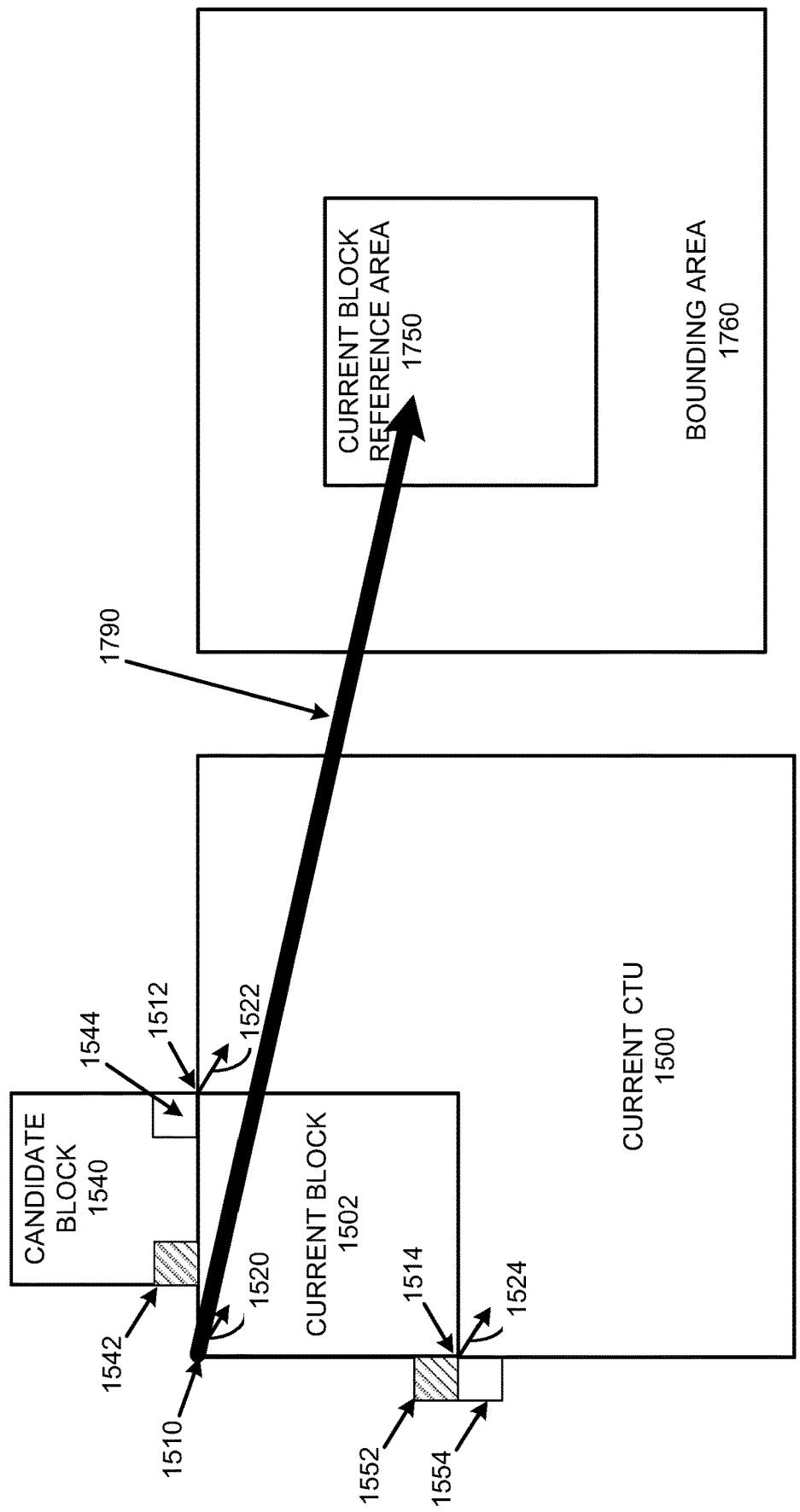
FIG. 17 is a diagram illustrating aspects of an affine model and spatial neighborhood, in accordance with some examples.

FIG. 17 is a diagram illustrating aspects of an affine model and a spatial neighborhood, in accordance with some examples. Similar to FIG. 16, FIG. 17 illustrates the current CTU 1500 as well as the adjacent blocks and sub-blocks and the associated control points and motion vectors from FIG. 15. While FIG. 17 provides an illustrative example using a CTU, in other examples, the current CTU can be another block, such as a CU, a PU, a TU, etc. In some examples, as illustrated by FIG. 17 and described above, clipping parameters can be derived by taking into account one or more motion vectors derived for different spatial positions of an affine block, (e.g. actual affine MV produced for affine sub-blocks), or affine samples within current block. An example implementation can include clipping parameters as:

$$\{\min X, \min Y, \max X, \max Y\} = \text{function}(\text{Threshold}, \{mv(x, y)\}, \{x, y\})$$

$$\{\min X, \min Y, \max X, \max Y\} = \text{function}(\text{Threshold}, \{mv(x, y)\}, \{x, y\})$$

and clipped motion vectors as follows:

$$x\text{Int} = \text{Clip3}(\text{Min}X, \text{Max}X-1, x\text{Int})$$

$$y\text{Int} = \text{Clip3}(\text{Min}Y, \text{Max}Y-1, y\text{Int}).$$

Other examples can include other implementations of such motion vectors and clipping parameters.

As noted, the threshold (e.g., a threshold indicating bounding area 1660 used to limit reference data that can be indicated by an affine motion vector) can be a user and/or system specified ratio of block sizes utilized as a criteria to define a memory access region (e.g., bounding area 1760), as shown in FIG. 17. In FIG. 17, the reference bounding area 1760 (e.g., similar to the bounding area 1660 of FIG. 16) specifies a bounding area for data of a reference picture that can be pointed to by affine motion vectors (e.g., given clipping limitations that prevent data from a reference picture outside of the bounding area 1760 from being indicated) from samples of the current block 1502. The current block reference area 1750 shows an example representative of a block size of the current block 1502 pointed to by a motion vector for a central location (e.g., under the assumption that a translational motion associated with arrow 1790 is used). The area of the reference picture accessible to process current block 1502 (e.g., bounding area 1760) is larger than the current block reference area 1750 due to acceptable variations in the affine vectors, as described in more detail below. An affine motion vector produced for a sample location of the current block 1502 or for vectors from relevant sub-blocks, such as sub-blocks 1542, 1544, 1552, or 1554 would point to a location within the bounding area 1660 in accordance with constraints or clipping parameters implemented as part of affine coding. Additional details of an affine motion vector and associated reference data subject to clipping or threshold restrictions is described below with respect to FIG. 18A, FIG. 18B, and FIG. 18C.

In some examples, scaling and/or clipping CP motion vectors for a CU can be performed, or resulting motion vector change parameters (dXmv, dYmv) can be used to verify that no affine vector of higher granularity (e.g. sub-block or sample) would exceed the allowed area (e.g., such as bounding area 1660 or 1760). Two examples of forms by which such a constraint can be introduced include: bitstream requirements (e.g., for conformance), and a normative decoding process. The normative decoding process may be implemented either through clipping of CP MVs, or re-adjusting/scaling CP MVs or change parameters to insure constrain imposed on affine motion vectors.

In some examples, MVs of a CP location {v0, v1, v2} can be clipped before utilization of them in the affine MV derivation. For example, one of the CP MVs (e.g., v0) can be taken as a base, and the other CP MVs (e.g., v1 and v2) can be checked to determine if the other CP MVs are pointing outside of the bounding area (which can be referred to as checking whether a bounding block violation is identified). If such a bounding block violation is identified, the identified vector can be scaled proportionally and pointed within the bounding area, one side (corner) of which is specified by the base MV (e.g., v0). Similar techniques can be applied for affine motion models having fewer than three CP motion vectors (e.g., fewer than v0, v1, v2) and/or affine motion models having more than three CP motion vectors (e.g., more than v0, v1, v2).

In another example, motion information of v0, v1 and v2 may remain un-modified, however, affine parameters dX and dY are to be scaled accordingly to prevent an affine MV from pointing outside of the bounding block. An example of such an implementation is shown below with text marked in underlined text in between "<insert2>" and "<insertend2>" symbols (e.g., "<insert2>added text<insertend2>"). Similar techniques can be applied for affine motion models having fewer than three CP motion vectors (e.g., fewer than v0, v1, v2) and/or affine motion models having more than three CP motion vectors (e.g., more than v0, v1, v2).

1.1.1.3 Derivation Process for Affine Motion Model Parameters from Control Point Motion Vectors Inputs to the process are:
  two variables cbWidth and cbHeight specifying the width and the height of the luma coding block,
  the number of control point motion vectors numCpMv,
  the control point motion vectors cpMvLX[cpIdx], with cpIdx=0 . . . numCpMv−1 and X being 0 or 1.

Outputs of the process are:
  horizontal change of motion vector dX,
  vertical change of motion vector dY,
  motion vector mvBaseScaled corresponding to the top left corner of the luma coding block.

The variables log2CbW and log2CbH are derived as follows:

$$\log2CbW = \log2(cbWidth) \tag{8-688}$$

$$\log2CbH = \log2(cbHeight) \tag{8-689}$$

<insert1>Call clip cpMvLX motion vectors to the bounding block size of (wBB, hBB, cbWidth, cbHeight, xCb, yCb, ratio);<insertend1>

Horizontal change of motion vector dX is derived as follows:

$$dX[0] = (cpMvLX[1][0] - cpMvLX[0][0]) << (7 - \log2CbW) \tag{8-690}$$

$$dX[1] = (cpMvLX[1][1] - cpMvLX[0][1]) << (7 - \log2CbW) \tag{8-691}$$

Vertical change of motion vector dY is derived as follows:
  If numCpMv is equal to 3, dY is derived as follow:

$$dY[0] = (cpMvLX[2][0] - cpMvLX[0][0]) << (7 - \log2CbH) \tag{8-692}$$

$$dY[1] = (cpMvLX[2][1] - cpMvLX[0][1]) << (7 - \log2CbH) \tag{8-693}$$

Otherwise (numCpMv is equal to 2), dY is derived as follows:

$$dY[0] = -dX[1] \tag{8-694}$$

$$dY[1] = dX[0] \tag{8-695}$$

<insert2>Derive scaling parameters scDX and scDY from cpMvLX motion vectors, bounding area parameters, current block parameters cbWidth, cbHeight and local coordinates. Scale dX and dY parameters proportionally, to prevent resulting MV from pointing outside of the bounding block <insertend2>

$$dX[0] = scDX * dX[0] \tag{}$$

$$dX[1] = scDX * dX[1] \tag{}$$

$$dY[0] = scDY * dY[0] \tag{}$$

$$dY[1] = scDY * dY[1] \tag{}$$

Motion vector mvBaseScaled corresponding to the top left corner of the luma coding block is derived as follows:

$$mvBaseScaled[0] = cpMvLX[0][0] << 7 \tag{8-696}$$

$$mvBaseScaled[1] = cpMvLX[0][1] << 7 \tag{8-697}$$

In some examples, a motion vector and/or spatial coordinates accessible for motion compensation are clipped against thresholds instead of picture boundaries. Clipping motion vectors or spatial coordinates using thresholds can be performed to benefit from existing clipping processes (e.g., such as those presented in EVC standards). For instance, parameters of clipping can be computed once per block from tabulated parameters as follows (with emphasized text marked with underlines in between "<highlight>" and "<highlightend>" symbols (e.g., "<highlight>highlighted text<highlightend>"):

Deviation_A[5]={16, 80, 224, 512, 1088};
Deviation_B[5]={16, 96, 240, 528, 1104};
hor_min=(center_mv_hor−Deviation_A[log2(w)−3])<<5;
ver_min=(center_mv_ver−Deviation_A[log2(h)−3])<<5;
hor_max=(center_mv_hor+Deviation_B[log2(w)−3])<<5;
ver_max=(center_mv_ver+Deviation_B[log2(h)−3])<<5;

<highlight>$mvX[0]=\text{Clip3}(mv\_max[0], mv\_min[0], mvX[0])$ (8-734)

$mvX[1]=\text{Clip3}(mv\_max[1], mv\_min[1], mvX[1])$ (8-735)<highlightend>

As described herein, affine sample generation can be used for video coding (e.g., video encoding and/or decoding), including standards based coding such as EVC, VVC, and/or other existing or to-be-developed coding standard. Affine coding modes in video coding allow a non-relational motion vector for a current block (e.g., the current block 1502) that is being coded with predictive processing operations. In some such systems as described above, there is not a single motion vector for the entire current block (e.g., CU, CTU, PU, TU, or other block). Instead, some samples within a block have independent affine motion vectors. Each sample in such a block may have an independent motion vector which can point quite far around the reference picture identified for the block. An affine mode coder operating without limits can call or fetch areas of from a large area of the reference picture, using significant memory resources for prediction operations in coding (e.g., using reference picture data that exceeds the capacity of a DPB). In some such systems, an enhanced interpolation filter (EIF) generates an independent motion vector for each sample, and fetching data for such vectors separately can be bandwidth intensive and use significant computation resources. The fetched reference data is stored (e.g., buffered) in a memory that stores samples from areas of the reference picture indicated by the motion vectors. To provide acceptable performance, the referenceable data that can be fetched to the memory can be restricted by clipping parameters in accordance with examples described herein.

The restriction can be done in various ways, including restricting coordinates, restricting the motion vectors used by the affine mode prediction, modifying affine parameters for clipping, clipping constraints on horizontal and vertical motion vectors with a division table used to clip the vectors that are outside of the defined area, and using other such restrictions. Some examples include devices and processes that restrict the motion vector magnitude to be bounded by a certain boundary around a central location (e.g., bounding area 1660 of FIG. 16 or the bounding area 1760 of FIG. 17, or the bounding area 1810 around center position 1854 of FIG. 18 described below). Some such examples can operate by getting a current block, getting control points for affine prediction, generating a synthetic motion vector and approximating a motion vector for a sample located in the center of the block. In some such examples, a center location can be used with a DPB to store data from a reference (e.g., data from bounding area 1660 or 1760 from a reference picture). In some examples, a minimum-maximum (min-max) deviation of the affine motion vectors that are allowed for the block can be defined, with any vector pointing outside the limiting region for the vector clipped to the limiting region.

In some examples, for different block sizes, operations of an affine coding mode are configured by a coding device to fetch different reference area sizes. In some examples, the size ratios are associated by a device configuration with what is computationally feasible (e.g., without performance degradation) for a particular device or system. In some examples, for each sample, a coding device is configure by an affine coding mode to fetch a certain number of reference samples. In some such examples described herein, thresholds for certain block sizes are indicated as part of the affine coding mode. In other examples, other thresholds can be used. In some examples, affine motion vector clipping parameters can be derived, as part of affine coding mode operations, from a central vector in the reference picture and other input values. In some such examples with a central sample with a motion vector, the motion vector points to a position in a reference picture. The position in the reference picture in such examples gives a central location of a reference area. The size of the reference area is defined by a deviation value, which in some examples, is fixed by the central location identified by the central motion vector.

In some examples, clipping parameters are deviations that are block size dependent. For example, Deviation A and Deviation B have specified values described above as Deviation_A[5]={16, 80, 224, 512, 1088}; Deviation_B[5]={16, 96, 240, 528, 1104}. Such values are specified based on certain size values, such as an image resolution, and will be different for images with different size values (e.g., different image resolutions).

As described above, in some examples a sample in a current block subject to affine coding has an affine motion vector pointing to a reference picture. The motion vector sets the center position from which the referenceable area (e.g., an area such as the bounding areas 1660 or 1760) is defined. The affine motion vector is defined from the standard affine motion vector generation process as part of affine coding operations. A control point motion vector is determined and sub-block or sample motion vectors are derived as part of affine coding operations based on an affine motion model.

Figure 18A:
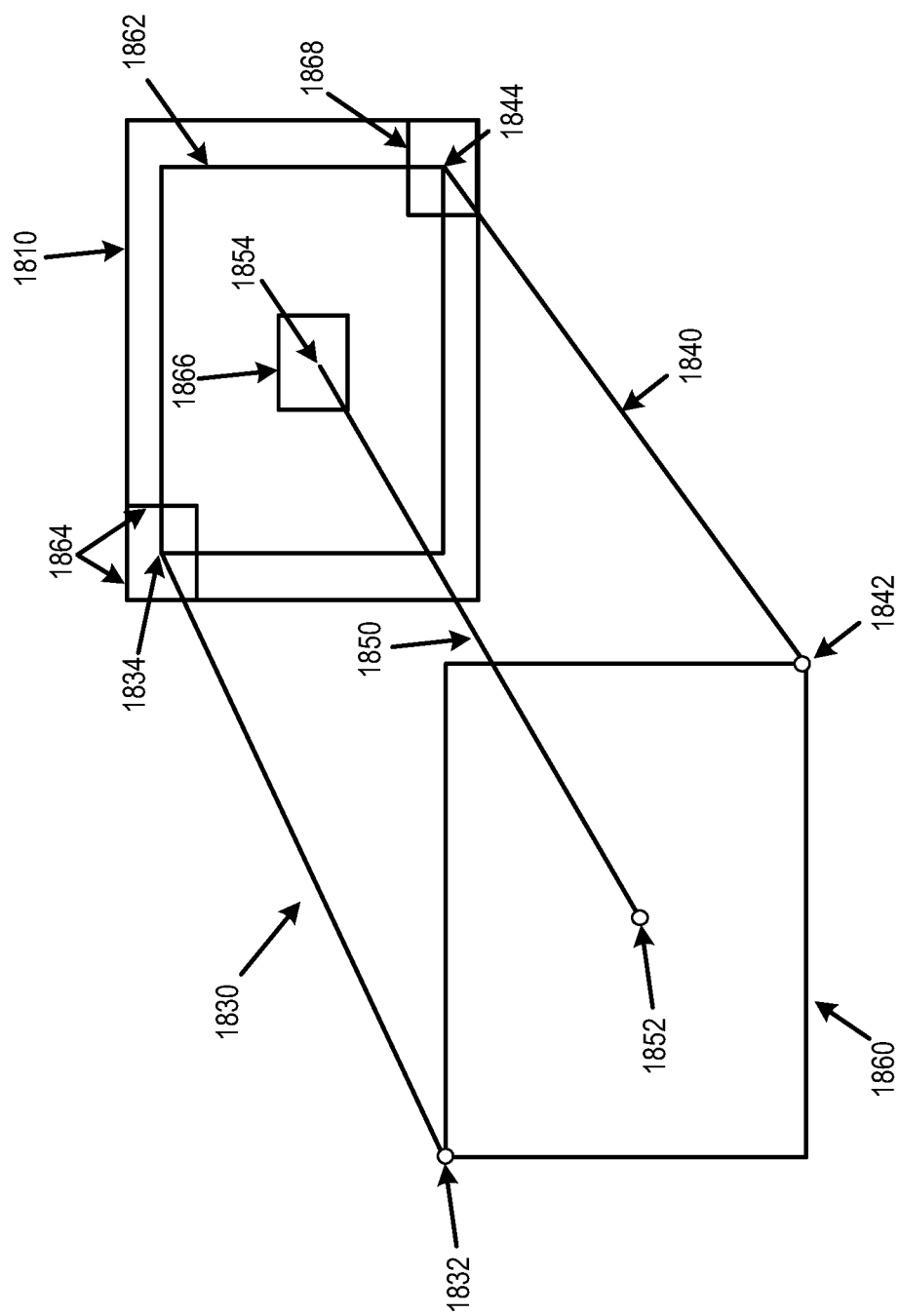
FIG. 18A is a diagram illustrating aspects of clipping using thresholds, in accordance with some examples.

FIG. 18A is a diagram illustrating aspects of clipping using thresholds, in accordance with some examples. As shown in the example of FIG. 18A, a block 1860 is a current CU with an implementation of EIF affine coding in accordance with examples described herein. A block sized area 1862 of a reference picture pointed to by a central motion vector 1850 from a sample 1852 of the block 1860 defines a reference block sized area 1862 of the same size as the block 1860 (the CU). A center position 1854 of the boundary area 1810 and the reference block sized area 1862. The areas 1864, 1866, and 1868 show allowed deviation for the motion vectors 1850, 1840, and 1830 corresponding to the samples 1852, 1842, and 1832. In some examples, the area size for the areas 1864, 1866, and 1868 are defined by a deviation given by ((MV(center)−1)/(MV(center)+1)) integer pixels (e.g., for the size of 8).

With the restriction or deviation defined as described above, in some examples, the top-left position 1834 associated with sample 1832 can allow a shift associated with a motion vector by a deviation width/2 (w/2) and height/2 (h/2), still bounded by central MV(center)−1/MV(center)+1 (e.g., central motion vector 1830) for area 1864. The deviation and bounding illustrated for the area 1864 and position 1834 (e.g., associated with the central motion vector 1830 and the sample 1832) introduces an effective bounding block

1810 of memory access for the samples of the current block 1860 when applied to all samples for the current block 1860. In the example of FIG. 18A, the bounding block 1810 can be considered the reference block sized area 1862 (e.g., which is the same size as current block 1860) plus a deviation_on_mv caused by the bounding areas around the extreme positions at the edge of the area 1862, such as the areas 1864 and 1868 around the positions 1834 and 1844. By placing a clipping restriction on every sample of the current block 1860 to restrict the motion vectors to a deviation associated with the size of the areas 1864, 1866, and 1868 (e.g., such that these areas are the same size and deviations for all other affine motion vectors for samples from the currant block 1860 will be the same size), the affine mode as described herein introduces a restriction on every single motion vector within the currant block 1860. In some examples, such restrictions are applied to a motion vector even if the motion vector is within the bounding block. Such a solution effectively provides a "translationalization" on affine motion, which is further described below with respect to FIGS. 18B and 18C.

Figure 18B:
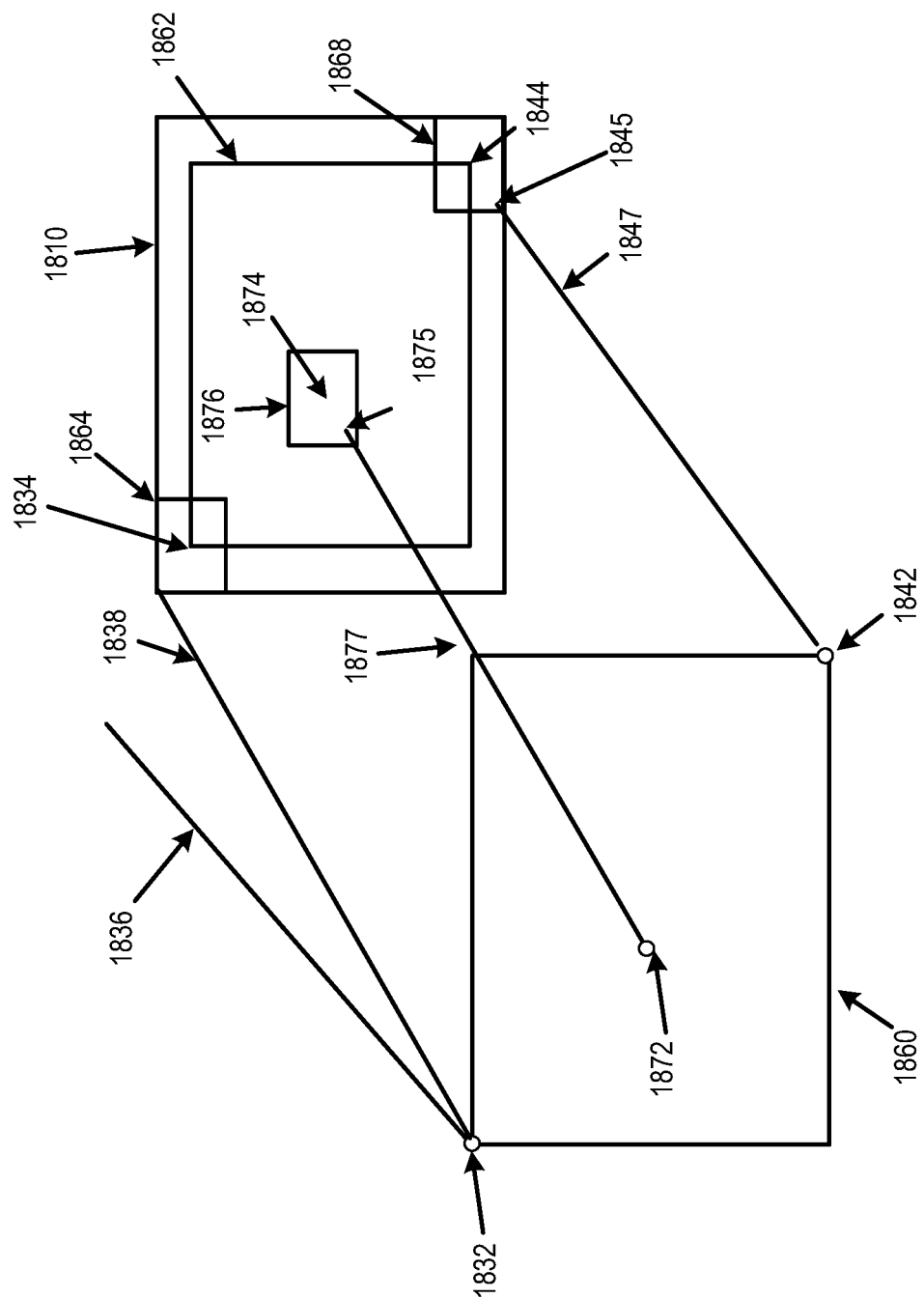
FIG. 18B is a diagram illustrating aspects of clipping using thresholds, in accordance with some examples.

FIG. 18B is a diagram illustrating aspects of clipping using thresholds, in accordance with some examples. FIG. 18B illustrates an example of the current block 1860 with a particular set of affine motion vectors 1836, 1847, and 1877 for corresponding samples 1832, 1842, and 1872. As described above, each sample is associated with an area that defines a maximum deviation for an affine vector associated with a particular sample. The sample 1832 is associated with the area 1864, the sample 1842 is associated with the area 1868, and the sample 1872 is associated with the area 1876. As described above, if the affine motion vector is outside of the defined limiting area for that vector (e.g., as indicated by a center vector for the sample), the affine motion vector is adjusted with a clipping operation to generate a clipped affine motion vector that does not deviate from the associated area for the sample, and therefore will also not deviate from the bounding block 1810. Since data for the bounding block 1810 can be stored in a local buffer as described above, the coding device can perform the operations for all samples of the current block 1860 without fetching additional reference data and degrading device performance with excessive memory bandwidth use.

In the example of FIG. 18B, the affine motion vector 1836 for the sample 1832 is outside of the area 1864 (e.g., with the center position 1834 associated with the sample 1832). The affine motion vector 1836 is clipped by affine mode operations to create the clipped affine motion vector 1838 which points within the border of the area 1864 and the bounding block 1810. By contrast, the motion vector 1877 for the sample 1872 associated with the center position 1874 and the area 1876 points to the position 1875. Since the position 1875 indicated by the affine motion vector 1877 is within the area 1876, the affine motion vector 1877 is not clipped. Similarly, the motion vector 1847 for the sample 1842 associated with the center position 1844 and the area 1868 points to the position 1845, which is within both the area 1868 and the bounding block 1810, and so the affine motion vector 1847 is not clipped.

As described above for FIG. 18A, the center position 1854 for the sample 1852 is used to define the center motion vector 1850. Regardless of whether the center motion vector 1850 indicates a large motion or a small motion, the bounding areas for all other samples for that current block 1860, including samples 1832, 1842, 1872, and other samples, have associated clipping areas based off of central vectors that can be translations (e.g. parallel vectors with identical magnitudes but different positions or intersections with the current block). In various examples, the change in position between different sample positions will match the change in position of the associated areas (e.g., the difference between positions of samples 1872 and 1832) will be the same as the difference between positions 1874 and 1834 and the same as the difference between areas 1876 and 1864. The relationship between the restriction areas and their corresponding samples is the "translationalization" on affine motion referred to above.

Figure 18C:
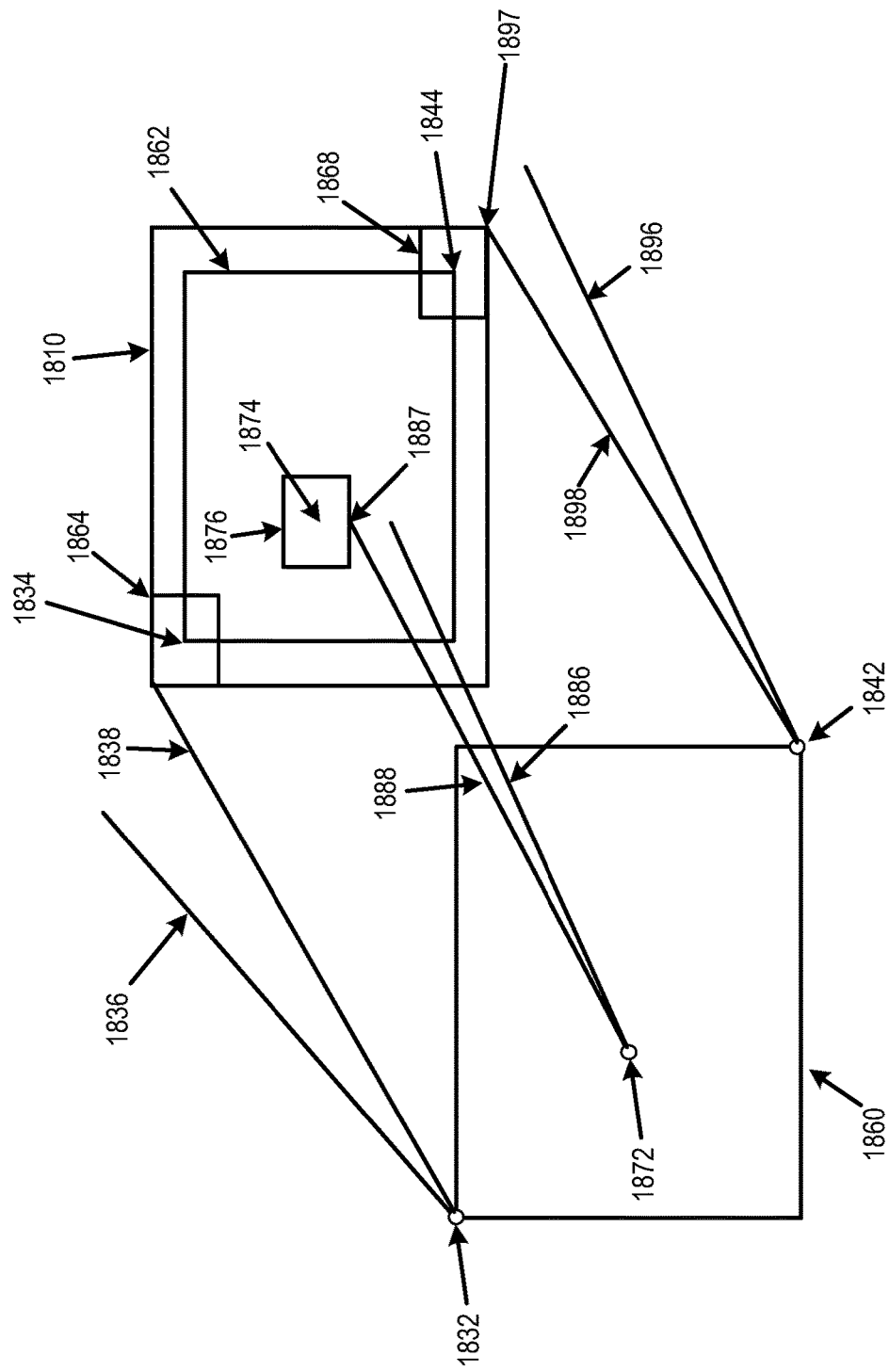
FIG. 18C is a diagram illustrating aspects of clipping using thresholds, in accordance with some examples.

FIG. 18C is a diagram illustrating aspects of clipping using thresholds, in accordance with some examples. FIG. 18C illustrates an example similar to FIG. 18B, but with different affine motion vectors. In the example of FIG. 18C, the affine vector 1836 for the sample 1832 is the same as in FIG. 18B, however motion vectors 1886 and 1896 for respective samples 1872 and 1842 are different. Similar to the motion vector 1836, the motion vector 1896 exceeds the allowable motion vector deviation, and so motion vector 1896 is processed to generate clipped motion vector 1898 pointing to position 1897 that is within bounding block 1810 and area 1868. In the example of FIG. 18C, affine motion vector 1886 is clipped, even though it points within bounding block 1810. Because affine motion vector 1886 exceeds the allowable variation indicated by area 1876, it is process to generate clipped motion vector 1888 pointing to position 1887 that is within area 1876 associated with center position 1874 for sample 1872. In the above example, even though motion vector 1886 points to a position within bounding block 1810, the motion vector 1886 is clipped due to the clipping parameters. Applying such clipping parameters within bounding area 1810 can simplify clipping operations and provide efficient use of system resources.

In another example, only the memory area can be defined by a bounding block (e.g., without restrictions on a motion within a bounding block such as the restriction on motion vectors 1886 associated with area 1876 described above). In such an example, a memory bounding block (e.g., bounding area 1660, 1760, or 1810) can be implemented on final x/y coordinates, for example with integer precision. Such an example would allow unrestricted affine motion vectors within a bounding block. In such an example, motion vectors 1836 and 1896 would be clipped, but motion vector 1886 would not be clipped, as the reference data indicated by motion vector 1886 is within bounding block 1810, and would be stored in the memory and available for affine coding without an additional restriction associated with area 1876. In such an example, additional computing resources may be used to structure the clipping and allow improved performance at the cost of resources to structure the more complex clipping operations, while maintaining the memory bandwidth performance of other examples (e.g., with a same bounding area 1660, 1760, or 1810 limitation on reference data but without individual area restrictions per motion vector within the bounding blocks such as the areas 1864, 1876, and 1868).

An example of a deviation restriction is as follows (with emphasized text marked with underlines in between "<highlight>" and "<highlightend>" symbols (e.g., "<highlight>highlighted text<highlightend>"):

Deviation_A[5]={16, 80, 224, 512, 1088};
Deviation_B[5]={16, 96, 240, 528, 1104};
MinX=center_pos_x+(center_mv_hor−Deviation_A[log2 (w)−3])<<5;
MinY=center_pos_y+(center_mv_ver−Deviation_A[log2 (h)−3])<<5;

MaxX=center_pos_x+(center_mv_hor+Deviation_B[log2(w)−3])<<5;
MaxY=center_pos_y+(center_mv_ver+Deviation_B[log2(h)−3])<<5;

<highlight>xInt=Clip3(MinX,MaxX−1,xInt)   (8-734)

yInt=Clip3(MinY,MaxY−1,yInt)   (8-735)<highlightend>

An example of Specification text providing an example of an implementation for such a solution is shown below with text marked in underlined text in between "<insert1>" and "<insertend1>" symbols (e.g., "<insert1>added text<insertend1>"):

1.1.1.4 Interpolation Process for the Enhanced Interpolation Filter

Inputs to the process are:
  a location (xCb, yCb) in full-sample units,
  two variables cbWidth and cbHeight specifying the width and the height of the current coding block,
  horizontal change of motion vector dX,
  vertical change of motion vector dY,
  motion vector mvBaseScaled,
  the selected reference picture sample arrays refPicLX,
  sample bit depth bitDepth
  width of the picture in samples pic_width,
  height of the picture in samples pic_height.

Outputs of the process are:
  an (cbWidth)×(cbHeight) array predSamplesLX of prediction sample values.

The variables shift1, shift2, shift3, offset1, offset2 and offset3 are derived as follows:
  shift0 is set equal to bitDepth−6, offset0 is equal to $2^{shift1-1}$,
  shift1 is set equal to 11, offset1 is equal to 1024

<insert>The variables hor_max, ver_max, hor_min and ver_min are derived by invoking the process specified in 0 with a location (xCb, yCb) in full-sample units, two variables cbWidth and cbHeight specifying the width and the height of the current coding block, horizontal change of motion vector dX, vertical change of motion vector dY, motion vector mvBaseScaled, width of the picture in samples_pic_width and height of the picture in samples pic_height as input, and hor_max, ver_max, hor_min and ver_min as output.<insert>

For x=−1 . . . cbWidth and y=−1 . . . cbHeight, the following applies:
  The motion vector mvX is derived as follows:

mvX[0]=(mvBaseScaled[0]+dX[0]*x+dY[0]*y)   (8-728)

mvX[1]=(mvBaseScaled[1]+dX[1]*x+dY[1]*y)   (8-729)

<insert>mvX[0]=Clip3(hor_min,hor_max,mvX[0])   (8-730)

mvX[1]=Clip3(ver_min,ver_max,mvX[1])   (8-731)<insertend>

<insert> 1.1.1.5 Derivation of clipping parameters for affine motion vector

Inputs to the process are:
  a location (xCb, yCb) in full-sample units,
  two variables cbWidth and cbHeight specifying the width and the height of the current coding block,
  horizontal change of motion vector dX,
  vertical change of motion vector dY,
  motion vector mvBaseScaled,
  width of the picture in samples pic_width,
  height of the picture in samples pic_height.

Outputs of the process are:
  hor_max, ver_max, hor_min and ver_min that denotes the maximum and minimum allowed motion vector horizontal and vertical components.

The center motion vector mv_center is derived as follows:

mv_center[0]=(mvBaseScaled[0]+dX[0]*(cbWidth>>1)+dY[0]*(cbHeight>>1))   (8-743)

mv_center[1]=(mvBaseScaled[1]+dX[1]*(cbWidth>>1)+dY[1]*(cbHeight>>1))   (8-743)

The rounding process for motion vectors as specified in clause 8.5.3.10 is invoked with mv_center, rightShift set equal to 5, and leftShift set equal to 0 as inputs and the rounded motion vector is return as mv_center.

The motion vector mv_center is clipped as follows:

mv_center[0]=Clip3(−$2^{17}$,$2^{17}$−1,mv_center[0])   (8-686)

mv_center[1]=Clip3(−$2^{17}$,$2^{17}$−1,mv_center[1])   (8-686)

The variable smv_hor_min, mv_ver_min, mv_hor_max and mv_ver_max are derived as following:

mv_hor_min=mv_center[0]−deviationA[log2CbWidth−3]   (8-743)

mv_ver_min=mv_center[1]−deviationA[log2CbHeight−3]   (8-743)

mv_hor_max=mv_center[0]+deviationB[log2CbWidth−3]   (8-743)

mv_ver_max=mv_center[1]+deviationB[log2CbHeight−3]   (8-743)

with deviationA and deviationB specified for k=0 . . . 4 as:
deviationA[k]={16, 80, 224, 512, 1088},
deviationB[k] {16, 96, 240, 528, 1104}.

The variables hor_max_pic, ver_max_pic, hor_min_pic and ver_min_pic are derived as follows:

hor_max_pic=(pic_width+128−xCb−cbWidth+1)<<4   (8-743)

ver_max_pic=(pic_height+128−yCb−cbHeight+1)<<4   (8-743)

hor_min_pic=(−128−xCb)<<4   (8-743)

ver_min_pic=(−128−yCb)<<4   (8-743)

The output hor_max, ver_max, hor_min and ver_min that denotes the maximum and minimum allowed motion vector horizontal and vertical components are derived as following:

hor_max=min(hor_max_pic,mv_hor_max)<<5   (8-743)

ver_max=min(ver_max_pic,mv_ver_max)<<5   (8-743)

hor_min=max(hor_min_pic,mv_hor_min)<<5   (8-743)

ver_min=max(ver_min_pic,mv_ver_min)<<5   (8-743)<insert>

FIG. 19 is a flowchart illustrating a process 1900 of affine coding with clipping parameters in accordance with examples described herein. In some examples, the process 1900 can be performed by the encoding device 104 or decoding device 112. In some examples, the process 1900 can be embodied as instructions in a computer readable storage medium that, when executed by processing circuitry of a device, causes the device to perform the operations of the process 1900.

At block 1902, the process 1900 includes operations to obtain a current coding block from the video data. Such operations can be part of sequential operations to process multiple coding blocks, with the clipping parameters determined per block, and used for each sample of a current block. When one block is coded and the operations move to a next block, a new set of clipping parameters can be determined for the new block, and used for each sample of the new block. In some examples of process 1900 the control data comprises values from a derivation table.

At block 1904, the process 1900 includes operations to determine control data for the current coding block. In some examples, the control data can include the described inputs above consisting of location (xCb, yCb) in full-sample units, two variables cbWidth and cbHeight specifying the width and the height of the current coding block, a horizontal change of motion vector dX, a vertical change of motion vector dY, a motion vector mvBaseScaled, a width of the picture in samples pic_width, and a height of the picture in samples pic_height. In other examples, other combinations or groupings of data can be used. In another example, the control data comprises: a location with associated horizontal coordinate and associated vertical coordinate in full-sample units; a width variable specifying a width of the current coding block; a height variable specifying a height of the current coding block; a horizontal change of motion vector; a vertical change of motion vector; a base scaled motion vector; a height of a picture associated with the current coding block in samples; and a width of the picture in samples.

At block 1906, the process 1900 includes operations to determine one or more affine motion vector clipping parameters from the control data. In some examples, the affine motion vector clipping parameters comprise: a horizontal maximum variable; a horizontal minimum variable; a vertical maximum variable; and a vertical minimum variable.

In some examples, the horizontal minimum variable is defined by a maximum value selected from a horizontal minimum picture value and a horizontal minimum motion vector value. In some such examples, the horizontal minimum variable (hor_min) is defined by a maximum value selected from a horizontal minimum picture value (hor_min_pic) and a horizontal minimum motion vector value (mv_hor_min) as: hor_min=max(hor_min_pic, mv_hor_min).

In some such examples, the horizontal minimum picture value (hor_min_pic) is determined from the associated horizontal coordinate. In some examples, wherein the hor_min_pic is defined as: hor_min_pic=(−128−xCb).

In some examples, the horizontal minimum motion vector value is determined from a center motion vector value, an array of values based on a resolution value associated with the video data or a block area size (e.g., a current coding block width×height), and the width variable specifying the width of the current coding block. In some such examples, the mv_hor_min is defined as: mv_hor_min=mv_center[0]−deviationA[log2CbWidth−3]; where mv_center[0] is a center motion vector value, deviationA is an array of values based on a resolution value associated with the video data or a block area size (e.g., a current coding block width×height), and the cbWidth is the width variable specifying the width of the current coding block.

In some examples, the center motion vector value is determined from the base scaled motion vector, the horizontal change of motion vector, the width variable, and the height variable. In some such examples, the center motion vector value is defined as:

mv_center[0]=(mvBaseScaled[0]+dX[0]*(cbWidth>>1)+dY[0]*(cbHeight>>1)).

In some examples, the base scaled motion vector corresponds to a top left corner of the current coding block and is determined from control point motion vector values. In some examples, the mvBaseScaled corresponds to the top left corner of the luma coding block and is defined as: mvBaseScaled[0]=cpMvLX[0][0]<<7; mvBaseScaled[1]= cpMvLX[0][1]<<7; where cpMvLX are control point motion vectors.

The above aspects of block 1906 primarily describe operations for determining parameters associated with the horizontal minimum variable (hor_min). Each of the other combinations of the horizontal, vertical, maximum, and minimum parameters for vector clipping can have similar examples as described herein, including elements for a horizontal maximum variable; a vertical maximum variable; and a vertical minimum variable.

In some examples, the horizontal maximum variable is defined by a minimum value selected from a horizontal maximum picture value and a horizontal maximum motion vector value. In some examples, the horizontal maximum picture value is determined from the width of the picture, the associated horizontal coordinate, and the width variable. In some examples, the horizontal maximum motion vector value is determined from a center motion vector value, an array of values based on a resolution value associated with the video data or a block area size (e.g., a current coding block width×height), and the width variable specifying the width of the current coding block. In some examples, the center motion vector value is determined from the base scaled motion vector, the horizontal change of motion vector, the width variable, and the height variable. In some examples, a base scaled motion vector corresponds to a corner of the current coding block and is determined from control point motion vector values.

In some examples, the vertical maximum variable is defined by a minimum value selected from a vertical maximum picture value and a vertical maximum motion vector value. In some examples, the vertical maximum picture value is determined from the height of the picture, the associated vertical coordinate, and the height variable. In some examples, the vertical maximum motion vector value is determined from a center motion vector value, an array of values based on a resolution value associated with the video data or a block area size (e.g., a current coding block width×height), and the height variable specifying the width of the current coding block.

In some examples, the vertical minimum variable is defined by a maximum value selected from a vertical minimum picture value and a vertical minimum motion vector value. In some examples, the vertical minimum picture value is determined from the associated vertical coordinate. In some examples, the vertical minimum motion vector value is determined from a center motion vector value, an array of values based on a resolution value associated with the video data or a block area size (e.g., a current coding block width×height), and the height variable specifying the height of the current coding block.

As part of block 1906 additional particular derivations of the parameters can be performed, including derivations including elements for a horizontal maximum variable; a vertical maximum variable; and a vertical minimum variable. In some examples, these variables can be determined in accordance with details described herein, including:

hor_max=min(hor_max_pic, mv_hor_max)<<5;
ver_max=min(ver_max_pic, mv_ver_max)<<5;
hor_min=max(hor_min_pic, mv_hor_min)<<5;
ver_min=max(ver_min_pic, mv_ver_min)<<5;
mv_center[0]=(mvBaseScaled[0]+dX[0]*(cbWidth>>1)+dY[0]*(cbHeight>>1));

mv_center[1]=(mvBaseScaled[1]+dX[1]*(cb-
    Width>>1)+dY[1]*(cbHeight>>1));
mv_center[0]=Clip3($-2^{17}$, $2^{17}-1$, mv_center[0]);
mv_center[1]=Clip3($-2^{17}$, $2^{17}-1$, mv_center[1]);
mv_hor_min=mv_center[0]−deviationA[log2CbWidth−3];
mv_ver_min=mv_center[1]−deviationA[log2CbHeight−3];
mv_hor_max=mv_center[0]+deviationB[log2CbWidth−3];
mv_ver_max=mv_center[1]+deviationB[log2CbHeight−3];
with deviationA and deviationB specified for k=0 . . . 4 as deviationA[k]={16, 80, 224, 512, 1088} and deviationB[k] {16, 96, 240, 528, 1104};
hor_max_pic=(pic_width+128−xCb−cbWidth+1)<<4;
ver_max_pic=(pic_height+128−yCb−cbHeight+1)<<4;
hor_min_pic=(−128−xCb)<<4;
ver_min_pic=(−128−yCb)<<4;

and other such details described herein. In other examples, other similar processes for determining parameters for clipping can be used.

At block 1908, the process 1900 includes operations to select a sample of the current coding block. As described above, a select number of samples for a current block can be used, or each sample of a current block can be used. EVC based example affine prediction can be implemented with different approaches. One example EVC approach utilizes translation motion prediction for sub-blocks. Another example of EVC affine prediction uses finer granularity y (e.g., pixelwise) motion prediction. Different approaches can have associated operations to select samples.

At block 1910, the process 1900 includes operations to determine an affine motion vector for the sample of the current coding block. In some examples, the affine motion vector for the sample of the current block is determined according to a first base scaled motion vector value, a first horizontal change of motion vector value, a first vertical change of motion vector value, a second base scaled motion vector value, a second horizontal change of motion vector value, a second vertical change of motion vector value, a horizontal coordinate of the sample, and a vertical coordinate of the sample. In some examples, the motion vector specified as mvX can be derived using: mvX[0]=(mvBaseScaled[0]+dX[0]*x+dY[0]*y); mvX[1]=(mvBaseScaled[1]+dX[1]*x+dY[1]*y.

At block 1912, the process 1900 includes operations to clip the affine motion vector using the one or more affine motion vector clipping parameters to generate a clipped affine motion vector. In some examples, the affine motion vector is clipped according to mvX[0]=Clip3(hor_min, hor_max, mvX[0]); and mvX[1]=Clip3(ver_min, ver_max, mvX[1]).

In addition to the blocks above, some elements of process 1900 can include additional operations, intervening operations, or repetitions of operations of certain blocks. In some examples, such additional operations can include operations to identify a reference picture associated with the current coding block; and store a portion of the reference picture defined by the affine motion vector clipping parameters. Some such operations can function where the portion of the reference picture is stored in the memory buffer for affine motion processing operations using the current coding block.

Similarly, some repeated operations can include operations to sequentially obtain a plurality of current coding blocks from the video data; determine a set of affine motion vector clipping parameters on a per coding block basis for blocks of the plurality of current coding blocks; and fetch portions of a corresponding reference pictures using the set of affine motion vector clipping parameters on the per block basis for the plurality of current coding blocks. In any such examples, the operations can further include processing the current block using reference picture data from a reference picture indicated by the clipped affine motion vector. Such a block can be a luma coding block, or any other such block for video data being coded in an affine coding mode. Such a process 1900 can be performed by any device herein, including a device with a memory and one or more processors. Such devices can include a device with a display device a display device coupled to the one or more processors and configured to display images from the video data; and one or more wireless interfaces coupled to the one or more processors, the one or more wireless interfaces comprising one or more baseband processors and one or more transceivers. Other such devices can include other components described herein.

In some examples, the processes described herein may be performed by a computing device or an apparatus, such as the encoding device 104, the decoding device 112, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., the system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. The connection may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of the disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of the disclosure are performed by a video encoding device, the techniques may also be performed by a video encoder/decoder, typically referred to as a "CODEC." Moreover, the techniques of the disclosure may also be performed by a video preprocessor. Source device and destination device are merely examples of such coding devices in which source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in the disclosure may be applicable to video coding in general, and may be applied to wireless and/or wired applications. In each case, the captured, pre-captured, or computer-generated video may be encoded by the video encoder. The encoded video information may be output by an output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 20:
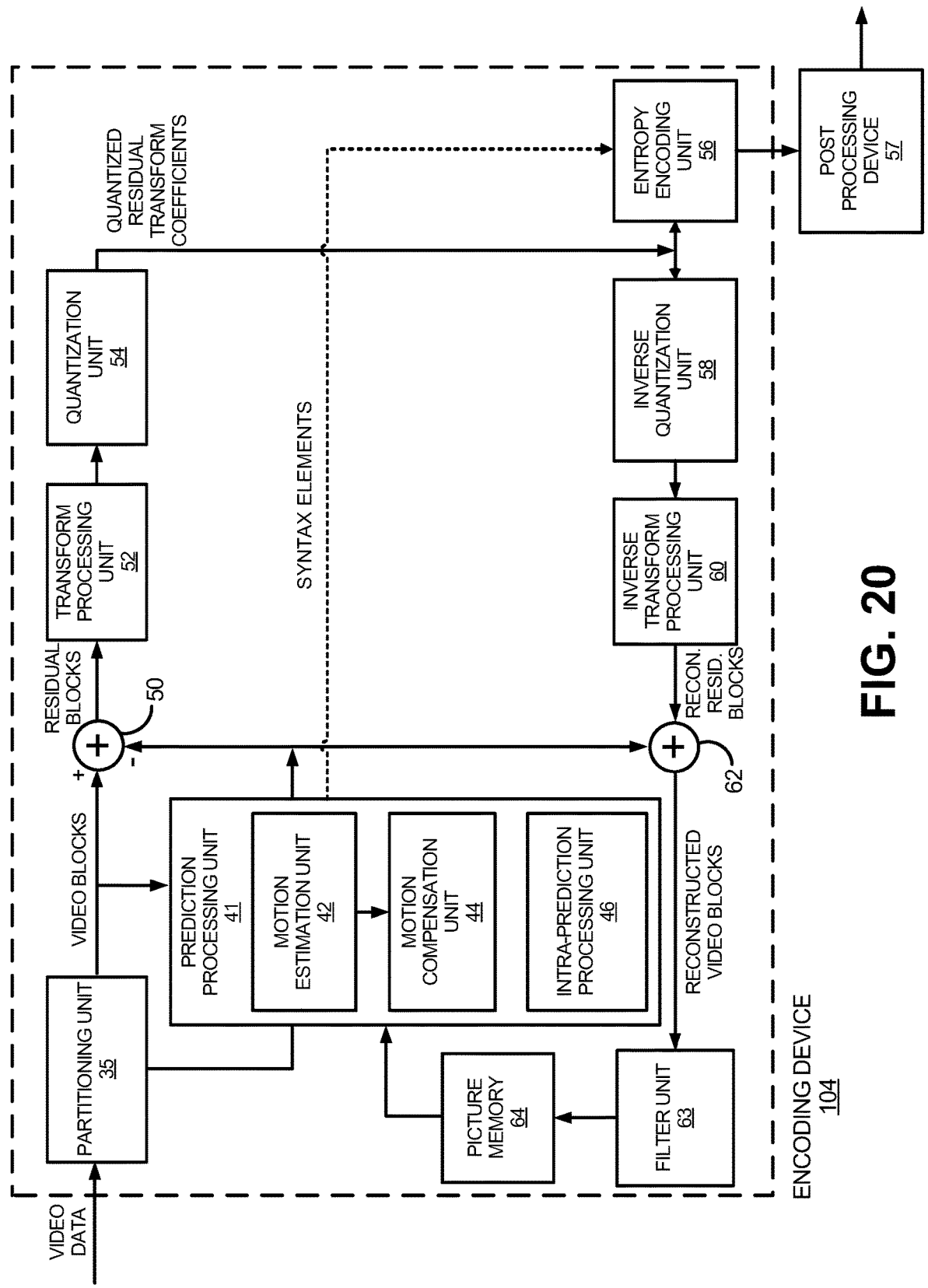
FIG. 20 is a block diagram illustrating a video encoding device, in accordance with some examples.
Figure 21:
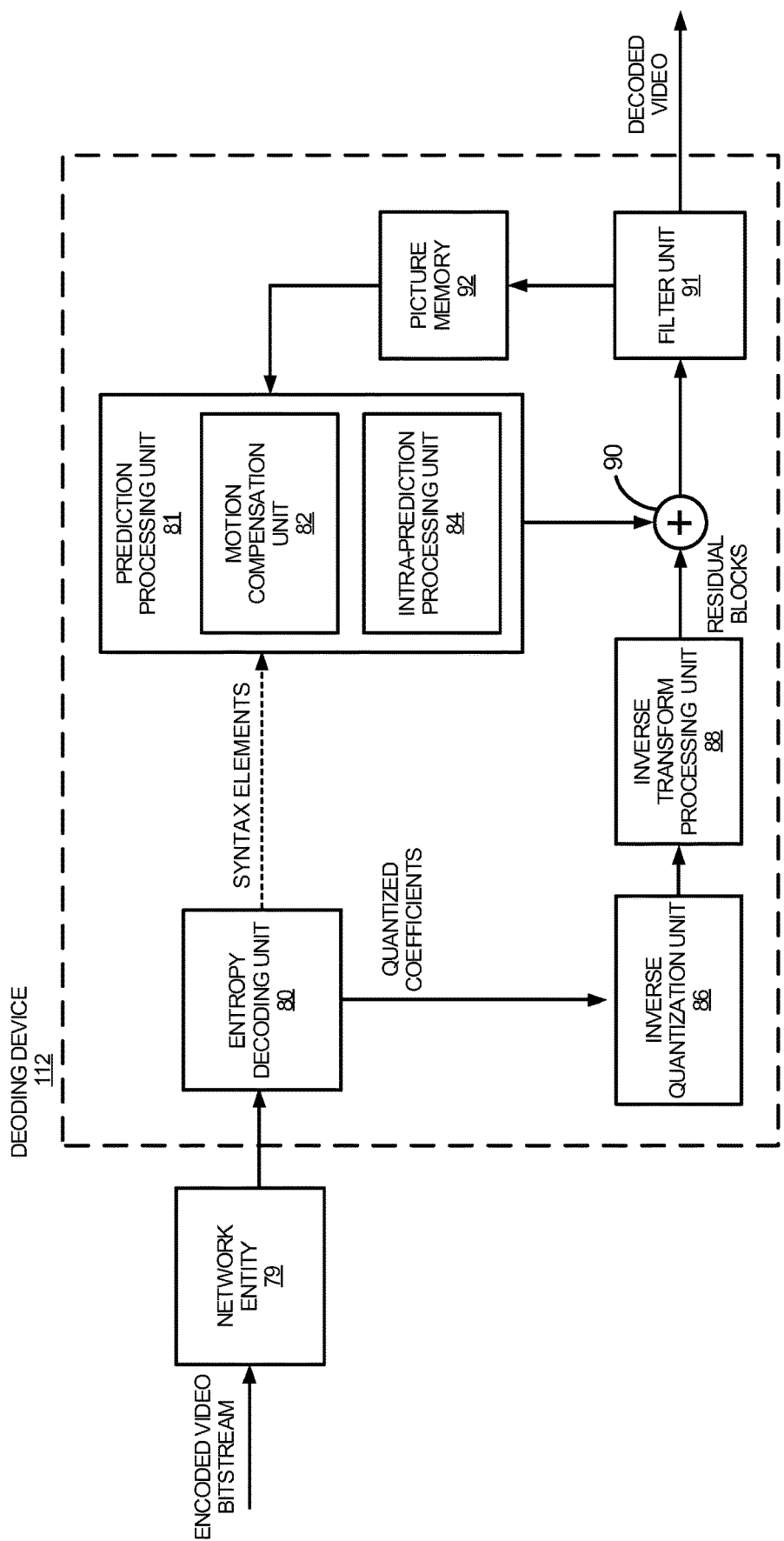
FIG. 21 is a block diagram illustrating a video decoding device, in accordance with some examples.

Specific details of the encoding device 104 and the decoding device 112 are shown in FIG. 20 and FIG. 21 respectively. FIG. 20 is a block diagram illustrating an example encoding device 104 that may implement one or more of the techniques described in the disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 20 as being an in loop filter, in other configurations, filter unit 63 may be implemented as a post loop filter. A post processing device 57 may perform additional processing on encoded video data generated by the encoding device 104. The techniques of the disclosure may in some instances be implemented by the encoding device 104. In other instances, however, one or more of the techniques of the disclosure may be implemented by post processing device 57.

As shown in FIG. 20, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform the subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables). After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

The encoding device 104 may perform any of the techniques described herein. Some techniques of the disclosure have generally been described with respect to the encoding device 104, but as mentioned above, some of the techniques of the disclosure may also be implemented by post processing device 57.

The encoding device 104 of FIG. 20 represents an example of a video encoder configured to perform one or more of the transform coding techniques described herein. The encoding device 104 may perform any of the techniques described herein, including the processes described above with respect to FIG. 21.

FIG. 21 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 20.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in the disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In the above case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform the summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 21 as being an in loop filter, in other configurations, filter unit 91 may be implemented as a post loop filter. The decoded video blocks in a given frame or picture are stored in picture memory 92, which stores reference pictures used for subsequent motion compensation. Picture memory 92 also stores decoded video for later presentation on a display device, such as video destination device 122 shown in FIG. 1.

The decoding device 112 of FIG. 21 represents an example of a video decoder configured to perform one or more of the transform coding techniques described herein. The decoding device 112 may perform any of the techniques described herein, including the process 1900 described above with respect to FIG. 21.

In the foregoing description, aspects of the application are described with reference to specific embodiments thereof, but those skilled in the art will recognize that the subject matter of the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of the description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in the disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Example 1. A method of processing video data, the method comprising: obtaining one or more blocks of video data; and determining an affine motion vector to use for predicting a block of the video data, wherein an area of at least reference picture accessible using the affine motion vector is restricted based on a constraint.

Example 2. The method of example 1, wherein the constraint is based on a size of the block.

Example 3. The method of any one of examples 1 to 2, further comprising: clipping the affine motion vector according to the constraint.

Example 4. The method of any one of examples 1 to 2, further comprising: clipping, according to the constraint, reference sample coordinates of at least one sample from the at least one reference picture, the reference sample coordinates being determined using the affine motion vector.

Example 5. The method of any one of examples 1 to 4, further comprising: deriving clipping parameters as a function of a size of the block.

Example 6. The method of any one of examples 1 to 5, further comprising: computing parameters for clipping at least one of an affine motion vector an reference sample coordinates once per block from one or more tabulated parameters.

Example 7. An apparatus comprising a memory configured to store video data and a processor configured to process the video data according to any of examples 1 to 6.

Example 8. The apparatus of example 7, wherein the apparatus includes a decoder.

Example 9. The apparatus of example 7, wherein the apparatus includes an encoder.

Example 10. The apparatus of any one of examples 7 to 9, wherein the apparatus is a mobile device.

Example 11. The apparatus of any one of examples 7 to 10, further comprising a display configured to display the video data.

Example 12. The apparatus of any one of examples 7 to 11, further comprising a camera configured to capture one or more pictures.

Example 13. A computer readable medium having stored thereon instructions that when executed by a processor perform the methods of any of examples 1 to 6.

Example 14. An apparatus for coding video data, the apparatus comprising: memory; and one or more processors coupled to the memory, the one or more processors being configured to: obtain a current coding block from the video data; determine control data for the current coding block; determine one or more affine motion vector clipping parameters from the control data; select a sample of the current coding block; determine an affine motion vector for the sample of the current coding block; and clip the affine motion vector using the one or more affine motion vector clipping parameters to generate a clipped affine motion vector.

Example 15. The apparatus of example 14, wherein the control data comprises: a location with associated horizontal coordinate and associated vertical coordinate in full-sample units; a width variable specifying a width of the current coding block; a height variable specifying a height of the current coding block; a horizontal change of motion vector; a vertical change of motion vector; a base scaled motion vector; a height of a picture associated with the current coding block in samples; and a width of the picture in samples.

Example 16. The apparatus of example 15, wherein the one or more affine motion vector clipping parameters comprise: a horizontal maximum variable; a horizontal minimum variable; a vertical maximum variable; and a vertical minimum variable.

Example 17. The apparatus of example 16, wherein the horizontal minimum variable is defined by a maximum value selected from a horizontal minimum picture value and a horizontal minimum motion vector value.

Example 18. The apparatus of example 17, wherein the horizontal minimum picture value is determined from the associated horizontal coordinate.

Example 19. The apparatus of example 18, wherein the horizontal minimum motion vector value is determined from a center motion vector value, an array of values based on a resolution value associated with the video data or a block area size (e.g., a current coding block width×height), and the width variable specifying the width of the current coding block.

Example 20. The apparatus of example 19, wherein the center motion vector value is determined from the base scaled motion vector, the horizontal change of motion vector, the width variable, and the height variable.

Example 21. The apparatus of example 20, wherein the base scaled motion vector corresponds to a top left corner of the current coding block and is determined from control point motion vector values.

Example 22. The apparatus of examples 16-21 above, wherein the horizontal maximum variable is defined by a minimum value selected from a horizontal maximum picture value and a horizontal maximum motion vector value.

Example 23. The apparatus of example 22, wherein the horizontal maximum picture value is determined from the width of the picture, the associated horizontal coordinate, and the width variable.

Example 24. The apparatus of example 23, wherein the horizontal maximum motion vector value is determined from a center motion vector value, an array of values based on a resolution value associated with the video data or a block area size (e.g., a current coding block width×height), and the width variable specifying the width of the current coding block.

Example 25. The apparatus of example 24, wherein the center motion vector value is determined from the base scaled motion vector, the horizontal change of motion vector, the width variable, and the height variable.

Example 26. The apparatus of example 25, wherein the base scaled motion vector corresponds to a corner of the current coding block and is determined from control point motion vector values.

Example 27. The apparatus of examples 16-26 above, wherein the vertical maximum variable is defined by a minimum value selected from a vertical maximum picture value and a vertical maximum motion vector value.

Example 28. The apparatus of example 27, wherein the vertical maximum picture value is determined from the height of the picture, the associated vertical coordinate, and the height variable.

Example 29. The apparatus of example 28, wherein the vertical maximum motion vector value is determined from a center motion vector value, an array of values based on a resolution value associated with the video data or a block area size (e.g., a current coding block width×height), and the height variable specifying the width of the current coding block.

Example 30. The apparatus of examples 16-30 above, wherein the vertical minimum variable is defined by a maximum value selected from a vertical minimum picture value and a vertical minimum motion vector value.

Example 31. The apparatus of example 30, wherein the vertical minimum picture value is determined from the associated vertical coordinate.

Example 32. The apparatus of example 31, wherein the vertical minimum motion vector value is determined from a center motion vector value, an array of values based on a resolution value associated with the video data or a block area size (e.g., a current coding block width×height), and the height variable specifying the height of the current coding block.

Example 33. The apparatus of examples 14-32, wherein the one or more processors are configured to: sequentially obtain a plurality of current coding blocks from the video data; determine a set of affine motion vector clipping parameters on a per coding block basis for blocks of the plurality of current coding blocks; and fetch portions of a corresponding reference pictures using the set of affine motion vector clipping parameters on the per block basis for the plurality of current coding blocks.

Example 34. The apparatus of examples 14-33, wherein the one or more processors are configured to: identify a reference picture associated with the current coding block; and store a portion of the reference picture defined by the one or more affine motion vector clipping parameters.

Example 35. The apparatus of example 34, further comprising a memory buffer coupled to the one or more processors, wherein the portion of the reference picture is stored in the memory buffer for affine motion processing operations using the current coding block.

Example 36. The apparatus of examples 14-35, wherein the one or more processors are configured to: process the current coding block using reference picture data from a reference picture indicated by the clipped affine motion vector.

Example 37. The apparatus of examples 14=36, wherein the affine motion vector for the sample of the current coding block is determined according to a first base scaled motion vector value, a first horizontal change of motion vector value, a first vertical change of motion vector value, a second base scaled motion vector value, a second horizontal change of motion vector value, a second vertical change of motion vector value, a horizontal coordinate of the sample, and a vertical coordinate of the sample.

Example 38. The apparatus of examples 14-37, wherein the control data comprises values from a derivation table.

Example 39. The apparatus of examples 14-38, wherein the current coding block is a luma coding block.

Example 40. The apparatus of examples 14-39, further comprising: a display device coupled to the one or more processors and configured to display images from the video data; and one or more wireless interfaces coupled to the one or more processors, the one or more wireless interfaces comprising one or more baseband processors and one or more transceivers.

Example 41. A method of coding video data, the method comprising: obtaining a current coding block from the video data; determining control data for the current coding block; determining one or more affine motion vector clipping parameters from the control data; selecting a sample of the current coding block; determining an affine motion vector for the sample of the current coding block; and clipping the affine motion vector using the one or more affine motion vector clipping parameters to generate a clipped affine motion vector.

Example 42. The method of example 41 in accordance with any of examples 14-40.

Example 43. A non-transitory computer readable medium comprising instructions that, when executed by one or more processors of a coding device, cause the device to perform video coding operations on a video data in accordance with any of examples 14-40 above.

Example 44. An apparatus for coding video data, the apparatus comprising: means for obtaining a current coding block from the video data; means for determining control data for the current coding block; means for determining one or more affine motion vector clipping parameters from the control data; means for selecting a sample of the current coding block; means for determining an affine motion vector for the sample of the current coding block; and means for clipping the affine motion vector using the one or more affine motion vector clipping parameters to generate a clipped affine motion vector.

Example 45. The apparatus for coding video data of example 44, in accordance with any of examples 14-40 above.

Example 46. A non-transitory computer-readable storage medium comprising instructions stored thereon which, when executed by one or more processors, cause the one or more processors to: obtain a current coding block from video data; determine control data for the current coding block; determine one or more affine motion vector clipping parameters from the control data; select a sample of the current coding block; determine an affine motion vector for the sample of the current coding block; and clip the affine motion vector using the one or more affine motion vector clipping parameters to generate a clipped affine motion vector.

Example 47. The non-transitory computer-readable medium of example 46, including instructions to cause the one or more processors to operate in accordance with any of examples 14-40 above.

What is claimed is:

1. An apparatus for coding video data, the apparatus comprising:
    memory; and
    one or more processors coupled to the memory, the one or more processors being configured to:
        obtain a current coding block from the video data;
        determine control data for the current coding block, the control data comprising a location with a horizontal coordinate and a vertical coordinate in full-sample units, a width variable specifying a width of the current coding block, a height variable specifying a height of the current coding block, a horizontal change of a motion vector, a vertical change of the motion vector, and a base scaled motion vector;
        determine one or more affine motion vector clipping parameters from the control data;
        select a sample of the current coding block;
        determine an affine motion vector for the sample of the current coding block; and
        clip the affine motion vector using the one or more affine motion vector clipping parameters to generate a clipped affine motion vector.

2. The apparatus of claim 1, wherein the control data further comprises:
    a height of a picture associated with the current coding block in samples; and
    a width of the picture in samples.

3. The apparatus of claim 2, wherein the one or more affine motion vector clipping parameters comprise:
    a horizontal maximum variable;
    a horizontal minimum variable;
    a vertical maximum variable; and
    a vertical minimum variable.

4. The apparatus of claim 3, wherein the horizontal minimum variable is defined by a maximum value selected from a horizontal minimum picture value and a horizontal minimum motion vector value.

5. The apparatus of claim 4, wherein the horizontal minimum picture value is determined from the associated horizontal coordinate.

6. The apparatus of claim 5, wherein the horizontal minimum motion vector value is determined from a center motion vector value, an array of values based on a resolution value associated with the video data, and the width variable specifying the width of the current coding block.

7. The apparatus of claim 6, wherein the center motion vector value is determined from the base scaled motion vector, the horizontal change of motion vector, the width variable, and the height variable.

8. The apparatus of claim 7, wherein the base scaled motion vector corresponds to a top left corner of the current coding block and is determined from control point motion vector values.

9. The apparatus of claim 3, wherein the horizontal maximum variable is defined by a minimum value selected from a horizontal maximum picture value and a horizontal maximum motion vector value.

10. The apparatus of claim 9, wherein the horizontal maximum picture value is determined from the width of the picture, the associated horizontal coordinate, and the width variable.

11. The apparatus of claim 10, wherein the horizontal maximum motion vector value is determined from a center motion vector value, an array of values based on a resolution value associated with the video data, and the width variable specifying the width of the current coding block.

12. The apparatus of claim 11, wherein the center motion vector value is determined from the base scaled motion vector, the horizontal change of motion vector, the width variable, and the height variable.

13. The apparatus of claim 12, wherein the base scaled motion vector corresponds to a corner of the current coding block and is determined from control point motion vector values.

14. The apparatus of claim 3, wherein the vertical maximum variable is defined by a minimum value selected from a vertical maximum picture value and a vertical maximum motion vector value.

15. The apparatus of claim 14, wherein the vertical maximum picture value is determined from the height of the picture, the associated vertical coordinate, and the height variable.

16. The apparatus of claim 15, wherein the vertical maximum motion vector value is determined from a center motion vector value, an array of values based on a block area size associated with the video data, and the height variable specifying the width of the current coding block.

17. The apparatus of claim 3, wherein the vertical minimum variable is defined by a maximum value selected from a vertical minimum picture value and a vertical minimum motion vector value.

18. The apparatus of claim 17, wherein the vertical minimum picture value is determined from the associated vertical coordinate.

19. The apparatus of claim 18, wherein the vertical minimum motion vector value is determined from a center motion vector value, data block area size associated with the video data, and the height variable specifying the height of the current coding block.

20. The apparatus of claim 1, wherein the one or more processors are configured to:
sequentially obtain a plurality of current coding blocks from the video data;
determine a set of affine motion vector clipping parameters on a per coding block basis for blocks of the plurality of current coding blocks; and
fetch portions of a corresponding reference pictures using the set of affine motion vector clipping parameters on the per block basis for the plurality of current coding blocks.

21. The apparatus of claim 1, wherein the one or more processors are configured to:
identify a reference picture associated with the current coding block; and
store a portion of the reference picture defined by the one or more affine motion vector clipping parameters.

22. The apparatus of claim 21, further comprising a memory buffer coupled to the one or more processors, wherein the portion of the reference picture is stored in the memory buffer for affine motion processing operations using the current coding block.

23. The apparatus of claim 1, wherein the one or more processors are configured to:
process the current coding block using reference picture data from a reference picture indicated by the clipped affine motion vector.

24. The apparatus of claim 1, wherein the affine motion vector for the sample of the current coding block is determined according to a first base scaled motion vector value, a first horizontal change of motion vector value, a first vertical change of motion vector value, a second base scaled motion vector value, a second horizontal change of motion vector value, a second vertical change of motion vector value, a horizontal coordinate of the sample, and a vertical coordinate of the sample.

25. The apparatus of claim 1, wherein the control data comprises values from a derivation table.

26. The apparatus of claim 1, wherein the current coding block is a luma coding block.

27. The apparatus of claim 1, further comprising:
a display device coupled to the one or more processors and configured to display images from the video data; and
one or more wireless interfaces coupled to the one or more processors, the one or more wireless interfaces comprising one or more baseband processors and one or more transceivers.

28. A method of coding video data, the method comprising:
obtaining a current coding block from the video data;
determining control data for the current coding block, the control data comprising a location with a horizontal coordinate and a vertical coordinate in full-sample units, a width variable specifying a width of the current coding block, a height variable specifying a height of the current coding block, a horizontal change of a motion vector, a vertical change of the motion vector, and a base scaled motion vector;
determining one or more affine motion vector clipping parameters from the control data;
selecting a sample of the current coding block;
determining an affine motion vector for the sample of the current coding block; and
clipping the affine motion vector using the one or more affine motion vector clipping parameters to generate a clipped affine motion vector.

29. The method of claim 28, wherein the one or more affine motion vector clipping parameters comprise:
a horizontal maximum variable;
a horizontal minimum variable;
a vertical maximum variable; and
a vertical minimum variable.

30. The method of claim 29, wherein the horizontal minimum variable is defined by a maximum value selected from a horizontal minimum picture value and a horizontal minimum motion vector value.

31. The method of claim 30, wherein the horizontal minimum picture value is determined from the associated horizontal coordinate.

32. The method of claim 31, wherein the horizontal minimum motion vector value is determined from a center motion vector value, an array of values based on a block area size, and the width variable specifying the width of the current coding block.

33. The method of claim 32, wherein the center motion vector value is determined from the base scaled motion vector, the horizontal change of motion vector, the width variable, and the height variable.

34. The method of claim 33, wherein the base scaled motion vector corresponds to a top left corner of the current coding block and is determined from control point motion vector values.

35. The method of claim 29, wherein the horizontal maximum variable is defined by a minimum value selected from a horizontal maximum picture value and a horizontal maximum motion vector value.

36. The method of claim 35, wherein the horizontal maximum picture value is determined from the associated horizontal coordinate, and the width variable.

37. The method of claim 36, wherein the horizontal maximum motion vector value is determined from a center motion vector value, an array of values based on a block area size associated with the video data, and the width variable specifying the width of the current coding block.

38. The method of claim 37, wherein the center motion vector value is determined from the base scaled motion vector, the horizontal change of motion vector, the width variable, and the height variable.

39. The method of claim 38, wherein the base scaled motion vector corresponds to a corner of the current coding block and is determined from control point motion vector values.

40. The method of claim 29, wherein the vertical maximum variable is defined by a minimum value selected from a vertical maximum picture value and a vertical maximum motion vector value.

41. The method of claim 40, wherein the vertical maximum picture value is determined from the associated vertical coordinate, and the height variable.

42. The method of claim 41, wherein the vertical maximum motion vector value is determined from a center motion vector value, an array of values based on a block area size associated with the video data, and the height variable specifying the width of the current coding block.

43. The method of claim 29, wherein the vertical minimum variable is defined by a maximum value selected from a vertical minimum picture value and a vertical minimum motion vector value.

44. The method of claim 43, wherein the vertical minimum picture value is determined from the associated vertical coordinate.

45. The method of claim 44, wherein the vertical minimum motion vector value is determined from a center motion vector value, an array of values based on a block area size associated with the video data, and the height variable specifying the height of the current coding block.

46. The method of claim 28, further comprising:
sequentially obtaining a plurality of current coding blocks from the video data;
determining a set of affine motion vector clipping parameters on a per coding block basis for blocks of the plurality of current coding blocks; and
fetching portions of a corresponding reference pictures using the set of affine motion vector clipping parameters on the per block basis for the plurality of current coding blocks.

47. The apparatus of claim 28, further comprising:
identifying a reference picture associated with the current coding block; and
storing a portion of the reference picture defined by the one or more affine motion vector clipping parameters.

48. The method of claim 47, wherein the portion of the reference picture is stored in a memory buffer for affine motion processing operations using the current coding block.

49. The method of claim 28, further comprising:
processing the current coding block using reference picture data from a reference picture indicated by the clipped affine motion vector.

50. The method of claim 28, wherein the affine motion vector for the sample of the current coding block is determined according to a first base scaled motion vector value, a first horizontal change of motion vector value, a first vertical change of motion vector value, a second base scaled motion vector value, a second horizontal change of motion vector value, a second vertical change of motion vector value, a horizontal coordinate of the sample, and a vertical coordinate of the sample.

51. The method of claim 28, wherein the control data comprises values from a derivation table.

52. The method of claim 28, wherein the current coding block is a luma coding block.

53. A non-transitory computer-readable storage medium comprising instructions stored thereon which, when executed by one or more processors, cause the one or more processors to:
obtain a current coding block from video data;
determine control data for the current coding block, the control data comprising a location with a horizontal coordinate and a vertical coordinate in full-sample units, a width variable specifying a width of the current coding block, a height variable specifying a height of the current coding block, a horizontal change of a motion vector, a vertical change of the motion vector, and a base scaled motion vector;
determine one or more affine motion vector clipping parameters from the control data;
select a sample of the current coding block;
determine an affine motion vector for the sample of the current coding block; and
clip the affine motion vector using the one or more affine motion vector clipping parameters to generate a clipped affine motion vector.

54. The method of claim 28, wherein the control data further comprises:
a height of a picture associated with the current coding block in samples; and
a width of the picture in samples.

* * * * *